US 9,883,511 B1

(12) United States Patent
Yang et al.

(10) Patent No.: US 9,883,511 B1
(45) Date of Patent: Jan. 30, 2018

(54) WAVEFORM DESIGN FOR TIME-REVERSAL SYSTEMS

(71) Applicant: Wireless, Inc., Greenbelt, MD (US)

(72) Inventors: Yu-Han Yang, San Diego, CA (US); Beibei Wang, Bridgewater, NJ (US); K. J. Ray Liu, Potomac, MD (US)

(73) Assignee: Origin Wireless, Inc., Greenbelt, MD (US)

( * ) Notice: Subject to any disclaimer, the term of this patent is extended or adjusted under 35 U.S.C. 154(b) by 0 days.

(21) Appl. No.: 13/706,342

(22) Filed: Dec. 5, 2012

(51) Int. Cl.
*H04W 72/04* (2009.01)

(52) U.S. Cl.
CPC .............. *H04W 72/0473* (2013.01)

(58) Field of Classification Search
CPC ... H04W 56/0065; H04W 4/00; H04W 72/04; H04W 72/042; H04W 88/08; H04L 5/0007; H04L 25/0288; H04L 25/03859; H04L 12/2471
USPC .................................................. 370/329, 330
See application file for complete search history.

(56) References Cited

U.S. PATENT DOCUMENTS

| | | |
|---|---|---|
| 2,933,702 A | 4/1960 | Bogert |
| 3,767,855 A | 10/1973 | Ueno et al. |
| 5,092,336 A | 3/1992 | Fink |
| 5,155,742 A | 10/1992 | Ariyavisitakul et al. |
| 5,428,999 A | 7/1995 | Fink |
| 5,926,768 A | 7/1999 | Lewiner et al. |
| 6,301,291 B1 | 10/2001 | Rouphael et al. |
| 6,490,469 B2 | 12/2002 | Candy |
| 6,862,326 B1 | 3/2005 | Eran et al. |
| 7,362,815 B2 | 4/2008 | Lindskog et al. |
| 7,440,766 B1 | 10/2008 | Tuovinen et al. |
| 7,460,605 B2 | 12/2008 | Candy et al. |
| 7,463,690 B2 | 12/2008 | Candy et al. |

(Continued)

FOREIGN PATENT DOCUMENTS

| | | |
|---|---|---|
| EP | 2 571 214 A1 | 11/2012 |
| WO | WO 2007/031088 | 3/2007 |

(Continued)

OTHER PUBLICATIONS

Ahmadian et al., "Design of Pre-rake DS-UWB Downlink with Pre-equalization," IEEE Transactions on Communications, vol. 60, No. 2, pp. 400-410, Feb. 2012.

(Continued)

*Primary Examiner* — Andrew Chriss
*Assistant Examiner* — Rasha Fayed
(74) *Attorney, Agent, or Firm* — Fish & Richardson P.C.

(57) ABSTRACT

A transmitter receives channel impulse response signals derived from impulse signals sent from two or more receivers, each impulse signal being sent from one of the receivers to the transmitter through multiple propagation paths. Downlink waveforms for the two or more receivers are calculated in a way so as to increase a weighted sum-rate under a total power constraint, the downlink waveforms being determined based on time-reversed channel impulse response signals and initial virtual uplink power allocation coefficients. Updated virtual uplink power allocation coefficients are determined based on the downlink waveforms, and downlink power allocation coefficients are determined based on the downlink waveforms and the virtual uplink power allocation coefficients.

57 Claims, 26 Drawing Sheets

(56) References Cited

U.S. PATENT DOCUMENTS

| | | | |
|---|---|---|---|
| 7,587,291 B1 | 9/2009 | Sarvazyan et al. | |
| 7,768,876 B2 | 8/2010 | Dahl et al. | |
| 8,064,537 B2* | 11/2011 | Xu | H04W 52/346 |
| | | | 375/297 |
| 8,195,112 B1 | 6/2012 | Zhang et al. | |
| 8,346,197 B2 | 1/2013 | Huy et al. | |
| 8,355,313 B2* | 1/2013 | Walton et al. | 370/208 |
| 8,411,765 B2 | 4/2013 | Smith et al. | |
| 8,451,181 B2 | 5/2013 | Huy et al. | |
| 8,457,062 B2* | 6/2013 | Burstrom et al. | 370/330 |
| 8,457,217 B2 | 6/2013 | Huy et al. | |
| 8,498,658 B2 | 7/2013 | Smith et al. | |
| 8,593,998 B2 | 11/2013 | Huy et al. | |
| 8,711,670 B2* | 4/2014 | Higuchi et al. | 370/203 |
| 8,743,976 B2 | 6/2014 | Smith et al. | |
| 8,792,396 B2 | 7/2014 | Huy et al. | |
| 8,831,164 B2 | 9/2014 | Lu | |
| 2003/0036359 A1* | 2/2003 | Dent et al. | 455/63 |
| 2003/0138053 A1 | 7/2003 | Candy et al. | |
| 2004/0156443 A1* | 8/2004 | Dent | 375/267 |
| 2006/0094435 A1* | 5/2006 | Thomas | H04B 7/0669 |
| | | | 455/450 |
| 2006/0098746 A1 | 5/2006 | Candy et al. | |
| 2006/0115031 A1 | 6/2006 | Lindskog et al. | |
| 2006/0285504 A1* | 12/2006 | Dong et al. | 370/254 |
| 2007/0178930 A1* | 8/2007 | Xiao et al. | 455/522 |
| 2009/0154403 A1* | 6/2009 | Niwano | H04W 52/282 |
| | | | 370/329 |
| 2010/0302977 A1 | 12/2010 | Huy et al. | |
| 2010/0309829 A1 | 12/2010 | Huy et al. | |
| 2011/0075594 A1* | 3/2011 | Burstrom et al. | 370/280 |
| 2012/0155515 A1 | 6/2012 | Smith et al. | |
| 2012/0183037 A1 | 7/2012 | Allpress et al. | |
| 2012/0207234 A1* | 8/2012 | De Rosny et al. | 375/267 |
| 2012/0257660 A1 | 10/2012 | Smith et al. | |
| 2012/0263056 A1 | 10/2012 | Smith et al. | |
| 2012/0328037 A1 | 12/2012 | Hsu et al. | |
| 2013/0028214 A1* | 1/2013 | Imamura | H04L 5/001 |
| | | | 370/329 |
| 2013/0201958 A1 | 8/2013 | Huy et al. | |
| 2013/0223503 A1 | 8/2013 | Smith et al. | |
| 2013/0336232 A1* | 12/2013 | Yang | H04B 7/0619 |
| | | | 370/329 |
| 2014/0022128 A1 | 1/2014 | Smith | |
| 2014/0126567 A1 | 5/2014 | Husain et al. | |
| 2014/0185596 A1 | 7/2014 | Han et al. | |
| 2015/0049745 A1 | 2/2015 | Han et al. | |
| 2015/0049792 A1 | 2/2015 | Han et al. | |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |

OTHER PUBLICATIONS

Boche et al., "A General Duality Theory for Uplink and Downlink Beamforming," Proc. VTC'02, 2002, pp. 87-91.

Boche et al., "Stability-optimal Transmission Policy for the Multiple Antenna Multiple Access Channel in the Geometric View," Signal Processing, vol. 86, No. 8, pp. 1815-1833, 2006.

Cai, et al., "Coordinated Max-min SIR Optimization in Multicell Downlink—Duality and Algorithm," 2011 IEEE International Conference on Communications (ICC), 6 pages, Jun. 2011.

Chiang et al., "Power Control by Geometric Programming," IEEE Transactions on Wireless Communications, vol. 6, No. 7, pp. 2640-2651, Jul. 2007.

Daniels et al., "Improving on Time-reversal with MISO Precoding," Proceedings of the Eighth International Symposium on Wireless Personal Communications Conference, Aalborg, Denmark, 5 pages, 2005.

Christensen et al., "Weighted Sum-rate Maximization using Weighted MMSE for MIMO-BC Beamforming Design," IEEE Trans. Wireless Commun., vol. 7, No. 12, pp. 4792-4799, Dec. 2008.

Dietrich et al., "Linear Precoding Over Time-varying Channels in TDD Systems," Proc. ICASSP'03, vol. 5, pp. 117-120, 2003.

Emami et al., "Matched Filtering with Rate Back-off for Low Complexity Communications in Very Large Delay Spread Channels," 38th Asilomar Conference on Signals, Systems and Computers, pp. 218-222, 2004.

Eriksson et al., "Globally Optimal Resource Allocation for Achieving Maximum Weighted Sum Rate," IEEE Global Telecommunications Conference (GLOBECOM 2010), 6 pages, Dec. 2010.

Guthy et al., "Efficient Weighted Sum Rate Maximization with Linear Precoding," IEEE Trans. Signal Processing, vol. 58, No. 4, pp. 2284-2297, 2010.

Horn et al., Matrix Analysis. 1em plus 0.5em minus 0.4em Cambridge University Press, p. 301, 1990.

Hunger et al., "A General Rate Duality of the MIMO Multiple Access Channel and the MIMO Broadcast Channel," IEEE Global Telecommunications Conference, 2008., pp. 1-5, Dec. 2008.

Kha et al., "Fast Global Optimal Power Allocation in Wireless Networks by Local D.C. Programming," IEEE Transactions on Wireless Communications, vol. 11, No. 2, pp. 510-515, Feb. 2012.

Kobayashi et al., "A Practical Approach for Weighted Rate Sum Maximization in MIMO-OFDM Broadcast Channels," Conference Record of the Forty-First Asilomar Conference on Signals, Systems and Computers, pp. 1591-1595, Nov. 2007.

Rashid-Farrokhi et al., "Joint Optimal Power Control and Beamforming in Wireless Networks Using Antenna Arrays," IEEE Trans. Commun., vol. 46, No. 10, pp. 1313-1324, Oct. 1998.

Rashid-Farrokhi et al., "Transmit Beamforming and Power Control for Cellular Wireless Systems," IEEE J. Select. Areas Commun., vol. 16, No. 8, pp. 1437-1450, Oct. 1998.

Schubert et al., "Solution of the Multiuser Downlink Beamforming Problem with Individual SINR Constraints," IEEE Trans. Veh. Technol., vol. 53, No. 1, pp. 18-28, Jan. 2004.

Shi et al., "Rate Optimization for Multiuser MIMO Systems with Linear Processing," IEEE Trans. Signal Processing, vol. 56, No. 8, pp. 4020-4030, Aug. 2008.

Spencer et al., "Zero-forcing Methods for Downlink Spatial Multiplexing in Multiuser MIMO Channels," IEEE Trans. Signal Processing, vol. 52, No. 2, pp. 461-471, Feb. 2004.

Stojnic et al., "Rate Maximization in Multi-antenna Broadcast Channels with Linear Preprocessing," IEEE Trans. Wireless Commun., vol. 5, No. 9, pp. 2338-2342, Sep. 2006.

Su et al., "Maximum Signal-to-noise Array Processing for Space-time Coded Systems," IEEE Trans. Commun., vol. 50, No. 9, pp. 1419-1422, Sep. 2002.

Tenenbaum et al., "Linear Processing and Sum Throughput in the Multiuser MIMO Downlink," IEEE Trans. Wireless Commun., vol. 8, No. 5, pp. 2652-2661, May 2009.

Tse et al., "Downlink-uplink Duality and Effective Bandwidths," in Proc. IEEE Int. Symp. Inf. Theory (ISIT), 1 page, Jul. 2002.

Wang et al., "Green Wireless Communications: A Time-reversal Paradigm," IEEE Journal of Selected Areas in Communications, special issue on Energy-Efficient Wireless Communications, vol. 29, No. 8, pp. 1698-1710, Sep. 2011.

Yu, "Multiuser Water-filling in the Presence of Crosstalk," in Information Theory and Applications Workshop, pp. 414-420, Jan. 2007.

D. Abbasi-Moghadam and V.T. Vakili, "A SIMO one-bit time reversal for UWB communication systems", EURASIP J. Wireless Comm. and Networking, 2012:113, 2012.

D. Albert, L. Liu, M. L. Moran, "Time Reversal processing for source location in an urban environment (L)", J. Acoust. Soc. Am., vol. 118, No. 2, pp. 616-619, Aug. 2005.

A.P. Brysev, L.M. Krutyanskii, V'L. Preobrazhenskii, "Wave Phase Conjugation in ultrasonic beams", Physics-Uspekhi, vol. 41, No. 8, pp. 793-805, 1998.

Y.H. Chang, S.H. Tsai, X. Yu, C.C. J. Kuo, "Ultrawideband Transceiver Design Using Channel Phase Precoding", IEEE Trans. Sig. Proc., vol. 55, No. 7, pp. 3807-3822, Jul. 2007.

(56) References Cited

OTHER PUBLICATIONS

Y. Chen, F. Han, Y.H. Yang, H. Ma, Y. Han, C. Jiang, H.Q. Lai, D. Claffey, Z. Safar, K.J.R. Liu, "Time-Reversal Wireless Paradigm for Green Internet of Things: An Overview", IEEE Internet of Things Journal, vol. 1, No. 1, Feb. 2014.
Chen, Y. et al., "Time-reversal wideband communications," IEEE Signal Processing Letters, vol. 20(12):1219-1222 (Dec. 2013).
R. C. Daniels and R. W. Heath, "MISO precoding for temporal and spatial focusing" in the Proceedings of the Eighth International Symposium on Wireless Personal Communications Conference, Aalborg, Denmark, 2005.
G.F. Edelmann, T. Akal, W.S. Hodgkiss, S. Kim, W.A. Kuperman and H.C. Song, "An Initial Demonstration of Underwater Acoustic Communication Using Time Reversal", IEEE J. Ocean Eng., vol. 27, No. 3, Jul. 2002.
S.M. Emami, J. Hansen, A.D. Kim, G. Papanicolaou, A.J. Paulraj, D. Cheung, C. Prettie, "Predicted Time Reversal Performance in Wireless Communications using Channel Measurements", publication details unknown.
R.J. Fontana, S.J. Gunderson, "Ultra-Wideband Precision Asset Location System", Proc. of the IEEE Conf. on UWB Sys. and Tech., pp. 147-150, 2002.
F. Han, "Energy Efficient Optimization in Green Wireless Networks", University of Maryland Ph. D. Dissertation, 2013.
G. Lerosey, J. de Rosny, A. Tourin, A. Derode, M. Fink, "Time Reversal of Wideband Microwaves", Appl. Phys. Lett., vol. 88, 154101, Apr. 2006.
A.Derode, A. Tourin, and M. Fink, "Ultrasonic pulse compression with one-bit time reversal through multiple scattering", J. Appl. Phys., vol. 85, No. 9, pp. 6343-6352, May, 1999.
M. Fink and C. Prada, "Acoustic Time-Reversal Mirrors", Inverse Problems, vol. 17, pp. R1-R38, 2001.
C. Prada, F. Wu, and M. Fink, "The iterative time reversal mirror: A solution to self-focusing in the pulse echo mode," J. Acoustic Society of America, vol. 90, pp. 1119-1129, 1991.
C. Dorme and M. Fink, "Focusing in transmit-receive mode through inhomogeneous media: The time reversal matched filter approach", J. Acoust. Soc. Am., vol. 98, Pt. 1, pp. 1155-1162, Aug. 1995.
I.H. Naqvi, G. El Zein, G. Lerosey, J. de Rosny, P. Besnier, A. Tourin, M. Fink, "Experimental validation of time reversal ultra wide-band communication system for high data rates", IET Microw. Antennas Propag., vol. 4, ISS. 5, pp. 643-650, 2010.
A. Derode, P. Roux, and M. Fink, "Robust Acoustic Time Reversal and High-Order Multiple Scattering", Phys. Rev. Left., vol. 75, No. 23, pp. 4206-4210, Dec. 1995.
A.Derode, A. Tourin, J. de Rosny, M. Tanter, S. Yon, and M. Fink, "Taking Advantage of Multiple Scattering to Communicate with Time-Reversal Antennas", Phys. Rev. Lett., vol. 90, No. 1, 014301, Jan. 2003.
G. Lerosey, J. de Rosny, A. Tourin, A. Derode, G. Montaldo and M. Fink, "Time Reversal of Electromagnetic Waves", Phys. Rev. Lett., vol. 92, No. 19, 193904, May 2004.
F. Lemoult, G. Lerosey, J. de Rosny, and M. Fink, "Manipulating Spatiotemporal Degrees of Freedom in Waves of Random Media", Phys. Rev. Lett., vol. 103, 173902, Oct. 2009.
F. Lemoult, G. Lerosey, J. de Rosny, and M. Fink, "Resonant Metalenses for Breaking the Diffraction Barrier", Phys. Rev. Lett., vol. 104, 203901, May 2010.
G. Lerosey, J. de Rosny, A. Tourin, A. Derode, G. Montaldo and M. Fink, "Time Reversal of Electromagnetic Waves and Telecommunication", Radio Science, vol. 40, RS6S12, 2005.
G. Lerosey, J. de Rosny, A. Tourin, and M. Fink, "Focusing beyond the diffraction limit with far-field time reversal", Science, vol. 315, pp. 1120-1122, Feb. 2007.
J. de Rosny, G. Lerosey and M. Fink, "Theory of Electromagnetic Time-Reversal Mirrors", IEEE Trans. Antennas Propag., vol. 58, No. 10, pp. 3139-3149, Oct. 2010.
M. Fink, "Time Reversal of Ultrasonic Fields—Part I: Basic Principals", IEEE Trans. Ultrasonics, Ferroelectncs and Freq. Contr., vol. 39, No. 5, pp. 555-566, Sep. 1992.

F. Wu, J.L. Thomas, and M. Fink, "Time Reversal of Ultrasonic Fields—Part II: Experimental Results", IEEE Trans. Ultrasonics, Ferroelectrics and Freq. Contr., vol. 39, No. 5, pp. 567-578, Sep. 1992.
M. Fink, C. Prada, F. Wu, and D. Cassereau, "Self focusing in inhomogeneous media with time reversal acoustic mirrors," IEEE Ultrasonics Symposium, vol. 1, pp. 681-686, 1989.
G. Montaldo, G. Lerosey, A. Derode, A. Tourin, J. de Rosny, and M. Fink, "Telecommunication in a disordered environment with iterative time reversal," Waves Random Media, vol. 14, pp. 287-302, May 2004.
M. Fink, "Time-Reversal Mirrors", J. Phys. D: Appl. Phys., vol. 26, pp. 1333-1350, 1993.
M. Fink, "Time-Reversed Acoustics", Scientific American, pp. 91-97, Nov. 1999.
F. Han, Y.H. Yang, B. Wang, Y. Wu, K.J.R. Liu, "Time-reversal division multiple access in multi-path channels," Global Telecommunications Conference, pp. 1-5 (2011).
F. Han and K.J.R. Liu, "An Interference Cancellation Scheme for the Multiuser TRDMA Uplink System," Global Telecommunications Conference, pp. 3583-3588 (2013).
F. Han, Y.H. Yang, B. Wang, Y. Wu, K.J.R. Liu, "Time-reversal division multiple access over multi-path channels," IEEE Transactions on Communications, vol. 60(7):1953-1965 (Jul. 2012).
F. Han and K.J.R. Liu, "A multiuser TRDMA uplink system with 2D parallel interference cancellation," IEEE Transactions on Communications, vol. 62(3):1011-1022 (Mar. 2014).
B.E. Henty and D.D. Stancil, "Multipath-Enabled Super-Resolution for rf and Microwave Communication using Phase-Conjugate Arrays", Phys. Rev. Lett., vol. 93, 243904, Dec. 2004.
A.Khalegi, G. El Zein and I. Navqi, "Demonstration of Time-Reversal in Indoor Ultra-Wideband Communication: Time Domain Measurement", IEEE Proc. of ISWCS, pp. 465-468, 2007.
W.A. Kuperman, W.S. Hodgkiss, H.C. Song, T. Akal, C. Ferla, D.R. Jackson, "Phase conjugation in the ocean: Experimental demonstration pf an acoustic time-reversal mirror", J. Acoust. Soc. Am., vol. 103, No. 1, pp. 25-40, Jan. 1998.
Kyritsi, P. et al., "Time reversal and zero-forcing equalization for fixed wireless access channels," 39th Asilomar Conference on Signals, Systems and Computers, pp. 1297-1301 (2005).
Kyritsi, P. et al., "Time reversal techniques for wireless communications," IEEE Vehicular Technology Conference, vol. 1:47-51 (2004).
P. Kyritsi and G. Papanicolau, "One-bit Time Reversal for WLAN Applications", IEEE 16th Intern. Symp. on Personal, Indoor and Mobile Radio Comm., pp. 532-536, 2005.
Lienard, M. et al., "Focusing gain model of time-reversed signals in dense multipath channels," IEEE Antennas and Wireless Propagation Letters, vol. 11:1064-1067 ( 2012).
H. Ma, F. Han, and K.J.R. Liu, "Interference-Mitigating Broadband Secondary User Downlink System: A Time-Reversal Solution", Global Telecommunications Conference, pp. 884-889, (2013).
Jin, Yuanwei et al., "Adaptive time reversal beamforming in dense multipath communication networks," 2008 42nd Asilomar Conference on Signals, Systems and Computers, pp. 2027-2031 (Oct. 2008).
J.M.F. Moura and Y. Jin, "Detection by Time Reversal: Single Antenna", IEEE Trans. on Signal Process., vol. 55, No. 1, Jan. 2007.
J.M.F. Moura and Y. Jin, "Time Reversal Imaging by Adaptive Interference Canceling", IEEE Trans. on Signal Process., vol. 56, No. 1, Jan. 2008.
JY. Jin and .M.F. Moura, "Time Reversal Detection Using Antenna Arrays", IEEE Trans. on Signal Process., vol. 57, No. 4, Apr. 2009.
I.H. Naqvi, P. Besnier and G. El Zein, "Effects of Time Variant Channel on a Time Reversal UWB System", Global Telecommunications Conference, (2009).
I.H. Naqvi, A. Khaleghi and G. El Zein, "Performance Enhancement of Multiuser Time Reversal UWB Communication System", Proc. of IEEE ISWCS, pp. 567-571, 2007.
H.T. Nguyen, "Partial one bit time reversal for UWB impulse radio multi-user communications", IEEE Proc. of ICCE, 2008.

(56) References Cited

OTHER PUBLICATIONS

T.K. Nguyen, H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.
H. Nguyen, Z. Zhao, F. Zheng and T. Kaiser, "On the MSI Mitigation for MIMO UWB Time Reversal Systems", Proc. of IEEE International Conference on Ultra-Wideband, pp. 295-299, 2009.
T.K. Nguyen, H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.
Nguyen, H. T. et al., "A time reversal transmission approach for multiuser UWB communications," IEEE Transactions on Antennas and Propagation, vol. 54: 3216-3224 (Nov. 2006).
H. Nguyen, Z. Zhao, F. Zheng, and T. Kaiser, "Preequalizer Design for Spatial Multiplexing SIMO-UWB TR Systems", IEEE Trans. on Vehicular Tech., vol. 59, No. 8, Oct. 2010.
H. Nguyen, F. Zheng, and T. Kaiser, "Antenna Selection for Time Reversal MIMO UWB Systems", IEEE Vehicle Technology Conference, pp. 1-5, 2009.
H.T. Nguyen, "On the performance of one bit time reversal for multi-user wireless communications", IEEE Proc. of ISWCS, pp. 672-676, 2007.
C. Oestges A.D. Kim, G. Papanicolaou, and A.J. Paulraj, "Characterization of Space-Time Focusing in Time Reversed Random Fields", IEEE Trans. Antennas and Propag., pp. 1-9, 2005.
A. Parvulescu and C.S. Clay, "Reproducibility of Signal Transmissions in the Ocean", The Radio and Electronic Engineer, pp. 223-228, Apr. 1965.
D.T. Phan-Huy, S.B. Halima, M. Helard, "Frequency Division Duplex Time Reversal", Global Telecommunications Conference, (2011).
D. Porcino, "Ultra-Wideband Radio Technology: Potential and Challenges Ahead", IEEE Communications Mag., pp. 66-74, Jul. 2003.
Qiu, R. C. et al., "Time reversal with miso for ultra-wideband communications: Experimental results," IEEE Antenna and Wireless Propagation Letters, vol. 5:269-273 (2006).
N. Guo, B.M. Sadler and R.C. Qiu, "Reduced-Complexity UWB Time-Reversal Techniques and Experimental Results", IEEE Trans. on Wireless Comm., vol. 6, No. 12, Dec. 2007.
D. Rouseff, D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.
H. Saghir, M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.
H.C. Song, W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.
H.C. Song, W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.
T. Strohmer, M. Emami, J. Hansen, G. Papanicolaou and A.J. Paulraj, "Application of TimeReversal with MMSE Equalizer to UWB Communications", Global Telecommunications Conference, pp. 3123-3127, (2004).
Wang, B. et al., "Green wireless communications: A time-reversal paradigm," IEEE Journal of Selected Areas in Communications, vol. 29:1698-1710 (2011).
S.Q. Xiao, J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.
Yang, Yu-Han et al., "Near-optimal waveform design for sum rate optimization in time-reversal multiuser downlink systems," vol. 12(1):346-357 (Jan. 2013).

Y.H. Yang, B. Wang and K.J.R. Liu, "Waveform Design for Sum Rate Optimization in Time-Reversal Multiuser Downlink Systems", Global Telecommunications Conference, (2011).
X. Zhou, P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.
J.P. Rode, M.J. Hsu, D. Smith and A. Hussain, "Collaborative Beamfocusing Radio (COBRA)", Proc. of SPIE, vol. 8753, pp. 87530J-1-87530J-11, 2013.
Y.H. Yang, "Waveform Design and Network Selection in Wideband Small Cell Networks", University of Maryland Ph. D. Thesis, 2013.
Chen, Y., Yang, Y.-H., Han, F., Liu, K. J. R., "Time-Reversal Wideband Communications", IEEE Signal Processing Letters, vol. 20, No. 12, Dec. 2013.
Daniels, R. C., Heath, Jr., R.W., "Improving on Time-Reversal with MISO precoding", IWS 2005/WPMC05, Aalborg, Denmark, 2005.
Edelmann, G.F., Akal, T., Hodgkiss, W. S., Kim, S., Kuperman, W. A., Song, H. C., "An Initial Demonstration of Underwater Acoustic Communication Using Time Reversal", IEEE Journal of Oceanic Engineering, vol. 27, No. 3, Jul. 2002.
Han, F., Liu, K.J.R., "A multiuser TRDMA uplink system with 2D parallel interference cancellation", IEEE Trans. Communications, vol. 62(3):1011-1022, Mar. 2014.
Han, F., Yang, Y.-H., Wang, B., Wu, Y., Liu, K.J.R., "Time-reversal division multiple access in multi-path channels", IEEE Globecom, Houston, Dec. 2011.
Han, F., Yang, Y-H., Wang, B., Y. Wu, K.J.R. Liu, "Time-reversal division multiple access over multi-path channels", IEEE Trans. on Communications, vol. 60:1953-1965, Jul. 2012.
Han, Y., Chen, Y., and Liu, K.J.R, 'Time-Reversal with Limited Signature Precision: Tradeoff Between Complexity and Performance', Proc. IEEE Global Conference on Signal and Information Processing (GlobalSIP), Atlanta, Dec. 2014.
Jin, Y., Moura, J., "Time-Reversal Detection Using Antenna Arrays", IEEE Trans. Signal Processing, vol. 57(4):1396-1414, Apr. 2009.
Kyritsi, P., Papanicolaou, G., Eggers, P., Oprea, A., "Time reversal techniques for wireless communications", IEEE VTC, vol. 1, pp. 47-51, Sep. 2004.
Kyritsi, P., Stoica, P., Papanicolaou, G., Eggers, P., Oprea, A., "Time reversal and zero-forcing equalization for fixed wireless access channels", $39^{th}$ Asilomar Conference on Signals, Systems and Computers, 2005.
Lienard, M., Degauque, P., Degardin, V., Vin, I., "Focusing gain model of time-reversed signals in dense multipath channels", IEEE Antennas and Wireless Propagation Letters, vol. 11, 1064-1067, 2012.
Montaldo, G., Lerosey, G., Derode, A., Tourin, A., de Rosny, J., Fink, M., "Telecommunication in a disordered environment with iterative time reversal", Waves Random Media, vol. 14:287-302, 2004.
Nguyen, H.T., Kovacs, I.Z., Eggers, P.C.F., "A time reversal transmission approach for multiuser UWB communications", IEEE Trans. Antennas and Propagation, vol. 54(11), Nov. 2006.
Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.
Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs. IT], Jun. 18, 2015.
Wang B., Y. Wu, F. Han, Y-H Yang, K.J.R. Liu, "Green Wireless Communications: A Time-Reversal Approach", IEEE Journal on Selected Areas in Communications, vol. 29(8):1698-1710, Sep. 2011.
Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.

(56) References Cited

OTHER PUBLICATIONS

Yang, Y-H, Wang, B., Lin, W.S., Liu, K.J.R., "Near-Optimal Waveform Design for Sum Rate Optimization in Time-Reversal Multiuser Downlink Systems", IEEE Trans Wireless Communications, vol. 12(1):346-357, Jan. 2013.

* cited by examiner

WAVEFORM DESIGN FOR TIME-REVERSAL SYSTEMS

TECHNICAL FIELD

This disclosure generally relates to waveform design for time-reversal systems.

BACKGROUND

In time-reversal communication systems, when a transceiver A intends to transmit information to a transceiver B, transceiver B first sends a delta-like pilot pulse that propagates through a scattering and multi-path environment, and the signals are received by transceiver A. Transceiver A transmits time-reversed signals back through the same channel to transceiver B. Based on channel reciprocity, a time-reversal communication system leverages the multi-path channel as a matched filter, i.e., treats the environment as a facilitating matched filter computing machine, and focuses the wave at the receiver in both space and time domains.

SUMMARY

Methods, systems, and program products for designing waveforms that optimize sum rate in time-reversal multiuser downlink systems are described.

In one aspect, a method for communication includes, at a transmitter, receiving channel impulse response signals derived from impulse signals sent from two or more receivers, each impulse signal being sent from one of the receivers to the transmitter through multiple propagation paths; determining downlink waveforms for the two or more receivers to increase a weighted sum-rate under a total power constraint, the downlink waveforms being determined based on time-reversed channel impulse response signals and initial virtual uplink power allocation coefficients; determining updated virtual uplink power allocation coefficients based on the downlink waveforms; and determining downlink power allocation coefficients based on the downlink waveforms and the virtual uplink power allocation coefficients.

Implementations of the method can include one or more of the following features. The method can include determining virtual uplink signal-to-interference-and-noise ratios (SINRs) based on the virtual uplink power allocation coefficients, and determining the downlink power allocation coefficients based on the virtual uplink SINRs. The virtual uplink SINRs can take into account both inter-symbol interference (ISI) and inter-user interference (IUI). Increasing the weighted sum-rate can also reduce a combination of the inter-symbol interference and the inter-user interference. The method can include transmitting, from the transmitter to the receivers, a downlink signal derived from a combination of the downlink waveforms and taking into account the downlink power allocation coefficients, the downlink signal being transmitted to each of the receivers through multiple propagation paths. The downlink signal can be configured to enable each receiver to receive multipath signals that can be used determine a data signal intended for the receiver, different receivers receiving the downlink signal through different propagation paths and determining different data signals, in which the downlink signal is configured to reduce inter-symbol interference (ISI) and inter-user interference (IUI) for the data signals determined at the receivers. Determining the downlink waveforms and the virtual uplink power allocation coefficients can include iteratively determining updated downlink waveforms based on previously determined virtual uplink power allocation coefficients, and determining updated virtual uplink power allocation coefficients based on previously determined downlink waveforms. Determining downlink waveforms can include determining downlink waveforms to maximize the weighted sum-rate under the total power constraint. Determining downlink waveforms can include determining minimum mean squared error (MMSE) waveforms.

In one aspect, a method of communication between a transmitter and multiple receivers using multi-path signals is provided. The method includes at the transmitter, iteratively determining downlink waveforms and determining virtual uplink power allocation coefficients to increase a weighted sum-rate under a total power constraint until a predetermined condition is met, the determination of downlink waveforms and the virtual uplink power allocation coefficients being based on virtual uplink signal-to-interference-and-noise ratios (SINRs) that take into account both inter-symbol interference (ISI) and inter-user interference (IUI), in which the uplink waveforms and virtual uplink power allocation coefficients are selected to reduce a combination of inter-symbol interference and inter-user interference; and determining downlink power allocation coefficients based on the downlink waveforms and virtual uplink power allocation coefficients.

Implementations of the method can include one or more of the following features. The method can include determining updated virtual uplink signal-to-interference-and-noise ratios (SINRs) based on the downlink waveforms and virtual uplink power allocation coefficients, and determining the downlink power allocation coefficients based on the updated virtual uplink SINRs. The downlink waveforms can be determined based on time-reversed channel impulse response signals, each channel impulse response signal can be derived from an impulse signal sent from one of the receivers to the transmitter through multiple propagation paths. The method can include transmitting, from the transmitter to the receivers, a downlink signal derived from a combination of the downlink waveforms, the downlink signal being transmitted to each of the receivers through multiple propagation paths. The downlink signal can be configured to enable each receiver to receive multipath signals that can be used determine a data signal intended for the receiver, different receivers receiving the downlink signal through different propagation paths and determining different data signals, in which the downlink signal can be configured to reduce inter-symbol interference (ISI) and inter-user interference (IUI) for the data signals determined at the receivers. The virtual uplink waveforms can be selected to maximize the weighted sum-rate under the total power constraint. The virtual uplink waveforms can include minimum mean squared error (MMSE) waveforms. The predetermined condition can be met when a convergence condition of the virtual uplink power allocation coefficients is met or a predetermined number of iterations are completed.

In one aspect, an apparatus for communication includes a time-reversed response unit to receive channel impulse response signals and generate respectively time-reversed channel impulse response signals; and a waveform design unit. The waveform design unit is configured to determine downlink waveforms for two or more receivers to increase a weighted sum-rate under a total power constraint, the downlink waveforms being determined based on the time-reversed channel impulse response signals and initial virtual uplink power allocation coefficients, determine updated virtual uplink power allocation coefficients based on the downlink waveforms, determine downlink power allocation coefficients based on the downlink waveforms and the virtual uplink power allocation coefficients, and generate a downlink signal derived from the downlink waveforms, the downlink power allocation coefficients, and intended data for respective receivers.

In one aspect, an apparatus for communication includes a storage device to store instructions; and a data processor to execute the instructions to implement a process that includes receiving channel impulse response signals, generating time-reversed channel impulse response signals based on the channel impulse response signals, determining downlink waveforms for two or more receivers to increase a weighted sum-rate under a total power constraint, the downlink waveforms being determined based on the time-reversed channel impulse response signals and initial virtual uplink power allocation coefficients, determining updated virtual uplink power allocation coefficients based on the downlink waveforms, determining downlink power allocation coefficients based on the downlink waveforms and the virtual uplink power allocation coefficients, and generating a downlink signal derived from the downlink waveforms, the downlink power allocation coefficients, and intended data for respective receivers.

In one aspect, a machine-readable medium is provided for storing instructions that when read by a machine causes the machine to perform operations including receiving channel impulse response signals derived from impulse signals sent from two or more receivers, each impulse signal being sent from one of the receivers to a transmitter through multiple propagation paths; determining downlink waveforms for the two or more receivers to increase a weighted sum-rate under a total power constraint, the downlink waveforms being determined based on time-reversed channel impulse response signals and initial virtual uplink power allocation coefficients; determining updated virtual uplink power allocation coefficients based on the downlink waveforms; and determining downlink power allocation coefficients based on the downlink waveforms and the virtual uplink power allocation coefficients.

In one aspect, a method for communication includes at a transmitter having multiple transmit antennas, receiving channel impulse response signals derived from impulse signals sent from two or more receivers, each impulse signal being sent from one of the receivers to the transmitter through multiple propagation paths; determining virtual uplink waveforms based on initial virtual uplink power allocation coefficients and initial downlink waveforms; determining updated virtual uplink power allocation coefficients based on the virtual uplink waveforms, the initial downlink waveforms, and initial downlink power allocation coefficients; determining updated downlink waveforms based on the virtual uplink waveforms and the updated virtual uplink power allocation coefficients; and determining updated downlink power allocation coefficients based on the updated downlink waveforms, the virtual uplink waveforms, and the updated virtual uplink power allocation coefficients.

Implementations of the method can include one or more of the following features. The updated virtual uplink power allocation coefficients can be determined according to an iterative power waterfilling process. The updated downlink power allocation coefficients can be determined according to an iterative power waterfilling process. The method can include iteratively determining updated virtual uplink waveforms, determining updated virtual uplink power allocation coefficients, determining updated downlink waveforms, and determining updated downlink power allocation coefficients until at least one of a convergence condition is satisfied or a predetermined number of iteration is completed. The updated virtual uplink power allocation coefficients can be selected to reduce a combination of inter-symbol interference and inter-user interference. The updated downlink power allocation coefficients can be selected to reduce a combination of inter-symbol interference and inter-user interference. The method can include transmitting, from the multiple transmit antennas to the receivers, downlink signals each derived from a combination of the downlink waveforms, each downlink signal being transmitted to each of the receivers through multiple propagation paths.

In one aspect, a method of communication between a transmitter and multiple receivers using multi-path signals is provided. The transmitter has multiple transmit antennas and each receiver has multiple receive antennas. The method includes at the transmitter, iteratively determining virtual uplink waveforms, determining virtual uplink power allocation coefficients, determining downlink waveforms, and determining downlink power allocation coefficients until a predetermined condition is met, in which the virtual uplink waveforms, the virtual uplink power allocation coefficients, the downlink waveforms, and the downlink power allocation coefficients are selected to reduce a combination of inter-symbol interference and inter-user interference. The method includes transmitting, from the multiple transmit antennas to the multiple receive antennas of the multiple receivers, downlink signals each derived from a combination of the downlink waveforms, each downlink signal being transmitted from a respective transmit antenna to each of the receive antennas through multiple propagation paths. Implementations of the method can include one or more of the following features. The downlink signals can be configured to enable each receiver to receive multipath signals that can be used determine a data signal intended for the receiver, different receivers receiving the downlink signals through different propagation paths and determining different data signals, wherein the downlink signals are configured to reduce inter-symbol interference (ISI) and inter-user interference (IUI) for the data signals determined at the receivers. The virtual uplink power allocation coefficients can be determined according to an iterative power waterfilling process. The downlink power allocation coefficients can be determined according to an iterative power waterfilling process. The predetermined condition can be met when a convergence condition is satisfied or a predetermined number of iterations are completed. The virtual uplink power allocation coefficients can be selected to reduce a combination of inter-symbol interference and inter-user interference. The downlink power allocation coefficients can be selected to reduce a combination of inter-symbol interference and inter-user interference.

In one aspect, an apparatus for communication includes multiple transmit antennas; a time-reversed response unit to receive channel impulse response signals and generate respectively time-reversed channel impulse response signals; and a waveform design unit. The waveform design unit is configured to determine virtual uplink waveforms based on initial virtual uplink power allocation coefficients and initial downlink waveforms; determine updated virtual uplink power allocation coefficients based on the virtual uplink waveforms, the initial downlink waveforms, and initial downlink power allocation coefficients; determine updated downlink waveforms based on the virtual uplink waveforms and the updated virtual uplink power allocation coefficients; and determine updated downlink power allocation coefficients based on the updated downlink waveforms, the virtual uplink waveforms, and the updated virtual uplink power allocation coefficients.

In one aspect, an apparatus for communication includes a storage device to store instructions; and a data processor to execute the instructions to implement a process that includes receiving channel impulse response signals derived from impulse signals sent from two or more receivers, each impulse signal being sent from one of the receivers to the transmitter through multiple propagation paths; determining virtual uplink waveforms based on initial virtual uplink power allocation coefficients and initial downlink waveforms; determining updated virtual uplink power allocation coefficients based on the virtual uplink waveforms, the initial downlink waveforms, and initial downlink power allocation coefficients; determining updated downlink waveforms based on the virtual uplink waveforms and the updated virtual uplink power allocation coefficients; and determining updated downlink power allocation coefficients based on the updated downlink waveforms, the virtual uplink waveforms, and the updated virtual uplink power allocation coefficients.

In one aspect, a machine-readable medium is provided for storing instructions that when read by a machine causes the machine to perform operations including receiving channel impulse response signals derived from impulse signals sent from two or more receivers, each impulse signal being sent from one of the receivers to the transmitter through multiple propagation paths; determining virtual uplink waveforms based on initial virtual uplink power allocation coefficients and initial downlink waveforms; determining updated virtual uplink power allocation coefficients based on the virtual uplink waveforms, the initial downlink waveforms, and initial downlink power allocation coefficients; determining updated downlink waveforms based on the virtual uplink waveforms and the updated virtual uplink power allocation coefficients; and determining updated downlink power allocation coefficients based on the updated downlink waveforms, the virtual uplink waveforms, and the updated virtual uplink power allocation coefficients.

In some examples, using waveforms that optimize sum rate in time-reversal multiuser downlink systems may achieve one or more of the following advantages. The inter-symbol interference and inter-user interference can be reduced, reducing radio pollution to unintended users and improving performance metrics. A large number of transmitters and receivers can co-exist in the same environment, such as in the same room, floor, building, or street block. Because the interference is reduced, transmit power can also be reduced, improving energy efficiency. Wireless devices that use batteries can operate for a longer period of time before the batteries need to be replaced or recharged. Some wireless devices may be powered by photovoltaic cells illuminated by indoor lighting. The computation required to determine the waveforms is simple so that the transceivers can be manufactured at low costs.

The details of one or more implementations of using waveforms that optimize sum rate in time-reversal multiuser downlink systems are set forth in the accompanying drawings and the description below. Other features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
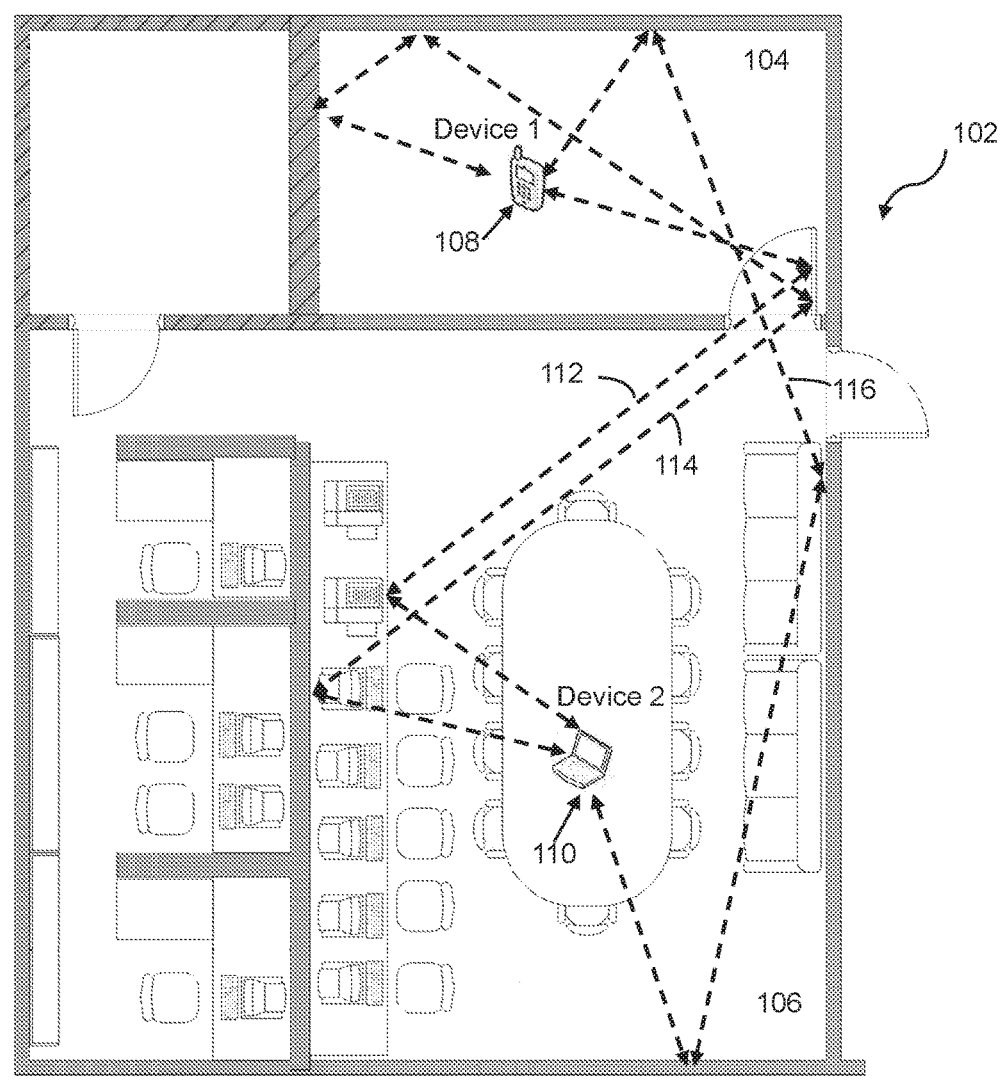
FIG. 1 is a diagram showing an exemplary environment for operating a time-reversal system.

The following provides an overview of a time-reversal multiuser downlink system. Referring to FIG. 1, a time-reversal system can be used in an environment having structures or objects that may cause one or more reflections of wireless signals. For example, a venue 102 may have a first room 104 and a second room 106. When a first device 108 in the first room 104 transmits a signal to a second device 110 in the second room 106, the signal can propagate in several directions and reach the second device 110 by traveling through several propagation paths, e.g., 112, 114, and 116. The signal traveling through multiple propagation paths is referred to as a multipath signal. As the signal travel through the propagation paths, the signal may become distorted and noise may be added. The multipath signal received by the second device 110 can be quite different from the signal transmitted by the first device 108.

Figure 2A:
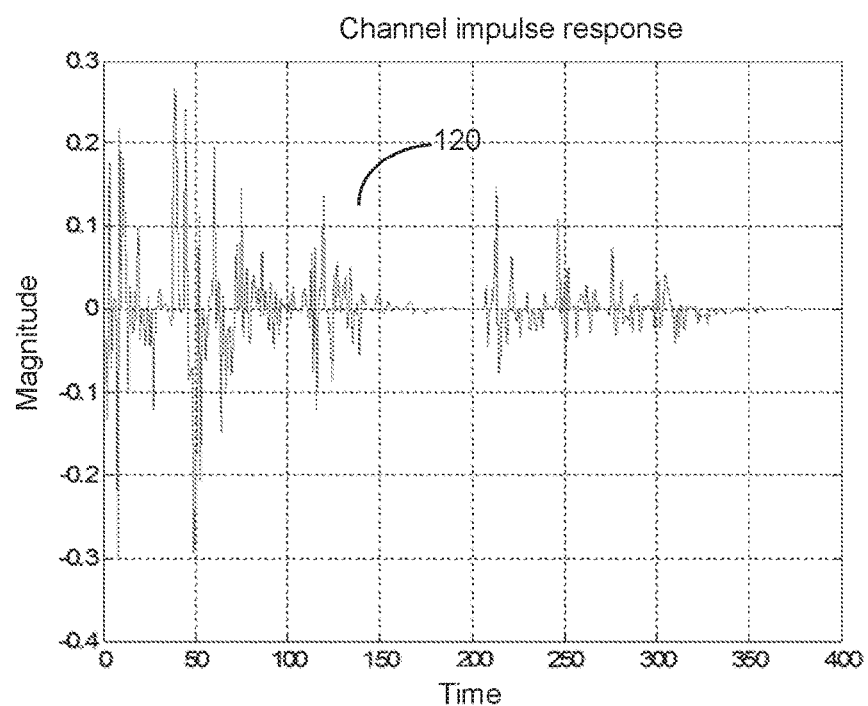
FIG. 2A is a graph of an exemplary recorded channel impulse response waveform.

For example, referring to FIG. 2A, when the first device 108 sends a pulse signal, the signal received by the second device 110 may have a waveform 120. The waveform 120 is referred to as the channel impulse response signal.

Figure 2B:
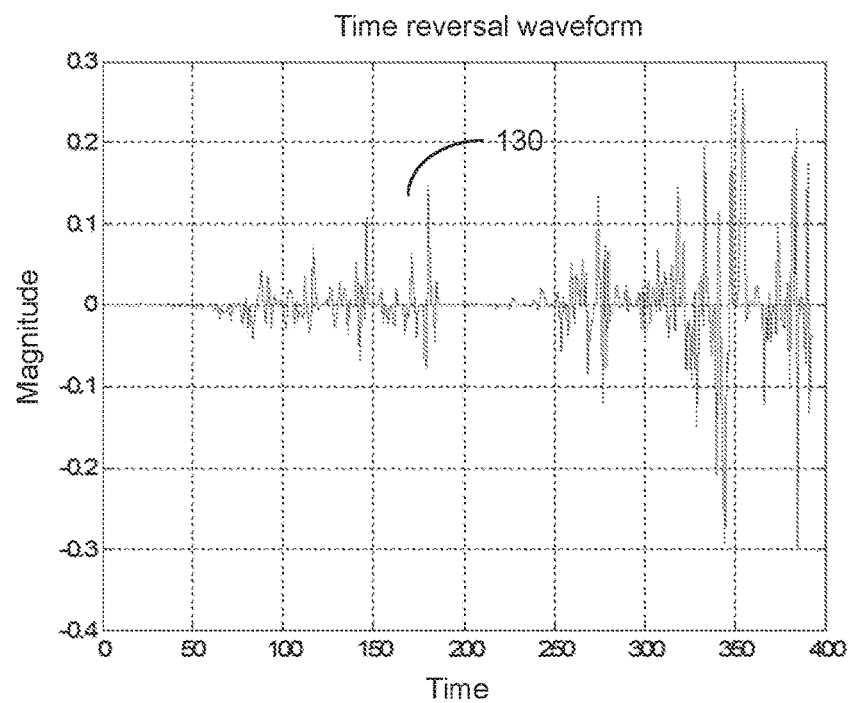
FIG. 2B is a graph of an exemplary time-reversed waveform generated by reversing the waveform of FIG. 2A with respect to time.

Referring to FIG. 2B, a time-reversed waveform 130 can be generated by reversing the waveform 120 with respect to time. If the second device 110 sends a signal having the waveform 130, the signal will propagation in various directions, including through propagation paths 112, 114, and 116 (in reverse direction relative to the propagation direction of the impulse signal), and reach the first device 108. The multipath signal received at the first device 108 forms an impulse signal that is similar to the impulse signal previously sent from the first device 108 to the second device 110.

The waveforms 120 and 130 shown in FIGS. 2A and 2B are merely examples. The waveforms in time-reversal systems can vary depending on, e.g., the environment and the information or data being transmitted.

When the second device 110 intends to transmit a data stream to the first device 108, the second device 110 uses normalized time-reversed conjugate signals as a basic waveform. The second device 110 loads the data stream on the basic waveform, and transmits the signal through the wireless channel. Usually the baud rate is lower than the sampling rate. The signal received at the receiver is the convolution of the transmitted signal and the channel impulse response, plus additive white Gaussian noise. The first device 108 performs a one-tap gain adjustment to the received signal and down-samples it to recover the data stream transmitted by the second device 110.

In some examples a transmitter may send signals to two or more receivers at the same time. The transmitted signal travel through multiple propagation paths to each receiver. Because the receivers are positioned at different locations, the multipath signals travel through different propagation paths to reach the receivers, different multipath signals will be received at different receivers. By carefully constructing the waveform of the signal sent from the transmitter, it is possible to allow each receiver to receive data intended for the receiver with sufficiently high quality.

Figure 3:
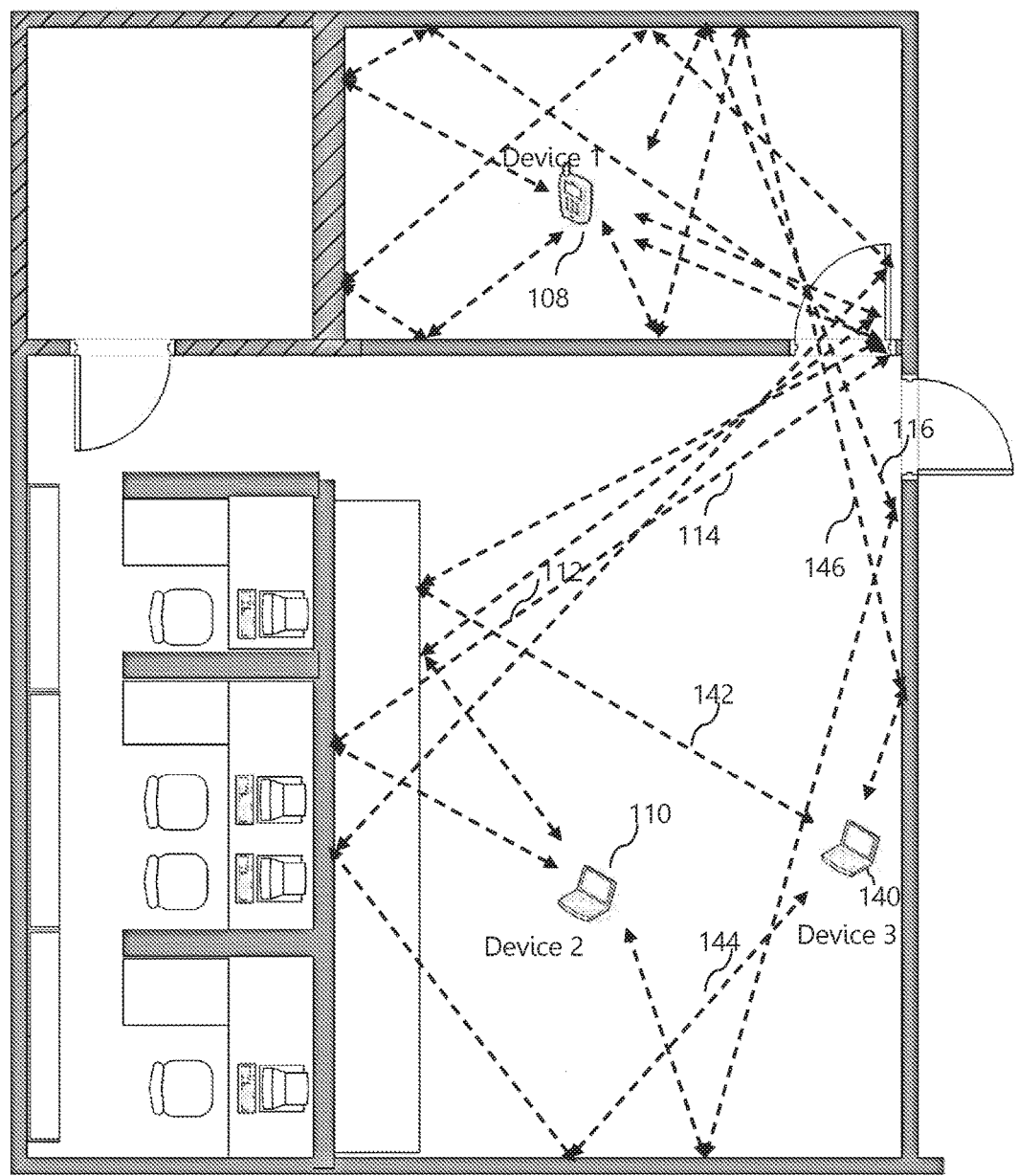
FIG. 3 is a diagram showing an exemplary environment for operating a time-reversal system having multiple receivers.

Referring to FIG. 3, the first device 108 may communicate with the second device 110 and a third device 140. The second device 110 sends an impulse signal that travel through propagation paths 112, 114, and 116 to the first device 108. The first device 108 records the received waveform representing the channel impulse response for the first multipath channel. The third device 110 sends an impulse signal that travels through propagation paths 142, 144, and 146 to the first device 108. The first device 108 records the received waveform representing the channel impulse response for the second multipath channel.

The first device 108 constructs a downlink signal based on a first time-reversed multipath channel impulse response, a second time-reversed multipath channel impulse response, a first data stream intended for the second receiver 110, and a second data stream intended for the third receiver 140. The first device 108 transmits the downlink signal so that a first portion of the downlink signal travels through propagation paths 112, 114, and 116 to reach the second device 110. A second portion of the downlink signal travel through propagation paths 142, 144, and 146 to reach the third device 140. The first signal portion received at the second device 110 forms the first data stream. The second signal portion received at the third device 140 forms the second data stream.

In the example of FIG. 3, the first device 108 transmits two data streams simultaneously to the second device 110 and the third device 140. Using the same principle, the second device 110 can receive channel impulse response signals from the first device 108 and the third device 140, and then transmit two data streams simultaneously to the first device 108 and the third device 140 using waveforms that are determined according to time-reversed channel impulse response signals. The third device 140 can also receive channel impulse response signals from the first device 108 and the second device 110, and then transmit two data streams simultaneously to the first device 108 and the second device 110 using waveforms that are determined according to time-reversed channel impulse response signals. In general, when there are three or more devices, each device can transmit two or more data streams simultaneously to two or more other devices.

In the example of FIG. 3, the device operating as a transmitter may use either an omnidirectional antenna or a directional antenna for broadcasting the downlink signal, as long as the downlink signal reaches each of the receivers through multiple propagation paths.

In some examples, a multiple input multiple output (MIMO) system may be used in which the device operating as a transmitter has multiple transmit antennas, and each of the devices operating as a receiver has multiple receive antennas.

Near-Optimal Waveform Design

The following describes near-optimal waveform design for sum rate optimization in time-reversal multiuser downlink systems. Utilizing channel reciprocity, the traditional time-reversal technique boosts the signal-to-noise ratio at the receiver with low transmitter complexity. The large delay spread may give rise to inter-symbol interference (ISI) when the data rate is high, and the achievable transmission rate may be further degraded in the multiuser downlink due to the inter-user interference (IUI). In this disclosure, we describe a solution to the weighted sum rate optimization problem by designing waveforms in the time-reversal multiuser downlink in which the receiver processing is based on a single sample.

Power allocation has a significant impact on the waveform design problem. This disclosure describes a new power allocation algorithm named "Iterative SINR Waterfilling," which is able to achieve sum rate performance comparable to that of globally optimal power allocation. Also disclosed is another approach called "Iterative Power Waterfilling" for multiple data streams. Iterative SINR Waterfilling provides better performance than Iterative Power Waterfilling in the scenario of high interference, while Iterative Power Waterfilling can work under multiple data streams. Simulation results show the superior performance of the proposed algorithms in comparison with other waveform designs such as zero-forcing and conventional time-reversal waveform.

In some examples, a traditional time-reversal (TR) waveform is able to boost the signal-to-noise ratio at the receiver in a multipath channel. Such a waveform is the time-reverse of the channel impulse response that is transmitted by propagating back through each multipath with channel reciprocity. The environment is used to perform deconvolution for the system.

In broadband communication systems, the traditional time-reversal technique can be viewed as a simple matched-filter of the multipath channel that increases the signal-to-noise ratio (SNR) at the receiver when using single-tap detection. Such a waveform is optimal if only one symbol is transmitted. When the symbol rate is high, large delay spreads of the traditional time-reversal waveform result in severe inter-symbol interference (ISI).

In multiuser downlink communications, one transmitter broadcasts different data streams to many receivers at the same time. Since each receiver is only interested in its own data stream, the unintended data streams introduce inter-user interference (IUI) to each receiver. In multiuser communications, due to the low complexity compared to nonlinear methods, linear transmit waveform design can be adopted to enhance the intended signal and suppress the inter-user interference to maximize the transmission rate. Weighted sum rate is an important design criterion because weighting coefficients provide prioritization among different users in various applications. For example, the weights can be chosen as queue lengths to minimize the risk of buffer overflows, and the equal weights can be used to maximize the achievable sum rate corresponding to the system capacity.

This disclosure describes a new system with single-tap detection that considers both inter-symbol interference and inter-user interference. We describe a near-optimal waveform design to maximize the weighted sum rate by simultaneously suppressing the inter-symbol interference and inter-user interference. The waveform design in the multiuser downlink systems where the receiver processing is based on a single tap is formulated and shown to be similar to the downlink beamforming problem. Beamforming problems with the max-min SINR criteria are convex and thus can be solved optimally, but beamforming for weighted sum rate maximization is known to be a non-convex optimization problem. In this disclosure, we provide an efficient solution to the weighted sum rate maximization problem for multiple data streams. For single data stream, the proposed algorithm is shown to perform better than some traditional methods when there is high interference.

The proposed algorithms are based on the uplink-downlink duality, i.e., the waveform design for the downlink can be obtained using virtual uplink, given any power allocation. However, the power allocation problem for sum rate optimization is non-convex for either uplink or downlink. By exploiting the relation between the allocated power and the SINR targets, we propose a power allocation algorithm called "Iterative SINR Waterfilling," which can achieve comparable performance to the globally-optimal power allocation.

In some implementations, the SINRs are allocated to the users to maximize the weighted sum rate, and with the allocated target SINRs, the corresponding power allocation are determined. For multiple data streams, we also propose an iterative power allocation algorithm called "Iterative Power Waterfilling," which is the multiple-data-stream extension of a modified iterative waterfilling algorithm. Simulation results show that both the proposed approaches significantly outperform traditional waveform designs such as zero-forcing and time-reversal waveforms.

In the following description, the system model and problem formulation are described. We introduce the proposed waveform design which alternately optimizes between calculating the waveform and the power allocation vector. The waveform design for multiple data streams is described. Numerical simulation results are provided to illustrate the performance of our approaches compared with traditional methods.

System Model and Problem Formulation

In a time reversal system, the receiver first sends an impulse signal, which is then received by the transmitter as a channel impulse response. Using the channel impulse response, the transmitter forms the time-reversed waveform and sends data symbols using the time-reversed waveform.

Figure 4:
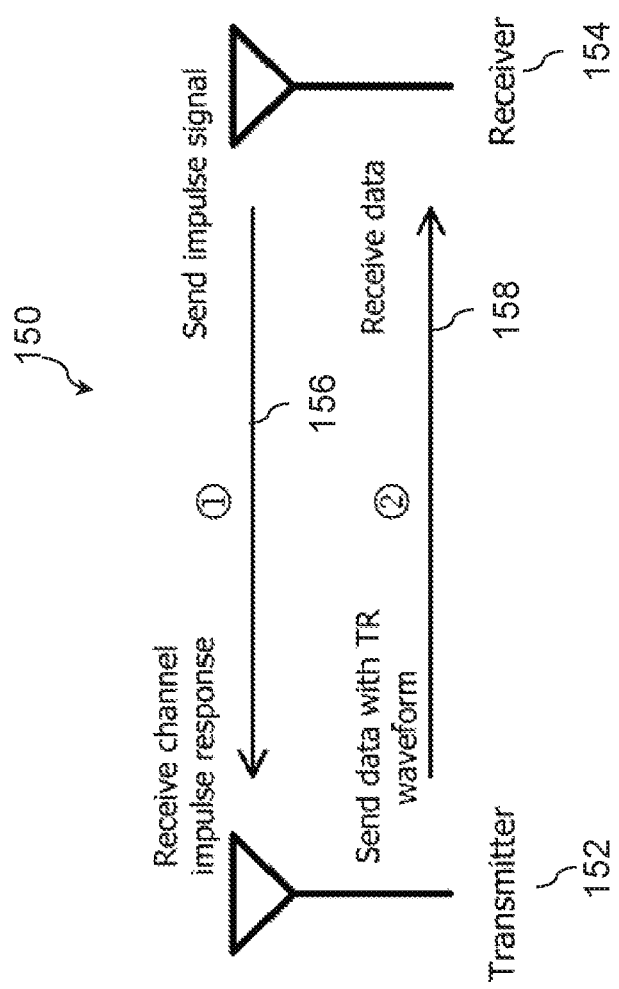
FIG. 4 is a schematic diagram of an exemplary time reversal system.

FIG. 4 shows a schematic diagram of a time reversal system 150. In this example, the system 150 uses multiuser downlink multipath channels with one transmitter 152 and K users each having a receiver 154 (only one receiver is shown in the figure). The receiver 154 first sends (156) an impulse signal to the transmitter 152, which receives the channel impulse response signal. The transmitter 152 then sends (158) data with time reversal waveforms.

The receive signal of the k th user at time m, $y_k[m]$, can be written as $$y_k[m] = \sum_l h_k[m-l]s[l] + n_k[m], \quad \text{(Equ. 1)}$$

where s[m] is the transmit signal and $h_k[m]$ denotes the channel impulse response of user k. The channel length of $h_k[m]$ is denoted by $L_k$, i.e., $h_k[m]=0$ for $m<0$ and $m \geq L_k$. Writing Equation 1 in a matrix form, we have the receive signal vector of the k th user as $$y_k = H_k s + n_k = H_k \left( \sum_{j=1}^{K} u_j \sqrt{p_j}\, x_j \right) + n_k, \quad \text{(Equ. 2)}$$

where $y_k$ is a $(2L-1) \times 1$ vector with $L = \max_k L_k$, $u_j$ is the transmit waveform, $p_j$ is the transmit power allocated to user j, $x_j$ is the intended signal for user j, and $n_k$ is the additive white Gaussian noise (AWGN) with mean zero and variance $\sigma^2$. In Equation 2, $H_k$ is a $(2L-1) \times L$ Toeplitz matrix with each column vector being the shifted version of $\{h_k[m]\}_{m=1}^{L}$.

In the time-reversal communication system, user k estimates the received signal by only $y_k[L]$. Let $H_k^{(l)}$ denote the l th row of $H_k$, the symbol at time slot l for user k as $x_k(l)$, and $[n_k]_L$ as the L th element of $n_k$. The complete characterization of the signal with inter-symbol interference and inter-user interference is given by $$y_k[L] = H_k^{(L)} u_k \sqrt{p_k}\, x_k(L) + H_k^{(L)} \left( \sum_{j=1, j \neq k}^{K} u_j \sqrt{p_j}\, x_j(L) \right) + \quad \text{(Equ. 3)}$$

$$\sum_{l=1, l \neq L}^{2L-1} H_k^{(l)} \left( \sum_{j=1}^{K} u_j \sqrt{p_j} \, x_j(l) \right) + [n_k]_L.$$

Assume that user k only decodes its own current symbol $x_k(L)$ and considers the interferences (inter-user interference and inter-symbol interference) as noise. Then the SINR of user k is given as $$SINR_k^{DL} = \frac{u_k^H R_k^{(1)} u_k p_k}{u_k^H R_k^{(0)} u_k p_k + \sum_{j=1, j \neq k}^{K} u_j^H R_k u_j p_j + \sigma^2}, \quad \text{(Equ. 4)}$$

where $R_k^{(1)} = H_k^{L(H)} H_k^{(L)}$, $R_j = H_j^H H_j$, and $R_k^{(0)} = R_k - R_k^{(1)}$. The superscript DL denotes the downlink. The first term and the second term in the denominator denote inter-symbol interference and inter-user interference, respectively.

In this disclosure, we jointly design the waveform $U = [u_1, \ldots, u_K]$ and power allocation vector $p = [p_1, \ldots, p_K]^T$ to maximize the weighted sum rate subject to a total power constraint $P_{max}$, i.e., $$P_{Rate}^{DL}: \max_{p,U} \sum_{k=1}^{K} \alpha_k \log(1 + SINR_k^{DL}) \quad \text{(Equ. 5)}$$

$$s.t. \ 1^T p \leq P_{max}, u_i^H u_i = 1, p_i \geq 0, \forall i, \quad \text{(Equ. 6)}$$

where $\alpha_k$ denotes the rate weighting coefficient for user k, and 1 is an all-one vector with K elements.

Iterative Algorithm for the Weighted Sum Rate Optimization

In this section, we describe an iterative algorithm for the weighted sum rate optimization in multiuser downlink time-reversal system. Since the waveform design structure is decoupled in the virtual uplink system and the uplink-downlink duality builds a bridge between the two systems, the iterative algorithm first solves the waveform design and power allocation in the virtual uplink system, and then uses the solution to determine the downlink waveforms and power allocation.

The optimal power allocation problem for sum rate maximization is non-convex either in downlink or virtual uplink. In general, solving the global optimum for a non-convex problem requires an exhaustive search, which may be computationally difficult. Hence, we propose an algorithm to efficiently attain a satisfactory near-optimal solution for the non-convex power allocation problem. In the description below, we will show by simulations that the proposed algorithm can reach a solution that is very close to global optimum.

Uplink-Downlink Duality

As shown in Equation 4, the SINR of every user depends on the waveforms of all users, so all users' waveforms have to be jointly designed at the same time. Thus, the waveform design is complicated in the downlink system. With the uplink-downlink duality, the downlink optimal waveform can be individually decided in the virtual uplink with fixed power allocation.

The virtual uplink problem is constructed as follows.

$$P_{Rate}^{UL}: \max_{q,U} \sum_{k=1}^{K} \alpha_k \log(1 + SINR_k^{UL}) \quad \text{(Equ. 7)}$$

$$s.t. \ 1^T q \leq P_{max}, u_i^H u_i = 1, q_i \geq 0, \forall i, \quad \text{(Equ. 8)}$$

where $q = [q_1, \ldots, q_K]^T$ is the power allocation in the virtual uplink, the downlink transmit waveform $\{u_j\}_{j=1}^K$ becomes the uplink receive waveform, and the uplink SINR for user k is $$SINR_k^{UL} = \frac{u_k^H R_k^{(1)} u_k q_k}{u_k^H R_k^{(0)} u_k q_k + \sum_{j=1, j \neq k}^{K} u_k^H R_j u_k q_j + \sigma^2}, \quad \text{(Equ. 9)}$$

where $q_k$ is the transmit power of user k in the virtual uplink, and the superscript UL denotes the virtual uplink. Examining the difference between Equation 4 and 9, we can see that $SINR_k^{UL}$ only depends on one user's waveform $u_k$, and thus the waveform design structure is decoupled in the uplink with the solution given by the generalized eigenvalue problem.

Because the SINR achievable regions are the same for the two dual problems, we develop an iterative algorithm to solve $P_{Rate}^{DL}$ by first solving $P_{Rate}^{UL}$. For given SINR targets $\{\gamma_k\}_{k=1}^K$, the minimum required total power for the downlink and its virtual uplink are the same. On the other hand, given a sum-power constraint $P_{max}$, the achievable SINR region is the same for both the downlink and its virtual uplink. Therefore, the solution for $P_{Rate}^{UL}$ is also the solution for $P_{Rate}^{DL}$. Because it is difficult to directly solve the transmit waveforms $\{u_j\}_{j=1}^K$ in $P_{Rate}^{DL}$, the proposed algorithm iterates between computing the waveforms $\{u_j\}_{j=1}^K$ and solving for the uplink power vector q. After the iteration for virtual uplink is completed, the downlink power vector p is then calculated using the waveforms $\{u_j\}_{j=1}^K$ and the virtual uplink power vector q.

Given a fixed power allocation, the optimal waveform design of $\{u_j\}_{j=1}^K$ can be directly derived by leveraging the uplink-downlink duality. Based on this, we can then focus on the design of power allocation. We describe a power allocation algorithm to be employed in the iterative sum rate optimization algorithm. Due to the non-convexity of the problem, to obtain the global optimum may require exhaustive search. The algorithm described here can attain a sub-optimum that is very close to the global optimum in terms of weighted sum rate performance and thus much better than traditional methods such as zero-forcing and time-reversal waveforms. In the following, we describe the waveform design and the power allocation algorithm in detail.

Individual Waveform Design

The $SINR_k^{UL}$ in Equation 9 can also be written as $$SINR_k^{UL} = \frac{q_k u_k^H R_k^{(1)} u_k}{u_k^H \left( q_k R_k^{(0)} + \sum_{j=1, j \neq k}^{K} q_j R_j + \sigma^2 I \right) u_k}, \quad \text{(Equ. 10)}$$

where only $u_k$ is involved and thus $SINR_k^{UL}$ can be optimized by choosing $u_k$ to be the principle eigenvector of the generalized eigenvalue problem, $$(q_k R_k^{(1)})u_k = SINR_k^{UL}\left(q_k R_k^{(0)} + \sum_{j=1, j\neq k}^{K} q_j R_j + \sigma^2 I\right)u_k, \quad \text{(Equ. 11)}$$

This SINR-maximizing waveform is the minimum mean squared error (MMSE) waveform $$u_k^{MMSE} = c_k^{MMSE}\left(\sum_{j=1}^{K} q_j R_j + \sigma^2 I\right)^{-1} H_k^{(1)H}. \quad \text{(Equ. 12)}$$

Here, $c_k^{MMSE}$ is a constant such that the norm of $u_k^{MMSE}$ is normalized to unit. This can be easily verified by substituting Equation 12 into Equation 11, and the corresponding eigenvalue can be obtained as $$SINR_k^{UL} = H_k^{(1)}(q_k R_k^{(0)} + \Sigma_{j=1,j\neq k}^K q_q R_j + \sigma^2 I)^{-1} H_k^{(1)H}.$$

Power Allocation: Iterative SINR Waterfilling

Given fixed $\{u_j\}_{j=1}^K$, the problem $P_{Rate}^{UL}$ becomes solving the power allocation vector q given a sum power constraint $P_{max}$. It can be verified that this problem is non-convex so the global optimal solution is difficult to search. Instead, the power allocation algorithm is designed to efficiently obtain a near-optimal solution.

We describe a new power allocation algorithm called Iterative SINR Waterfilling. A feature of the proposed algorithm is that, instead of directly allocating the power $\{q_k\}_{k=1}^K$, we first allocate the SINRs $\{\gamma_k\}_{k=1}^K$ to maximize the weighted sum rate under the sum power constraint. And then with the allocated SINRs, the power allocation of $\{q_k\}_{k=1}^K$ is established. The conversion to SINR waterfilling changes the objective function to be convex and the feasible region to be non-convex. In the following, it will be seen that such conversion can better capture the structure of interference. The SINR is expressed in terms of the power by $$\gamma_k = SINR_k^{UL} = \frac{u_k^H R_k^{(1)} u_k q_k}{u_k^H R_k^{(0)} u_k q_k + \sum_{j=1, j\neq k}^K u_k^H R_j u_k q_j + \sigma^2}. \quad \text{(Equ. 13)}$$

Let D be a diagonal matrix with $[D]_{kk} = \gamma_k/u_k^H R_k^{(1)} u_k$, and $$[\Phi]_{kj} = \begin{cases} u_j^H R_k u_j, & k \neq j \\ u_k^H R_k^{(0)} u_k, & k = j \end{cases}. \quad \text{(Equ. 14)}$$

On the other hand, rewriting Equation 13, we can represent the power allocation vector q in terms of $\{\gamma_k\}_{k=1}^K$ by $$q = (I - D\Phi^T)^{-1} D\sigma, \quad \text{(Equ. 15)}$$

where $\sigma$ is a K×1 vector of all elements equal to $\sigma^2$. With Equation 15, the power allocations $\{q_k\}_{k=1}^K$ can be obtained from the SINR targets $\{\gamma_k\}_{k=1}^K$.

The weighted sum rate optimization problem in terms of $\{\gamma_k\}_{k=1}^K$ can be reformulated as $$\max_{\gamma_1,\ldots,\gamma_K} \sum_{k=1}^{K} \alpha_k \log(1 + \gamma_k), \quad \text{(Equ. 16)}$$

$$s.t. \ 1^T(I - D\Phi^T)^{-1} D\sigma \leq P_{max}, \quad \text{(Equ. 17)}$$

$$\rho(D\Phi^T) < 1, \quad \text{(Equ. 18)}$$

where $\rho(\cdot)$ denotes the spectral radius. Equation 17 denotes the sum power constraint in terms of $\{\gamma_k\}_{k=1}^K$. The feasibility condition (Equation 18) and the constraint that the obtained power $\{q_k\}_{k=1}^K$ are all non-negative are equivalent to each other. One direction can be shown by observing that in Equation 15, $(I - D\Phi^T)^{-1} = \Sigma_{i=0}^{\infty}(D\Phi^T)^i$ if $\rho(D\Phi^T) < 1$, and the matrix $D\Phi^T$ is element-wise positive.

According to the Karush-Kuhn-Tucker (KKT) conditions, the optimum $\gamma_k$ satisfy $$\gamma_k = \left(\frac{\alpha_k}{\lambda t_k} - 1\right)^+, \quad \text{(Equ. 19)}$$

$$1^T(I - D\Phi^T)^{-1} D\sigma = P_{max}, \quad \text{(Equ. 20)}$$

$$\rho(D\Phi^T) < 1, \quad \text{(Equ. 21)}$$

where $\lambda$ is the KKT multiplier and $$t_k = \frac{u_k^H R_k^{(1)} u_k}{\gamma_k^2} 1^T (I - D\Phi^T)^{-1} De_k e_k^T (I - D\Phi^T)^{-1} D\sigma, \quad \text{(Equ. 22)}$$

and $e_k$ is the k th column of a K×K identity matrix. The term $t_k$ is a function of $\{\gamma_k\}_{k=1}^K$ i.e., it implicitly captures the interference introduced by the SINR allocation.

Since the $\gamma_k$ in Equation 19, $\rho(D\Phi^T)$, and $1^T(I-D\Phi^T)^{-1} D\sigma$ are all monotonic with $\lambda$, the bisection search can be applied to efficiently compute the $\lambda$ such that the power constraint is satisfied. In the one dimensional bisection search, the initial upper bound of $\lambda$ can be set as $\max_k \alpha_k/t_k$ since the SINR targets $\{\gamma_k\}_{k=1}^K$ are all zero for $\lambda$ higher than this value. The lower bound can be set as a small positive number, which corresponds to very large values of $\{\gamma_k\}_{k=1}^K$.

Equation 19 is a waterfilling-like solution with a feasibility constraint (Equation 21) and a nonlinear power constraint (Equation 20). The $t_k$ can be considered as a modification term to the water level due to the effect of the interference. In solving the optimum $\gamma_k$, we can first fix $t_k$, and then SINR target $\gamma_k$ is found by using bisection search for $\lambda$ and substituting $\lambda$ into Equation 19. The new $\gamma_k$ is then used to update $t_k$ as in Equation 22. The procedure is repeated until convergence. The proposed Iterative SINR Waterfilling is summarized in Table 1 below.

We can incorporate a memory term for $\gamma_k$ to slow down the update and the convergence can be improved. In the n th iteration, the $\gamma_k(n)$ can be calculated by $\gamma_k(n) = \beta\gamma_k^{new}(n) + (1-\beta)\gamma_k(n-1)$, where $\gamma_k^{new}(n)$ is the one obtained after the bisection search and $\beta$ is the forgetting factor with $0 < \beta \leq 1$.

TABLE 1

Iterative SINR Waterfilling (i) Given q, initialize $\gamma_k$ with Equation 13.
(ii) Loop:
    Calculate $t_k$ using Equation 22.
    Bisection search $\lambda$ with Equations 19-21, i.e.,
    (a) Set bisection upper bound $\lambda^{max} = \max_k \alpha_k / t_k$,
        and lower bound $\lambda^{min} = \delta > 0$.
    (b) Loop:
        Set $\lambda = \frac{1}{2}(\lambda^{max} + \lambda^{min})$.

Compute $\gamma_k = \left(\frac{\alpha_k}{\lambda t_k} - 1\right)^+$.

If $\rho(D\Phi^T) < 1$ then
            If $1^T(I - D\Phi^T)^{-1} D\sigma < P_{max}$ then
                $\lambda^{max} = \lambda$.
            else
                $\lambda^{min} = \lambda$.
        else
            $\lambda^{min} = \lambda$.
        Until $|1^T(I - D\Phi^T)^{-1} D\sigma - P_{max}| < \epsilon$.
    With $\gamma_k$ obtained in last step, compute q by Equation 15.
Until q converges or the max. number of iterations is reached.

Iterative Sum Rate Optimization

The iterative sum rate optimization algorithm iterates between calculating the waveforms $\{u_j\}_{j=1}^K$ using Equation 12 and the power allocation q using Table 1 in the virtual uplink. The iterative algorithm is not guaranteed to converge. However, in many examples, fast convergence is often observed in the numerical simulation. When the algorithm converges, the obtained solution is a fixed point of Equations 19-22, i.e., the solution satisfies the KKT conditions. In case it does not converge or it takes a long time to converge, the algorithm stops when the maximum number of iterations is reached. The solution obtained in each iteration is always feasible regardless of convergence. Hence, after convergence or the maximum number of iterations is reached, we can compute the corresponding achievable SINR targets $\{\gamma_k\}_{k=1}^K$ and the downlink power allocation p can then be obtained similar to Equation 15, i.e., $$p = (I - D\Phi)^{-1} D\sigma. \quad \text{(Equ. 26)}$$

The weighted sum rate optimization algorithm is summarized in Table 2. After convergence or maximum number of iterations is reached, we take the variables obtained at the last iteration as the solution. The performance may be better if the iterative algorithm keeps track of all passing solutions and chooses the best solution when the maximum number of iterations is reached. However, keeping track of all passing solutions requires a heavy overhead of space complexity but does not contribute much to the averaged performance due to the rareness of the non-converging cases. We have conducted simulations and verified that, in some examples, the performance difference is not perceivable. Hence, concerning the complexity and performance tradeoff, we choose to use the variables obtained at the last iteration instead of keeping track of all passing solutions.

TABLE 2

Iterative Weighted Sum Rate Optimization Algorithm for Single Data Stream (i) Initialize $q_k = P_{max}/K$.
(ii) Loop (uplink optimization):
    Calculate $\{u_j\}_{j=1}^K$ by Equation 12.
    Calculate q using Iterative SINR Waterfilling.
Until q and $\{u_j\}_{j=1}^K$ converges or the max. number of iterations is reached.

TABLE 2-continued

Iterative Weighted Sum Rate Optimization Algorithm for Single Data Stream (iii) Compute $y_k$ by Equation 13.
(iv) Obtain downlink power vector p by Equation 26.

The accuracy of using the virtual uplink to compute the solution of the downlink is commented as follows. Given fixed transmit waveforms $\{u_j\}_{j=1}^K$, the power allocation problems to minimize the required sum power in the uplink and the downlink for achieving certain SINR targets are dual problems. As a consequence, the achievable weighted sum rates of the uplink and the downlink under the same sum power constraint are the same. The solution in the uplink can be transformed into the downlink using Equation 15, where the SINR targets are calculated by the uplink powers using Equation 13, to achieve exactly identical SINRs and thus exactly the same weighted sum rate.

Multiuser MIMO Downlink with Multiple Data Streams

In MIMO time-reversal systems where multiple data streams are transmitted to each user, the transmit waveforms of different data streams have a significant impact on the achievable rates of all users. The Iterative SINR Waterfilling described above is used for systems with single data streams. In the following, we describe the system model and develop an iterative algorithm for the waveform design.

System Model

The transmitter is now equipped with $N_t$ transmit antennas. Each of the K users has $N_{r,k}$ receive antennas. The transmitter is transmitting $M_k$ data streams to user k. The $N_{r,k} \times 1$ receive signal vector of the k th user at time m, $y_k[m]$, can be written as $y_k[m] = \Sigma_l H_k[m-l]s[l] + n_k[m]$, where the $N_t \times 1$ vector s[m] is the transmit signal at time m and the $N_{r,k} \times N_t$ matrices $\{H_k[m]\}_{m=0}^{L-1}$ denote the MIMO channel impulse response of user k at time m. We assume each channel is L-tap. In a matrix form, the receive signal vector of the k th user is given by $$y_k = H_k s + n_k = H_k \left( U_k \sqrt{P_k}\, x_k + \sum_{j \neq k} U_j \sqrt{P_j}\, x_j \right) + n_k, \quad \text{(Equ. 27)}$$

where $y_k = [y_k^T[1], \ldots, y_k^T[2L-1]]^T \in \mathbb{C}^{(2L-1)N_{r,k}}$, and the $M_k \times 1$ vector $x_k$ comprises $M_k$ data streams intended for user k. The matrix $U_k = [U_k^T[1], \ldots, U_k^T[L]]^T \in \mathbb{C}^{LN_t \times M_k}$ is the transmit waveform for user k. The diagonal matrix $P_k = \text{diag}\{p_{k1}, \ldots, p_{km_k}\}$ is the power allocated to the $M_k$ data streams of user k. $n_k \in \mathbb{C}^{(2L-1)N_{r,k}}$ denotes the additive white Gaussian noise and each element of $n_k$ is with zero mean and variance $\sigma_k^2$. The channel $H_k \in \mathbb{C}^{(2L-1)N_{r,k} \times LN_t}$ is a block-Toeplitz matrix in which each sub-block $H_k[m] \in \mathbb{C}^{N_{r,k} \times N_t}$ is the channel matrix of receiver k at time m. That is, $$H_k = \begin{bmatrix} H_k[1] & 0 & \ldots & 0 \\ H_k[2] & H_k[1] & \ldots & 0 \\ \vdots & \vdots & \ddots & \vdots \\ 0 & 0 & \ldots & H_k[1] \end{bmatrix}, \quad \text{(Equ. 28)}$$

In the MIMO time-reversal system, users perform the single-tap detection by considering only the receive signal vector at time L, i.e., $y_k[L]$. Let $H_k^{(l)}$ denote the l th sub-block row of $H_k$, e.g., $H_k^{(L)}=[H_k[L], \ldots, H_k[1]]$. After processing $y_k[L]$ with receive filter $V_k$, the complete characterization of the signal, inter-symbol interference and inter-user interference is given by $$x_k(L)=V_k^H y_k[L] \quad \text{(Equ. 29)}$$

$$= V_k^H H_k^{(L)} U_k \sqrt{P_k} \, x_k(L) + V_k^H H_k^{(L)} \left( \sum_{j=1,j\neq k}^{K} U_j \sqrt{P_j} \, x_j(L) \right) \quad \text{(Equ. 30)}$$

$$+ \sum_{l=1,l\neq L}^{2L-1} V_k^H H_k^{(l)} \left( \sum_{j=1}^{K} U_j \sqrt{P_j} \, x_j(l) \right) + V_k^H n_k[L]. \quad \text{(Equ. 31)}$$

Assume that user k only decodes its own current symbol $x_k(L)$ and considers the interferences (inter-user interference and inter-symbol interference) as noise. Then the rate of user k is given as $$R_k^{DL}=\text{logdet}(I+V_k^H H_k^{(L)} U_k P_k U_k^H H_k^{(L)H} V_k X_k^{-1}), \quad \text{(Equ. 32)}$$

where the superscript DL denotes downlink and the interference matrix $$X_k = \sigma_k^2 V_k^H V_k + \sum_{l=1,l\neq L}^{2L-1} V_k^H H_k^{(l)} U_k P_k U_k^H H_k^{(l)H} V_k + \sum_{j=1,j\neq k}^{K} \sum_{l=1}^{2L-1} V_k^H H_k^{(l)} U_j P_j U_j^H H_k^{(l)H} V_k. \quad \text{(Equ. 33)}$$

The second term of Equation 33 is the inter-symbol interference of user k, and the third term is the inter-user interference from other users' signals.

In the following, we will jointly design the transmit waveforms of the K users $U=[U_1, \ldots, U_K]$ and power allocation $P=\text{diag}\{P_1, \ldots, P_K\}$ to maximize the weighted sum rate $\Sigma_{k=1}^K \alpha_k R_k^{DL}$ subject to a total power constraint $P_{max}$, i.e., $$P_{Rate}^{DL}: \max_{P,U} \sum_{k=1}^{K} \alpha_k R_k^{DL} \quad \text{(Equ. 34)}$$
$$\text{s.t.} \quad tr(P) \leq P_{max},$$

where $\alpha_k$ denotes the rate weighting coefficient for user k.

Uplink-Downlink Duality for Multiple Data Streams

In Equations 32 and 33, all the waveforms $\{U_j\}_{j=1}^K$ are involved in $R_k$, so the waveform design is complicated in the downlink. With the uplink-downlink duality for multiple data streams [17], the downlink optimal waveform can be found in the virtual uplink with fixed power allocation. The sum rate optimization problem in the virtual uplink is constructed as follows.

$$P_{Rate}^{UL}: \max_{Q,U} \sum_{k=1}^{K} \alpha_k R_k^{UL} \quad \text{(Equ. 35)}$$

$$\text{s.t.} \quad tr(Q) \leq P_{max} \quad \text{(Equ. 36)}$$

where $Q=\text{diag}\{Q_1, \ldots, Q_K\}$ is the power allocation in the virtual uplink, the downlink transmit waveform U is equivalent to the uplink receive waveform, and the uplink transmission rate for user k is $$R_k^{UL}=\text{logdet}(I+U_k^H H_k^{(L)H} V_k Q_k V_k^H H_k^{(L)H} U_k Y_k^{-1}), \quad \text{(Equ. 37)}$$

where the superscript UL denotes the virtual uplink, and the interference matrix $$Y_k = \sigma_k^2 U_k^H U_k + \sum_{l=1,l\neq L}^{2L-1} U_k^H H_k^{(l)H} V_k Q_k V_k^H H_k^{(l)H} U_k + \sum_{j=1,j\neq k}^{K} \sum_{l=1}^{2L-1} U_k^H H_k^{(l)H} V_j Q_j V_j^H H_k^{(l)H} U_k. \quad \text{(Equ. 38)}$$

Because under minimum mean squared error receive filtering the SINR achievable regions of the two dual problems are the same for multiple data streams, we develop an iterative algorithm to compute the transmit waveform U and the uplink power Q in the virtual uplink, and calculate the receive waveform V and the downlink power P in the downlink. In the following, we describe the waveform design and the power allocation algorithm in detail.

Individual Waveform Design for Multiple Data Streams

As discussed above, under minimum mean squared error receive filtering the SINR achievable regions of the two dual problems are the same. In the following we introduce the minimum mean squared error receive filter.

Given the power allocation matrix P and transmit waveform U, the minimum mean squared error receive filter for the downlink can be derived as $$V_k=(H_k^{(L)} U_k P_k U_k^H H_k^{(L)H}+X_k)^{-1} H_k^{(L)} U_k \sqrt{P_k} \quad \text{(Equ. 39)}$$

Similarly, for the virtual uplink, given the power allocation Q and transmit filter V, the minimum mean squared error receive filter is given by $$U_k=(H_k^{(L)H} V_k Q_k V_k^H H_k^{(L)}+Y_k)^{-1} H_k^{(L)H} V_k \sqrt{Q_k}. \quad \text{(Equ. 40)}$$

Power Allocation for Multiple Data Streams: Iterative Power Waterfilling

The following describes the proposed power allocation algorithm for multiple data streams. This algorithm is the multiple-data-stream extension of the modified iterative waterfilling. For multiple data streams, we cannot obtain the power allocation vector by allocating the SINR targets since there may be multiple solutions satisfying the same SINR targets. Thus, we directly allocate the power allocation vector.

Given the transmit waveforms $U_k$, the power allocation problem can be written as $$\max_{\{P_k\}} \sum_{k=1}^{K} \alpha_k R_k \quad \text{(Equ. 41)}$$

$$\text{s.t.} \quad \sum_{k=1}^{K} tr(P_k) \leq P_{max}$$

$$P_k \geq 0, \forall k.$$

Taking derivative on the Lagrangian with respect to $p_{kl}$, $1 \leq l \leq M_k$, we have $$\frac{\alpha_k}{z_{kl}^{-1}+p_{kl}} - t_{kl} = \lambda - \mu_{kl}. \quad \text{(Equ. 42)}$$

where $$z_{kl} = e_l^T \Phi_{k,k,L}^H \left( X_k + \sum_{m=1, m \neq l}^{L_k} p_{km} \Phi_{k,k,L} e_m e_m^T \Phi_{k,k,L}^H \right)^{-1} \Phi_{k,k,L} e_l, \quad \text{(Equ. 43)}$$

and $$t_{kl} = \alpha_k \sum_{i=1, i \neq L}^{2L-1} e_l^T \Phi_{k,k,i}^H (X_k + \Phi_{k,k,L} P_k \Phi_{k,k,L}^H)^{-1}$$

$$\Phi_{k,k,L} P_k \Phi_{k,k,L}^H X_k^{-1} \Phi_{k,k,i} e_l +$$

$$\sum_{j=1, j \neq k}^{K} \alpha_j \sum_{i=1}^{2L-1} e_l^T \Phi_{j,k,i}^H (X_j + \Phi_{j,j,L} P_j \Phi_{j,j,L}^H)^{-1}$$

$$\Phi_{j,j,L} P_j \Phi_{j,j,L}^H X_j^{-1} \Phi_{j,k,i} e_l, \quad \text{(Equ. 44)}$$

where the $M_k \times M_k$ matrix $\Phi_{k,j,i}$ is defined as $V_k^H H_k^{(i)} U_j$.

According to the Karush-Kuhn-Tucker (KKT) conditions for Equation 41, the optimum $p_{kl}$ satisfies $$p_{kl} = \left( \frac{\alpha_k}{\lambda + t_{kl}} - z_{kl}^{-1} \right)^+, \quad \text{(Equ. 45)}$$

$$\sum_{k=1}^{K} \sum_{l=1}^{L_k} p_{kl} \leq P_{max}. \quad \text{(Equ. 46)}$$

From the complementary slackness, either $\Sigma_{k=1}^{K} \Sigma_{l=1}^{L_k} p_{kl} = P_{max}$, $\lambda > 0$ or $\Sigma_{k=1}^{K} \Sigma_{l=1}^{L_k} p_{kl} < P_{max}$, $\lambda = 0$ should be satisfied. Since $\lambda$ is monotonic with respect to $\Sigma_{k,l} p_{kl}$, we can first check whether $\Sigma_{k=1}^{K} \Sigma_{l=1}^{L_k} p_{kl} > P_{max}$ is satisfied for $\lambda = 0$. If so, the value of $\lambda$ satisfying $\Sigma_{k,l} p_{kl} = P_{max}$ can be obtained via a one dimensional bisection search, where the upper bound of $\lambda$ can be set as $\max_{k,l} \{ \alpha_k z_{kl} - t_{kl} \}$, and we choose a small positive value for the lower bound. Similar procedures can be done for the case when $\lambda = 0$ and $\Sigma_{k,l} p_{kl} < P_{max}$. The Iterative Power Waterfilling algorithm is summarized in Table 3.

TABLE 3

Iterative Power Waterfilling for Multiple Data Streams (i) Given P
(ii) Loop:
    Calculate $t_{kl}$ and $z_{kl}$ using Equations 44 and 43.
    Bisection search $\lambda$ with Equations 45 and 46, i.e.,
    If $\Sigma_{k,l} (\alpha_k t_{kl}^{-1} - z_{kl}^{-1})^+ < P_{max}$ then
      $p_{kl} = (\alpha_k t_{kl}^{-1} - z_{kl}^{-1})^+$.
    Else
      (a) Set bisection upper bound $\lambda^{max} = \max_{k,l} \{ \alpha_k z_{kl} - t_{kl} \}$,
          and lower bound $\lambda^{min} = \delta > 0$.
      (b) Loop:
          Set $\lambda = \frac{1}{2} (\lambda^{max} + \lambda^{min})$.
          Compute $p_{kl} = \left( \frac{\alpha_k}{\lambda + t_{kl}} - z_{kl}^{-1} \right)^+$.
          IF $\Sigma_{k,l} p_{kl} < P_{max}$ then
            $\lambda^{max} = \lambda$.
          Else
            $\lambda^{min} = \lambda$.
          Until $|\Sigma_{k,l} p_{kl} - P_{max}| < \epsilon$.
Until P converges or the maximum number of iterations is reached.

Iterative Sum Rate Optimization for Multiple Data Streams

For multiple data streams, the sum rate optimization algorithm iterates between the virtual uplink (U and Q) and downlink (V and P). When computing one of (U, Q, V, P), the other three variables are considered constant. Iterative Power Waterfilling algorithm in Table 3 is applied for calculating the power allocation P, and the algorithm for computing Q is similar. Different from the algorithm for single data stream (described in Table 2), where the receive filter is a scalar and does not need to be updated, for multiple data streams the calculation of P or U relies on V, and the calculation of Q or V relies on U. Therefore, the algorithm iterates between the virtual uplink and the downlink. After convergence or maximum number of iterations is reached, we take the variables obtained at the last iteration as the solution and compute the achievable sum rate accordingly. The algorithm is summarized in Table 4.

TABLE 4

Iterative Weighted Sum Rate Optimization Algorithm for Multiple Data Streams (i) Initialize $Q_k = \frac{P_{max}}{\sum_j M_j} I_{M_k}$, $U_k$ = some random matrix.
(ii) Loop :
    Calculate V by Equation 39.
    Calculate Q using Iterative Power Waterfilling.
    Calculate U by Equation 40.
    Calculate P using Iterative Power Waterfilling.
Until (U,Q,V,P) converges or the maximum number of iterations is reached.

The global optimum of a non-convex problem can be obtained by exhaustive search which may require high computational complexity. The solution of the iterative waveform design described above is suboptimal because we tradeoff the optimality with complexity. Simulation results show that such sub-optima can still achieve a much better weighted sum rate performance than traditional methods such as block-diagonalization (BD) and zero-forcing (ZF).

Numerical Simulation

In the following, we use numerical simulations to demonstrate the performance of the iterative sum rate optimization algorithms. In the simulation, each path of the channel is assumed to be an i.i.d. complex Gaussian random variable with zero mean and variance of 1/2L per dimension.

The amount of inter-symbol interference depends on the symbol rate. Thus, we introduce the decimation ratio D, which represents the ratio of the symbol duration to the signal sampling duration. Each element in y is a signal sample, and the data symbols are transmitted every D signal samples. Higher D results in less inter-symbol interference but lower symbol rate. In other words, one symbol induces inter-symbol interference to at most $\lfloor 2(L-1)/D \rfloor$ other symbols. Therefore, with decimation ratio D, the channel matrix H can be decimated by keeping only $\lfloor 2(L-1)/D \rfloor + 1$ rows and deleting the other rows for simplicity.

For example, if L=3 and D=2, the decimated H then becomes $$H = \begin{bmatrix} h[0] & 0 & 0 \\ h[2] & h[1] & h[0] \\ 0 & 0 & h[2] \end{bmatrix}.$$

Figure 5:
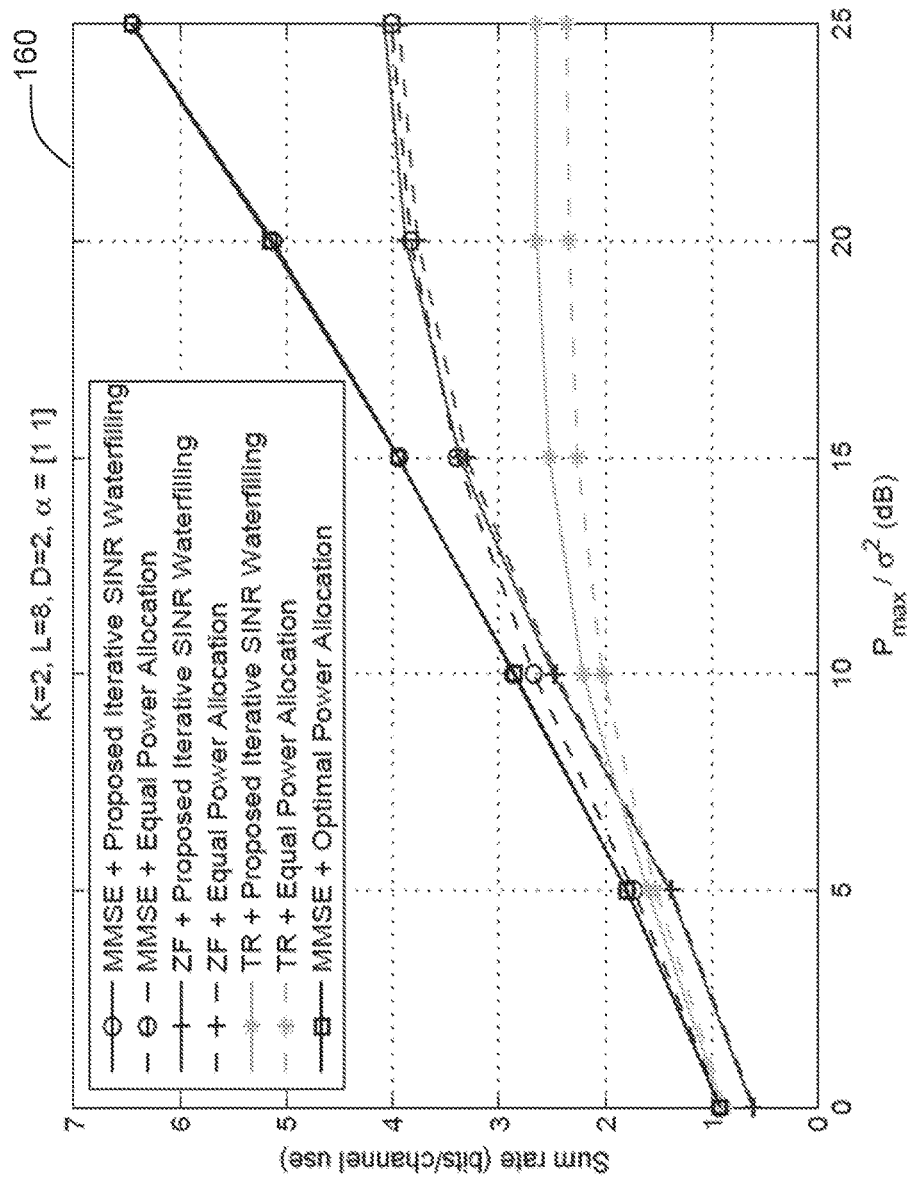
FIG. 5 is a graph showing exemplary sum rate performances of a 2-user system.

FIG. 5 is a graph 160 showing the sum rate performance of a 2-user system with L=8, D=2, $\alpha_1=\alpha_2=1$, and $M_1=M_2=1$. Each rate is averaged over 1000 channel realizations. TR denotes the traditional time-reversal filter, i.e., $u_k^{TR}=c_k^{TR} H_k^{(1)H}$, where $c_k^{TR}$ is a normalization constant such that $\|u_k^{TR}\|_2=1$; ZF denotes the zero-forcing waveform, i.e., $u_k^{ZF}=c_k^{ZF}([H_1^T, \ldots, H_K^T]^T)^\dagger \tilde{e}_k$, where $(\cdot)^\dagger$ denotes the Moore-Penrose pseudo-inverse operator, and $\tilde{e}_k=[0^T, 0^T, \ldots, 0^T, e_L^T, 0^T, \ldots, 0^T]^T$, which is a K(2L−1)×1 vector with its k th vector as $e_L$. Here we denote $e_L$ to be the L th column of a (2L−1)×(2L−1) identity matrix. The 0 denotes a (2L−1)×1 all zero vector. Therefore, $\tilde{e}_k$ has only one non-zero value at its ((2L−1)(k−1)+L)th element. $c_k^{ZF}$ is chosen to normalize the norm of $u_k^{ZF}$ to be 1.

We compare the Iterative SINR Waterfilling algorithm with equal power allocation and optimal power allocation in FIG. 5. For the Iterative SINR Waterfilling algorithms, the forgetting factor β is set to be 1/K. The maximum iteration number of Iterative SINR Waterfilling is set to be 20. In this disclosure, because we focus on demonstrating the performance advantage of the power allocation scheme, some parameters of the described algorithms, such as the maximum number of iterations and the forgetting factor β, are empirically chosen and the performance is already promising. Thus, we do not aim to further optimize these parameters. The equal power allocation is to split the total power equally to each user, i.e., $p_k=P_{max}/K$. The optimal power allocation is simulated by exhaustive search of the discretized power variables, where the number of discrete levels of each power variable is set as $10^3$. The exhaustive search requires high computational complexity, which is exponentially increasing in the number of variables as the number of discrete levels increases.

From the figure, the described power allocation can improve the performance of equal power allocation for all waveform designs, because the Iterative SINR Waterfilling is able to find sub-optima by taking into consideration the channel gains. The improvement for the minimum mean squared error waveform is especially significant at high power region. The minimum mean squared error waveform with the Iterative SINR Waterfilling performs almost the same as the globally-optimal power allocation. We also observe that even with the minimum mean squared error waveform, which is optimal given any power allocation for single data stream, the equal power allocation still saturates at high power region.

Because time-reversal maximizes the received signal power without considering the interference, it saturates at a lower rate, as shown in the figure. Zero-forcing cancels the interference but sacrifices the received signal power resulting in worse performance at low power region. Use of the minimum mean squared error waveform can strike a balance between the two by reducing the interference including inter-symbol interference and inter-user interference, while keeping a high received signal power.

Figure 6:
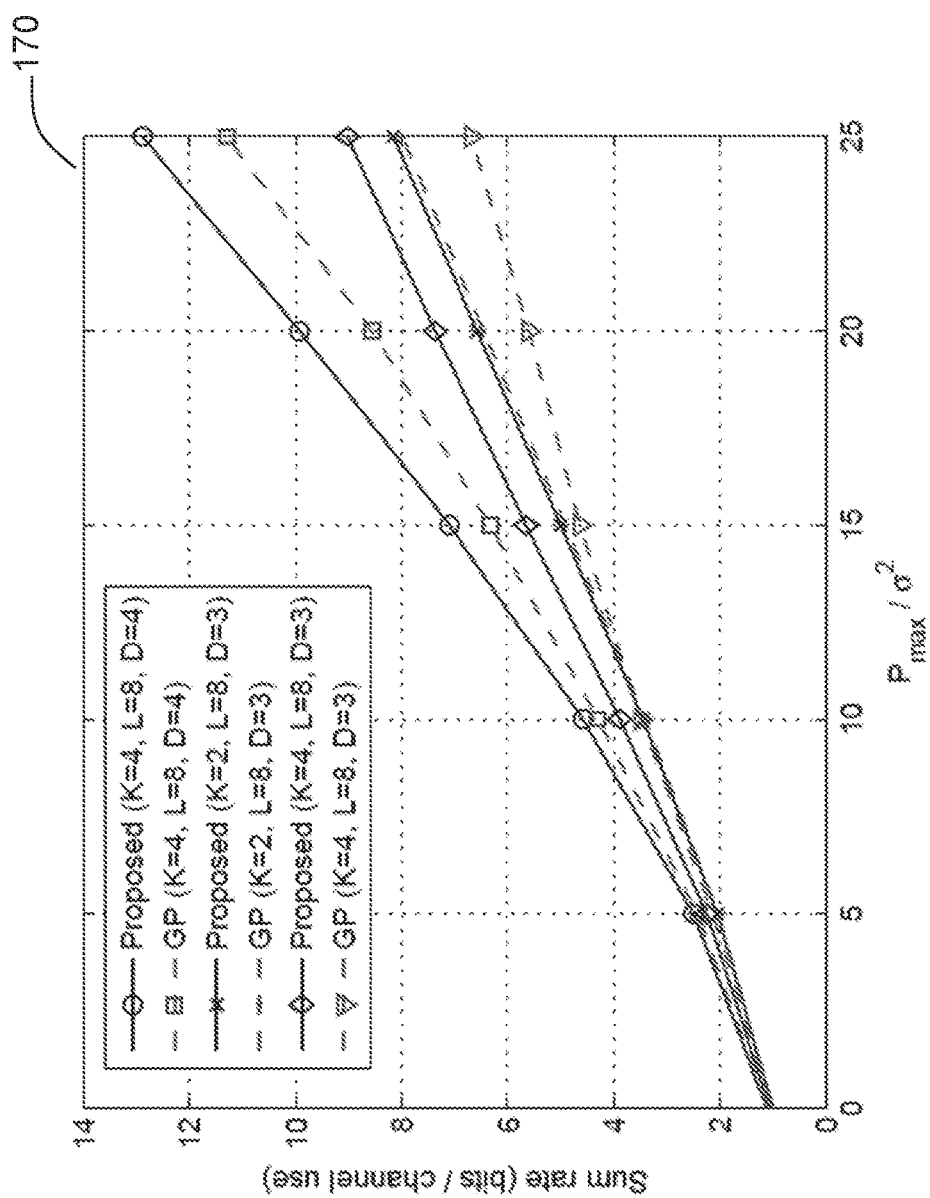
FIG. 6 is a graph showing an exemplary comparison of the iterative SINR waterfilling process with the convex approximation using geometric programming.

Referring to FIG. 6, a graph 170 shows a comparison of the Iterative SINR Waterfilling (summarized in Table 2) with the convex approximation using geometric programming (GP), which approximates the rate function $\log(1+SINR_k)$ as $\log(SINR_k)$ in high SINR regime. In the figure, the label "Proposed" refers to the Iterative SINR Waterfilling. With such an approximation, the weighted sum rate function can be shown to be a polynomial and the optimization problem becomes a geometric program, which can be optimally solved via standard convex programming techniques. In the figure, for K=2, L=8, and D=3, because the interference is low and $SINR_k \gg 1$, the sum rate optimization problem can be well approximated using the convex objective function, and the performance of the described method is very close to the globally optimal solution of the approximated convex optimization problem. For K=4, L=8, D=4, and K=4, L=8, D=3, the higher interference from more users causes more performance degradation to the geometric programming method. This is because the approximate objective function $\Sigma_k \log(SINR_k)$ can be seen as the proportional fairness criterion for SINRs and it deters some $SINR_k$ from being very small and significantly decreasing the approximate objective function. On the contrary, the original sum rate $\Sigma_k \log(1+SINR_k)$ is not impaired as much if some $SINR_k$ are small, because most power can be allotted to other users with lower interference and still makes good contribution to the sum rate. In other words, if some users' interference is high, the original sum rate maximization can abandon these users and allocate most power to the others. Such a consequence cannot arise in the geometric programming method. Hence, only when the interference is low for all users, the sum rate optimization problem can be well approximated with the convex objective function.

The performance gap between the described method and the geometric programming method becomes larger as $P_{max}/\sigma^2$ increases. This seems not to comply with the intuition that the geometric programming method can obtain higher accuracy of approximation with high $P_{max}/\sigma^2$. Instead, the geometric programming approximation is less accurate when the available power is higher because the interference is also higher. When $P_{max}/\sigma^2$ is low, the noise is more dominant than the interference, so the interference mitigation from power allocation has less prominent influence on the sum rate. As $P_{max}/\sigma^2$ increases, the interference also increases. In a high interference scenario, the described algorithm can make better use of the available power compared with the geometric programming method, which is based on a less accurate approximation. Therefore, the resulting advantage of the proposed algorithm is more significant as $P_{max}/\sigma^2$ increases. In this figure, we can also observe that the performance gap for K=4, L=8, D=3 between the two algorithms is larger than the gap for K=4, L=8, D=4 because the geometric programming method allocates power based on a less accurate approximation when the interference is higher. Comparing between K=4, L=8, D=3 and K=2, L=8, D=3, the described algorithm can achieve a better sum rate performance when K increases, whereas geometric programming instead performs worse, which is again due to the ineffective approximation.

Figure 7:
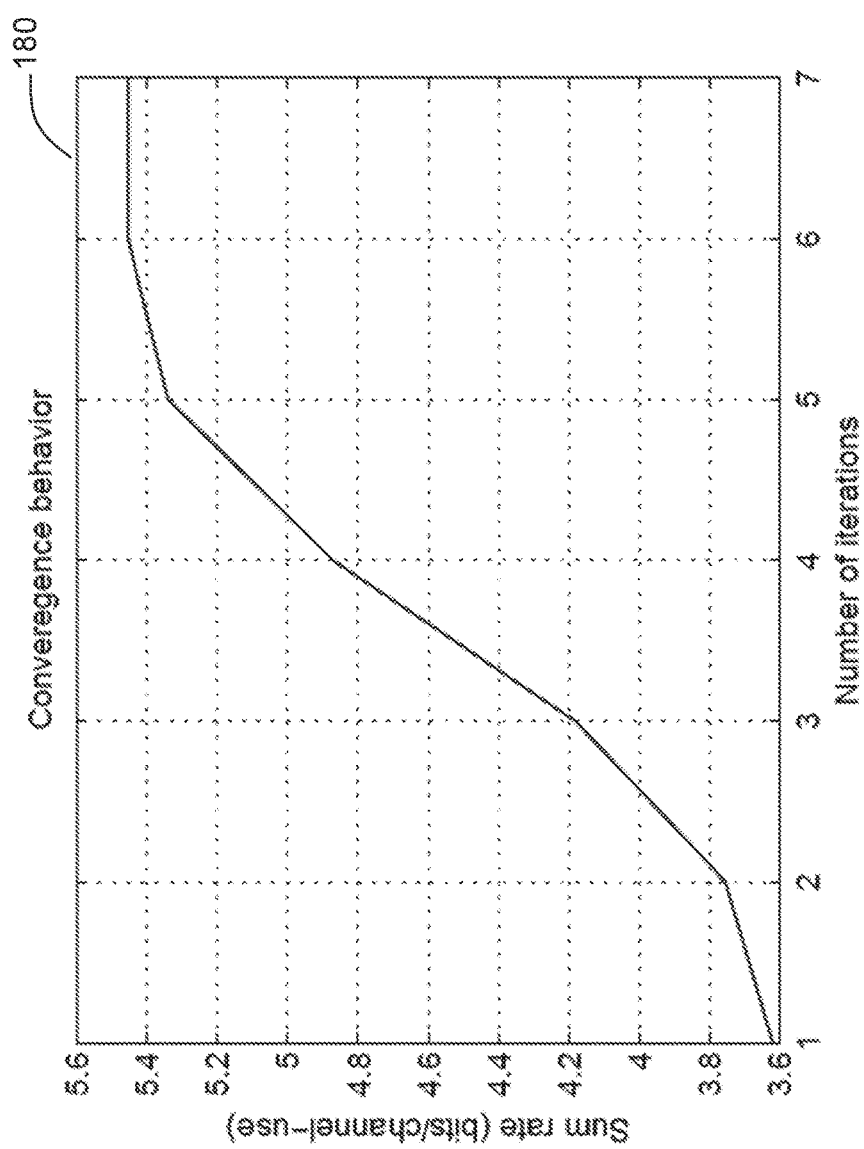
FIG. 7 is a graph showing an exemplary convergence behavior of the sum rate optimization process.

Referring to FIG. 7, a graph 180 shows an exemplary convergence behavior of the described sum rate optimization process (summarized in Table 2). In some examples, monotonicity and fast convergence are observed (typically about 3 to 12 iterations).

Figure 8:
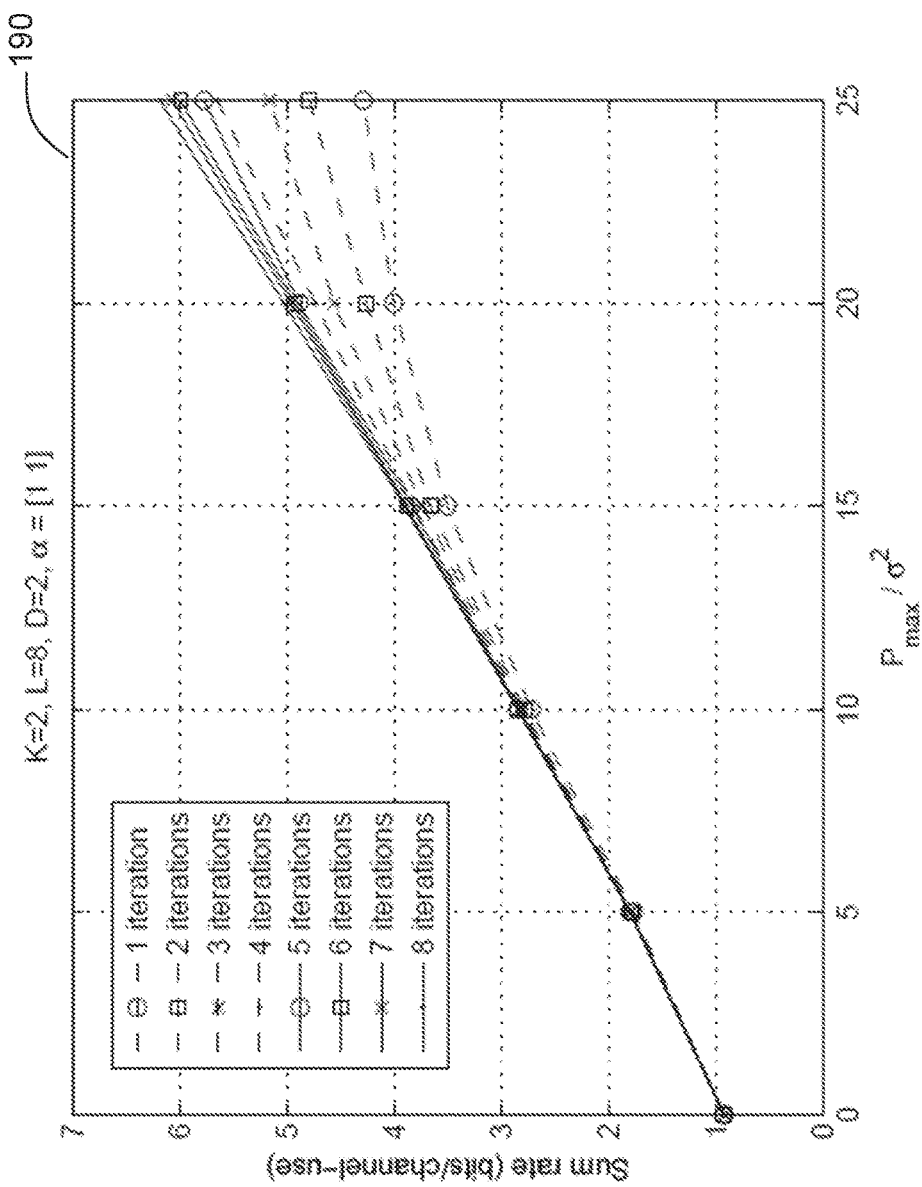
FIG. 8 is a graph showing a comparison of exemplary sum rate optimization processes with different maximum numbers of iterations.

Referring to FIG. 8, a graph 190 shows a comparison of the sum rate optimization processes with different maximum numbers of iterations. The graph 190 shows that the sum rate performance is improved with more iterations. The improvement is more significant for smaller maximum numbers of iterations and becomes less noticeable for higher maximum numbers of iterations. We have performed extensive (10,000 channel realizations) simulations to inspect the convergence of the described algorithm. Over 99% of them converge within 100 iterations, while the remaining less than 1% converge more slowly. Note that we define the convergence as the rate improvement between two consecutive iterations being within $10^{-6}$, i.e., $|(R^{(n+1)}-R^{(n)})/R^{(n)}|<10^{-6}$. We observed that for those cases with slow convergence, the rate still monotonically increases but the increase is too slow to converge within 100 iterations. Because we assume L-path multipath channel with each path being a Gaussian, the complexity to locate the peculiarity of these channels is high.

Figure 9:
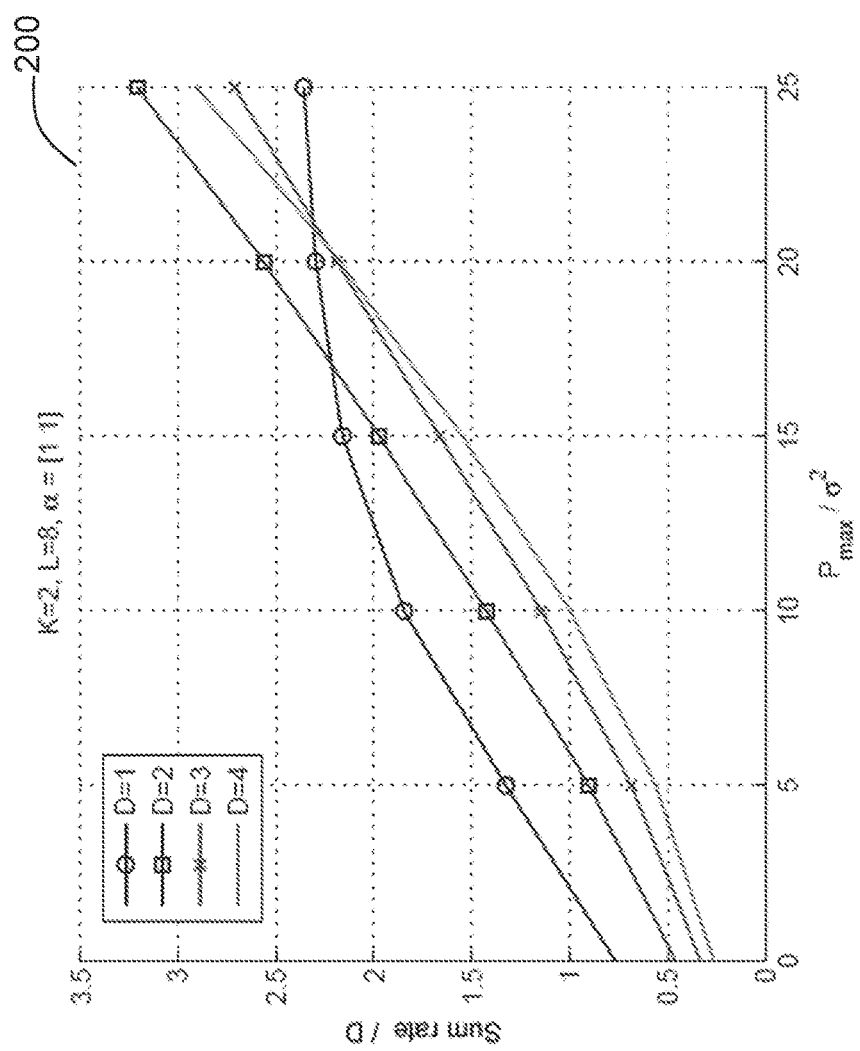
FIG. 9 is a graph showing a comparison of exemplary sum rate performances with different decimation ratio D using the sum rate optimization process.

Referring to FIG. 9, a graph 200 shows a comparison of the sum rate performance with different decimation ratio D using the sum rate optimization process summarized in Table 2. Note that for fair comparison, the performance is normalized by 1/D which reflects the frequency of channel usage. For smaller D, the transmission is conducted more frequently but severer interference may occur due to the inter-symbol interference. Similarly for higher D, the inter-symbol interference is reduced but the channel is utilized less frequently. From the figure, we can see that at low SNR region, D=1 attains the highest normalized performance since at low SNR, the inter-symbol interference is less prominent and the channel utilization is more important to the normalized sum rate. On the other hand, at high SNR, the inter-symbol interference has a dominant effect and higher D can provide a better normalized sum rate performance despite less frequent channel usage.

Figure 10:
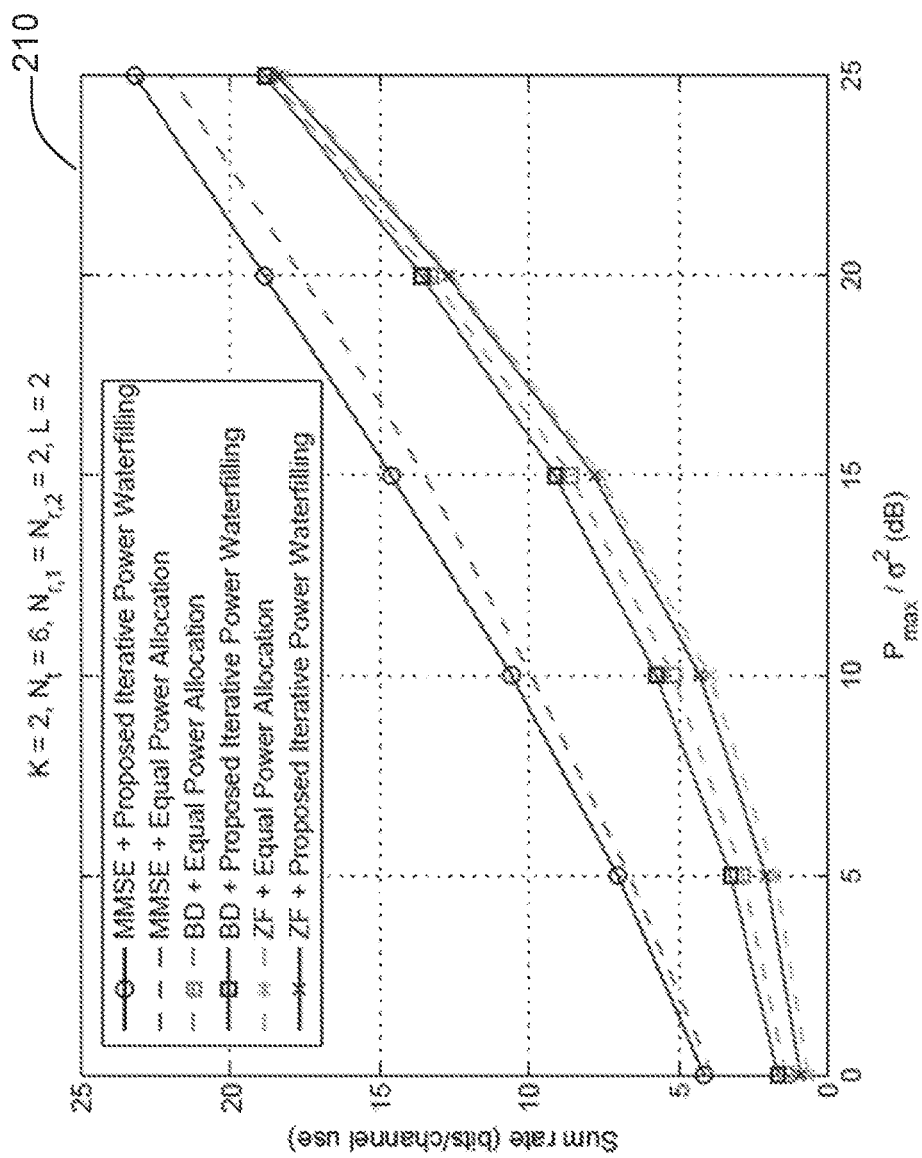
FIG. 10 is a graph showing exemplary sum rate performances of a 2-user system.

Referring to FIG. 10, a graph 210 shows the sum rate performance of a 2-user system with L=2, $\alpha_1=\alpha_2=1$, $N_t=6$, $N_{r,1}=N_{r,2}=2$, and $M_1=M_2=2$. The described algorithm (summarized in Table 4) is compared with the block-diagonalization and zero-forcing algorithms. For block-diagonalization, the signal space of each user is orthogonal to each other, i.e., $U_k$ is in the null space of inter-symbol interference and inter-user interference. Thus, in order for block-diagonalization to find a feasible solution, the simulation parameters are chosen to satisfy $LN_t-(2L-1)\Sigma_{j\neq k}N_{r,j}-(2L-1)N_{r,k}\geq M_k$, $\forall k$. As to zero-forcing, the signal space of each data stream is orthogonal to each other. Hence, zero-forcing also has similar constraint on the dimensions.

Figure 11:
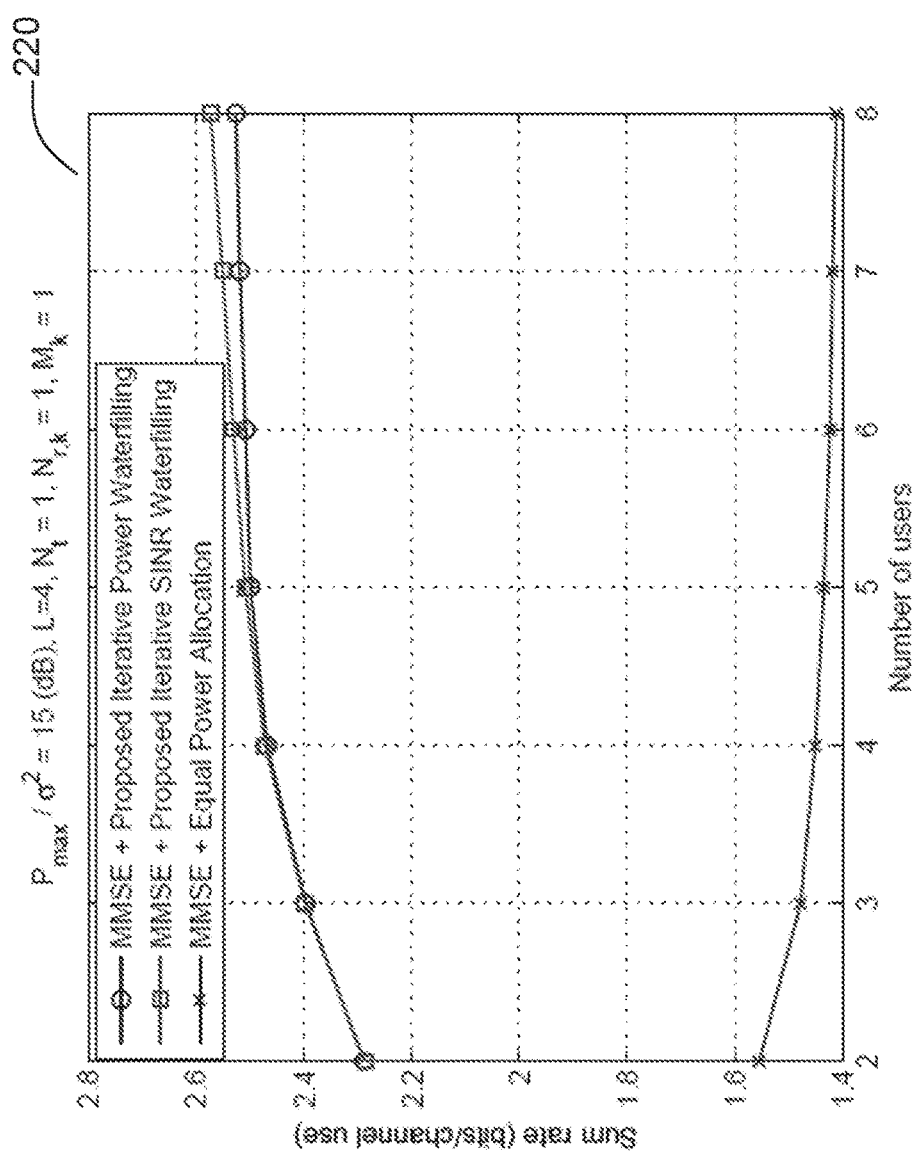
FIG. 11 is a graph showing an exemplary comparison of the iterative power waterfilling process with equal power allocation with different numbers of users.

Referring to FIG. 11, a graph 220 shows a comparison of the Iterative Power Waterfilling described above with equal power allocation with different numbers of users. The equal power allocation is to split the total power equally to each data stream, i.e., $$P_k = \frac{P_{max}}{\sum_j M_j} I_{M_k}.$$

The figure shows that the proposed power allocation outperforms equal power allocation for minimum mean squared error, block-diagonalization, and zero-forcing. Interference cancellation based methods, such as block-diagonalization and zero-forcing, suffer from the noise enhancement and thus result in worse performance than minimum mean squared error.

We compare the two proposed power allocation algorithms for single data stream with different number of users in FIG. 11. The parameters are chosen as $N_t=1$, $N_{r,k}=1$, $\forall k$, L=4, $M_k=1$, $\forall k$, $\alpha_k=1$, $\forall k$, and $P_{max}/\sigma^2=15$ (dB) From the figure, Iterative SINR Waterfilling outperforms the Iterative Power Waterfilling when the number of users is large.

Figure 12:
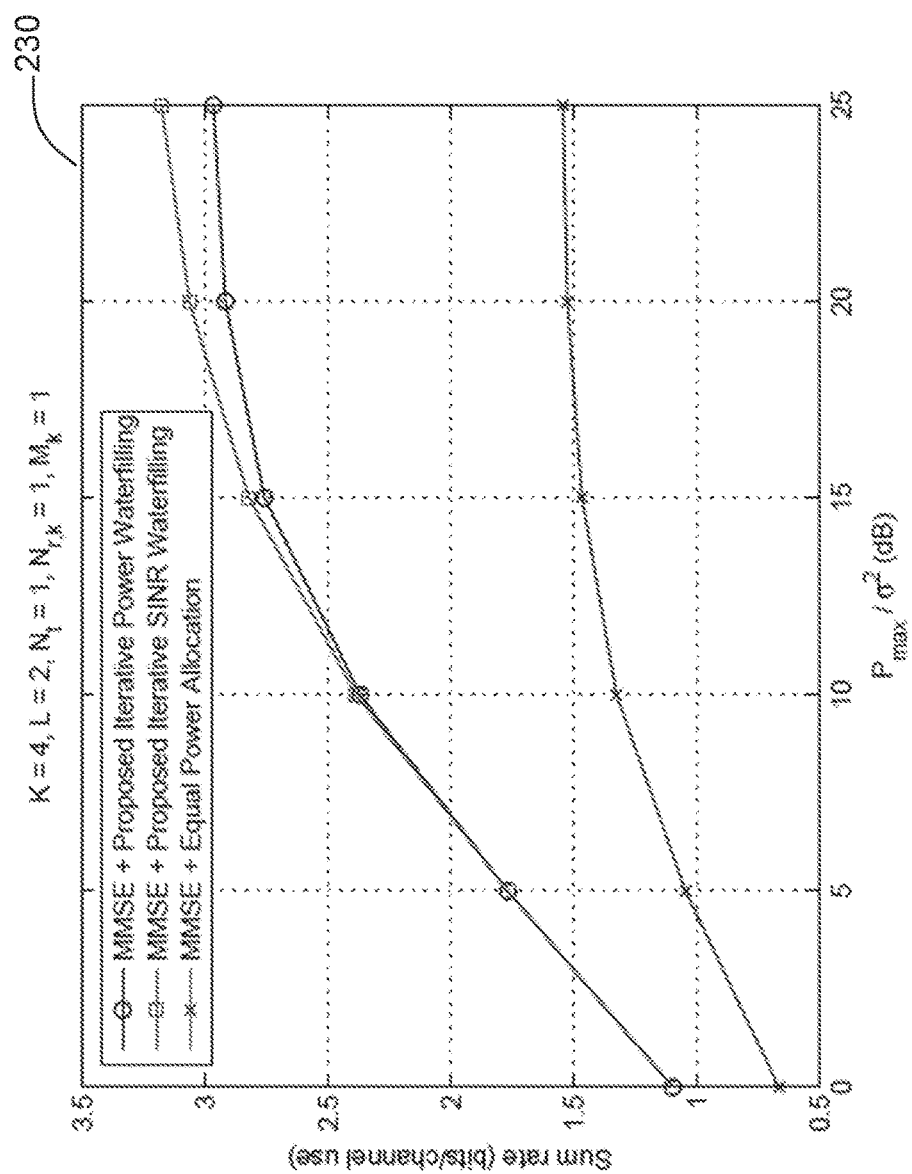
FIG. 12 is a graph showing an exemplary comparison of the iterative SINR waterfilling process and the iterative power waterfilling process.

Referring to FIG. 12, a graph 230 shows a comparison of the Iterative SINR Waterfilling and the Iterative Power Waterfilling. The graph 230 shows that the Iterative SINR Waterfilling can achieve superior sum rate at high SNR, where the parameters are chosen as K=4, L=2, $N_t=1$, $N_{r,k}=1$, $\forall k$, $M_k=1$, $\forall k$, and $\alpha_k=1$, $\forall k$. FIGS. 11 and 12 show that Iterative SINR Waterfilling outperforms Iterative Power Waterfilling when the interference is high. Intuitively, the SINR targets have direct influence on the sum rate and allocating the SINR can better capture the impact of interference compared to allocating the power.

Figure 13:
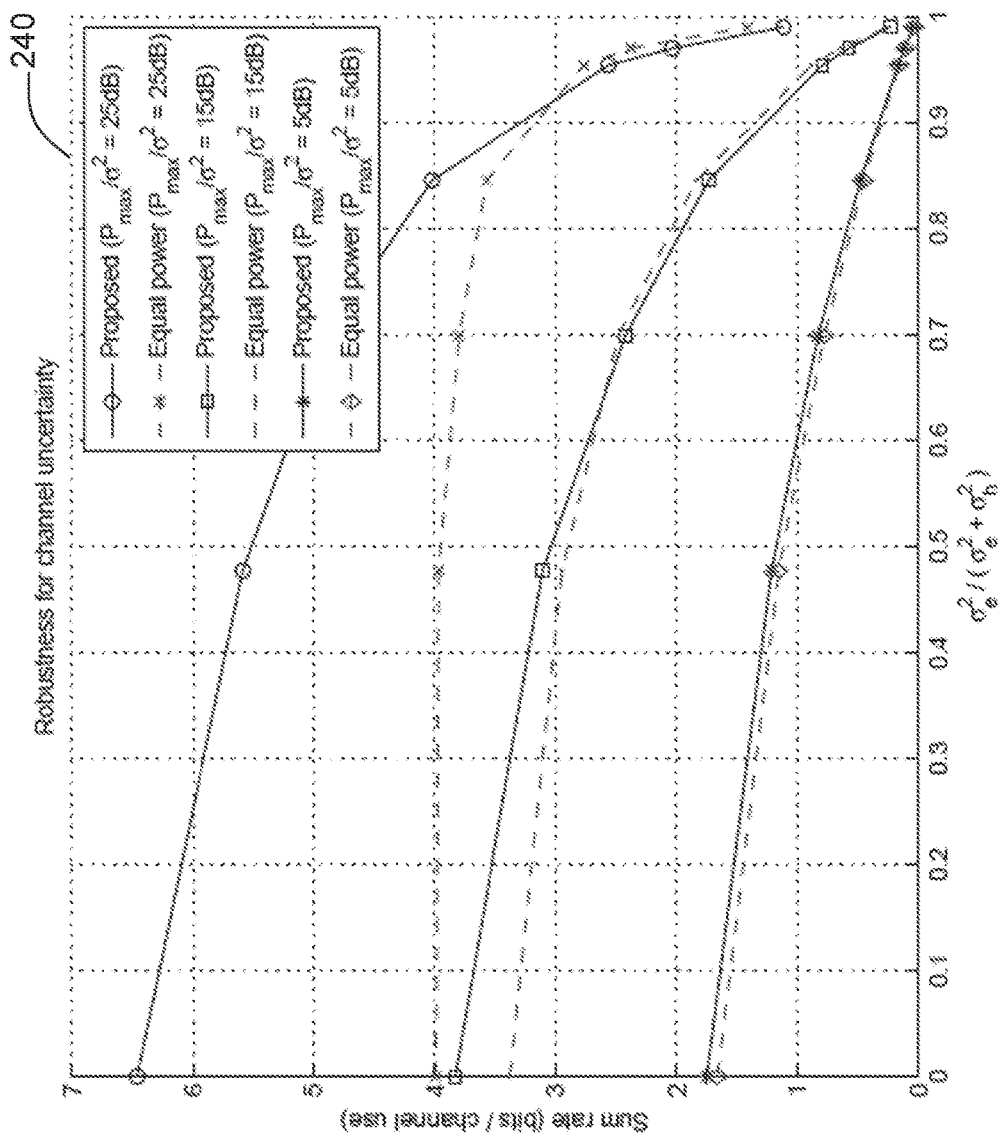
FIG. 13 is a graph showing an exemplary comparison of the iterative SINR waterfilling process with equal power allocation.

Referring to FIG. 13, a graph 240 shows a comparison of the Iterative SINR Waterfilling with equal power allocation. In the figure, the label "Proposed" refers to Iterative SINR Waterfilling. The channel uncertainty model for the k th user at time m is given by $\hat{h}_k[m]=h_k[m]+e_k[m]$, where $\hat{h}_k[m]$ denotes the estimated channel coefficient, $h_k[m]$ denotes the true channel with variance $\sigma_h^2$, and $e_k[m]$ is the estimation error with variance $\sigma_e^2$. The figure shows that when the channel uncertainty is small, the proposed method can still outperform the equal power allocation. As the channel uncertainty increases, the benefit of the described method over the equal power allocation reduces, since the described method relies on the perfect channel information to allocate the available power. When the channel uncertainty is high, the equal power allocation performs better because the described method allocates the power according to the coefficients almost uncorrelated to the true channel.

The simulation results show that in many situations the Iterative SINR Waterfilling results in comparable performance to that of the globally-optimal power allocation and thus outperforms other traditional methods.

Time-Reversal Systems

Figure 14:
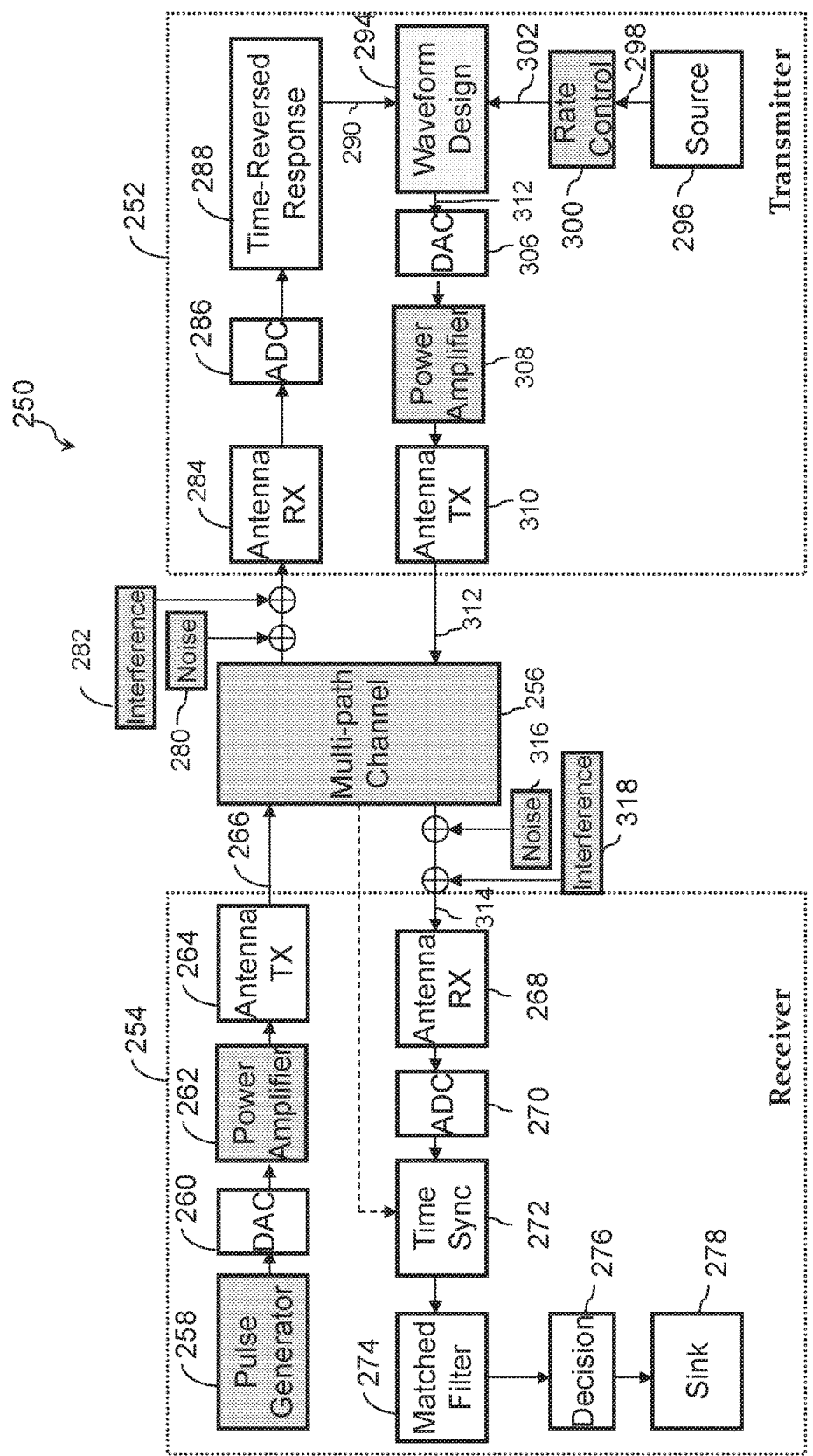
FIG. 14 is a block diagram of an exemplary time-reversal communication system.

Referring to FIG. 14, in some implementations, a time-reversal communication system 250 includes a transmitter 252 that communicates with receivers 254 through a multi-path channel 256. In this figure, only one receiver is shown. There can be two or more receivers. The system 250 can be used to implement the algorithms described above in connection with Equations 1 to 26 and summarized in Tables 1 and 2. The receiver 254 includes a pulse generator 258 to generate a pulse signal, a digital-to-analog converter (DAC) 260 to convert a digital signal to an analog signal, a power amplifier 262 to amplify the analog pulse signal, and a transmit antenna 264 to transmit an analog pulse signal 266.

The receiver 254 includes a receive antenna 268 to receive incoming signals, an analog-to-digital converter (ADC) 270 to convert an analog signal to a digital signal, a time synchronization unit 272 to facilitate synchronization of signals, a match filter 274 to filter the incoming signals, a decision unit 276 to make decisions on the incoming data (e.g., determining whether an incoming data is a '0' bit or a '1' bit), and a sink unit 278 representing a unit that receives the incoming data.

When the pulse signal 266 is transmitted through the multi-path channel 256, the pulse signal 266 is affected by the channel and becomes the channel impulse response signal 292. The channel impulse response signal 292 includes noise 280 and interference 282.

The transmitter 252 includes a receive antenna 284 that receives the channel impulse response signal 292, and an analog-to-digital converter (ADC) 286 to convert an analog signal to a digital signal. A time-reversed response unit 288 generates a time-reversed waveform 290 by reversing the impulse response signal 292 with respect to time. For example, the time-reversed response unit 288 may generate the time-reversed waveform 130 of FIG. 2B if given the channel impulse response waveform 120 of FIG. 2A. The time-reversed waveform 290 is provided to a waveform design unit 294. A source unit 296 represents a unit that generates data 298 to be transmitted to the sink unit 278. The data 298 is provided to a rate control unit 300 that controls the data rate to be transmitted. The rate control unit 300 provides a data signal 302 (whose data rate has been adjusted by the rate control unit 300) to the waveform design unit 294. The waveform design unit 294 generates the downlink transmit waveform $U=[u_1, \ldots, u_K]$ in which power is allocated to the waveforms $u_k$ according to the downlink power allocation coefficients $p=[p_1, \ldots, p_K]^T$ as described above in connection with Equations 1 to 26 and Tables 1 and 2. The waveforms $u_k$ are combined into a downlink signal 304 that is provided to a digital-to-analog converter (DAC) 306 that converts the downlink signal to an analog signal. A power amplifier 308 amplifies the analog downlink signal, and the amplified downlink signal is transmitted by a transmit antenna 310. The transmit antenna 310 sends a transmit signal 312 through the multi-path channel 256, resulting in a signal 314 that is received by the receive antenna 268 of the receiver 254. The signal 314 includes noise 316 and interference 318, which may include inter-symbol interference and inter-user interference.

The waveform design unit 294 determines the waveform $U=[u_1, \ldots, u_K]$ and the downlink power allocation coefficients $p=[p_1, \ldots, p_K]^T$ according to the processes summarized in Tables 1 and 2 to reduce (e.g., minimize) the inter-symbol interference and inter-user interference.

Figure 15:
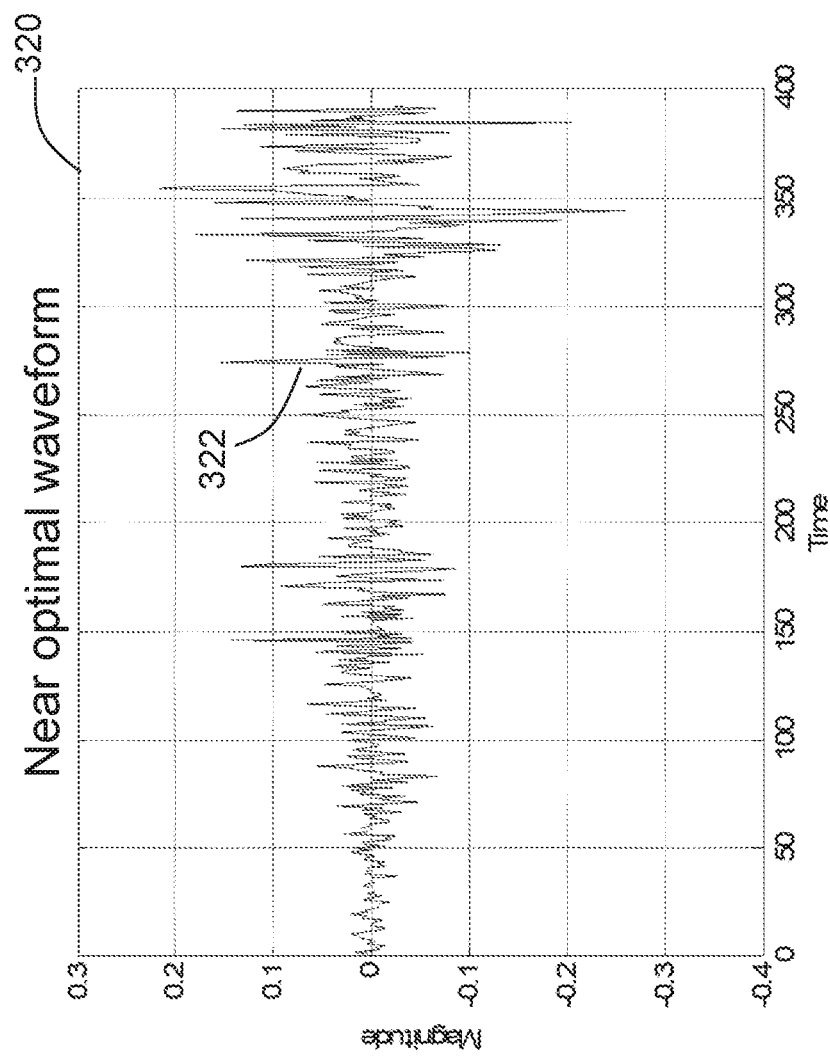
FIG. 15 is a graph showing an exemplary near-optimal waveform used in a time reversal communication system.

FIG. 15 is a graph 320 showing a simulated near-optimal waveform 322 that is determined using the processes summarized in Tables 1 and 2. In this example, the simulation parameters are the same as those used for FIGS. 2A and 2B. In the example of FIG. 2B, when the transmitter sends a downlink signal having the waveform 130, the signal received by the receiver is a pulse signal. Similarly, in the example of FIG. 15, when the transmitter sends a downlink signal having the waveform 322, the signal received by the receiver is also a pulse signal. The advantage of using the waveform 322 is that inter-symbol interference and inter-user interference are suppressed.

The waveform 322 shown in FIG. 15 is merely an example. The waveforms generated by the waveform design unit 294 can vary depending on, e.g., the environment and the data being transmitted.

Figure 16:
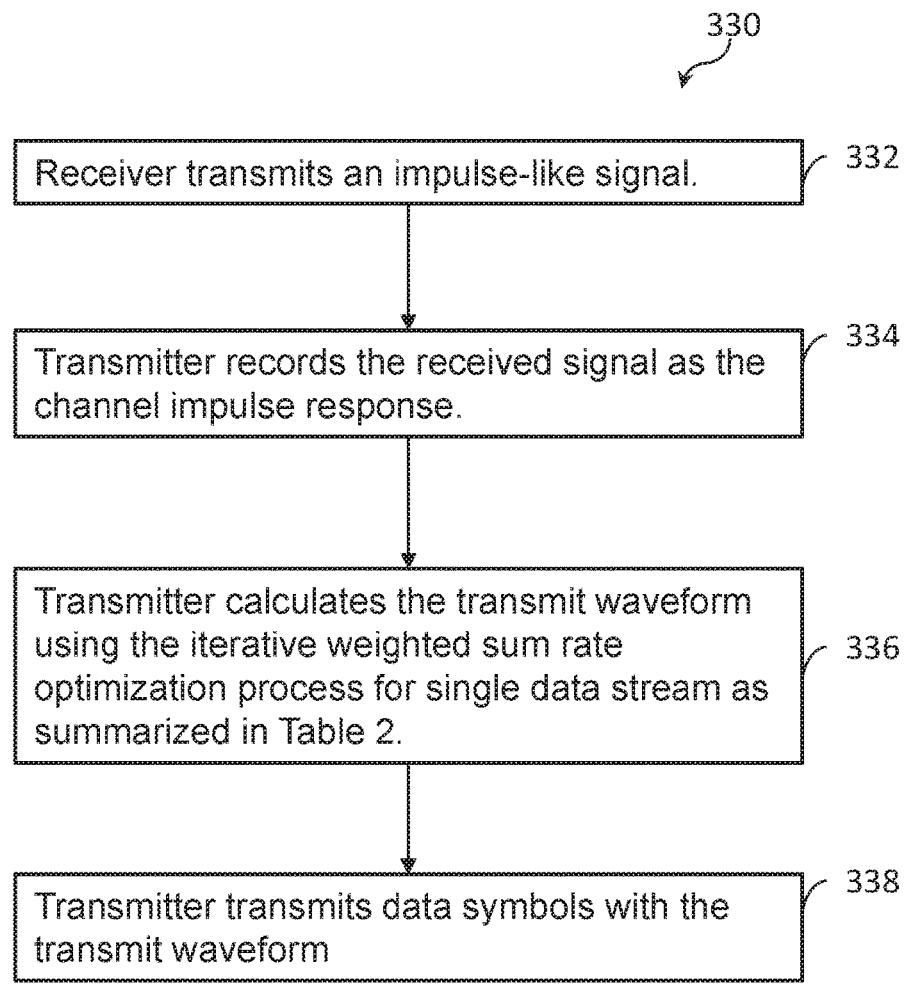
FIG. 16 is a flowchart of an exemplary procedure for operating a time-reversal communication system.

FIG. 16 is a flowchart of an exemplary procedure 330 for operating a time-reversal communication system. The procedure 330 may be performed by the exemplary time-reversal communication system 250 of FIG. 14.

In procedure 330, a receiver transmits (332) an impulse-like signal. The receiver can be, e.g., the receiver 254 of FIG. 14.

A transmitter records (334) the received signal as the channel impulse response. The transmitter can be, e.g., the transmitter 252 of FIG. 14.

The transmitter calculates (336) the transmit waveform using the iterative weighted sum rate optimization process for single data stream as summarized in Table 2.

The transmitter transmits (338) data symbols with the transmit waveform.

Figure 17:
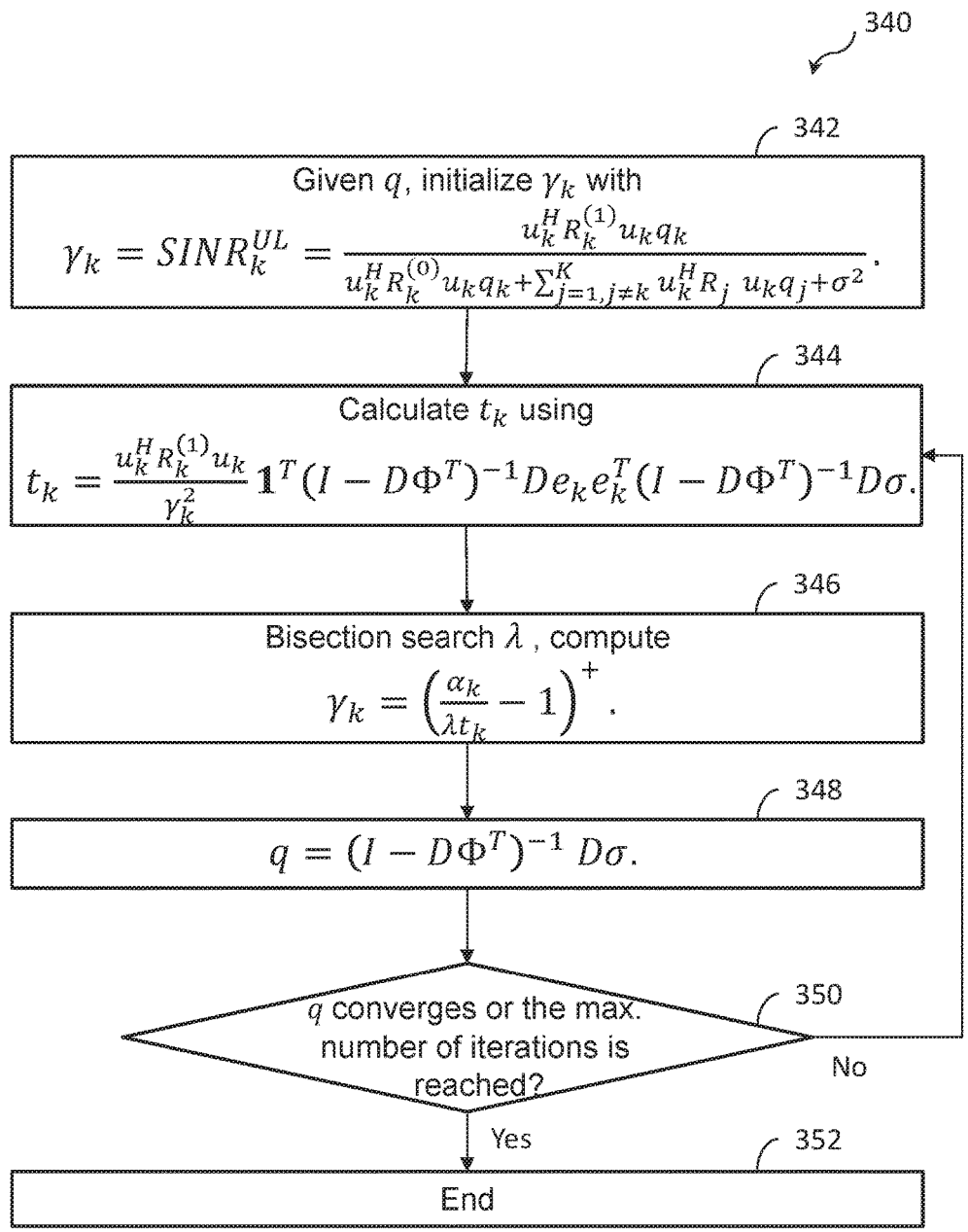
FIG. 17 is a flowchart of an exemplary procedure for performing iterative SINR waterfilling.

FIG. 17 is a flowchart of an exemplary procedure 340 for performing Iterative SINR Waterfilling. The procedure 340 may be performed by, e.g., the exemplary transmitter 252 of FIG. 14.

In procedure 340, for a given virtual uplink power allocation vector q, the SINR targets $\gamma_k$ are initialized (342) with Equation 13:

$$\gamma_k = SINR_k^{UL} = \frac{u_k^H R_k^{(1)} u_k q_k}{u_k^H R_k^{(0)} u_k q_k + \sum_{j=1, j\neq k}^{K} u_k^H R_j u_k q_j + \sigma^2}$$

The term $t_k$ is calculated (344) using Equation 22:

$$t_k = \frac{u_k^H R_k^{(1)} u_k}{\gamma_k^2} 1^T (I - D\Phi^T)^{-1} D e_k e_k^T (I - D\Phi^T)^{-1} D\sigma,$$

A bisection search $\lambda$ is performed (346), and the SINR targets $\gamma_k$ are calculated:

$$\gamma_k = \left(\frac{\alpha_k}{\lambda t_k} - 1\right)^+.$$

The uplink power allocation vector q is determined (346):
$q = (I - D\Phi^T)^{-1} D\sigma,$ A decision is made (350) on whether q converges or the maximum number of iterations is reached. If q converges or the maximum number of iterations is reached, the procedure 340 ends (352), otherwise the procedure 340 loops back to step 344.

Figure 18:
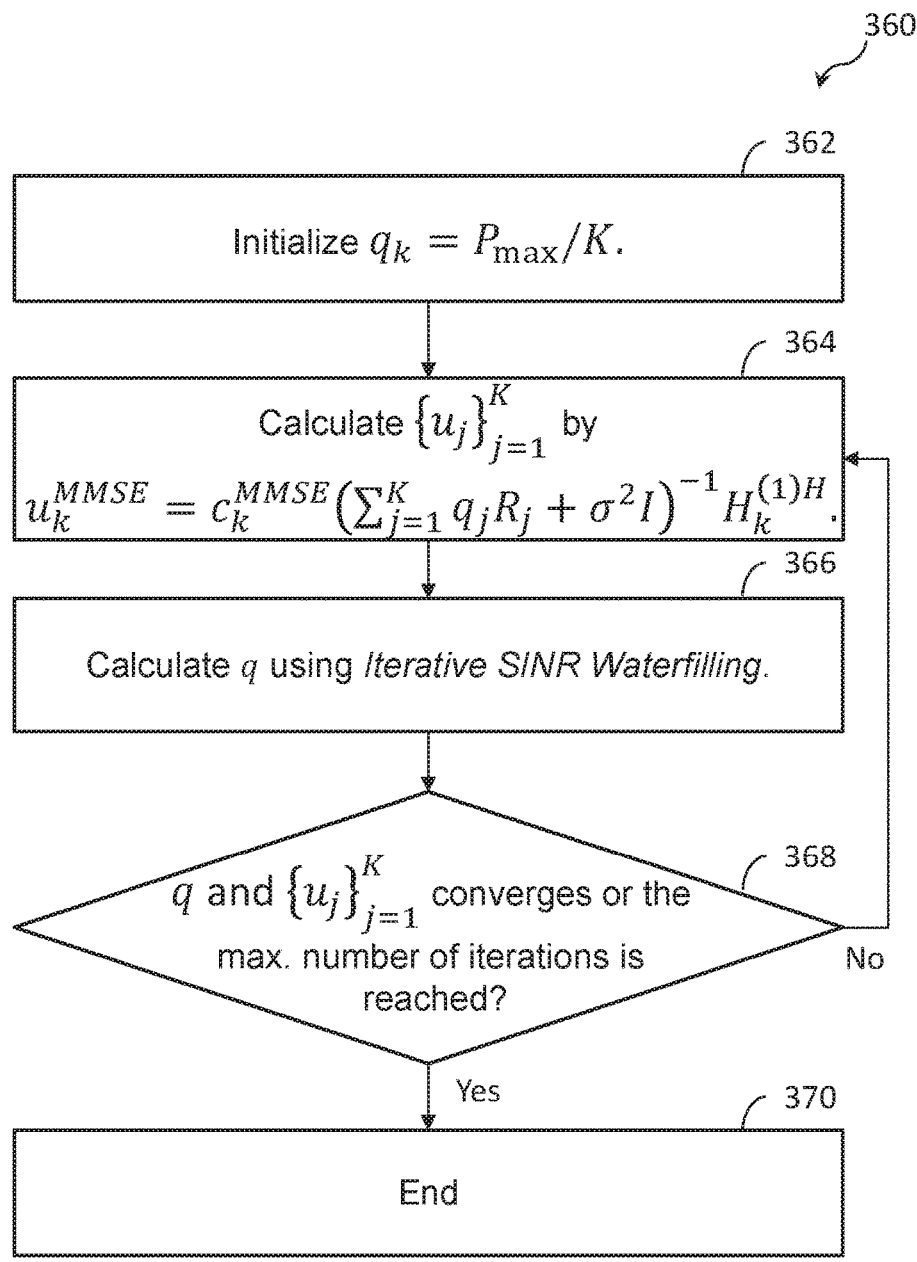
FIG. 18 is a flowchart of an exemplary procedure for implementing iterative weighted sum rate optimization for a single data stream.

FIG. 18 is a flowchart of an exemplary procedure 360 for implementing iterative weighted sum rate optimization for a single data stream. The procedure 360 may be performed by, e.g., the exemplary transmitter 252 of FIG. 14.

In procedure 360, the virtual uplink power allocation coefficients $q_k$ are initialized (362) according to $q_k = P_{max}/K$.

The downlink transmit waveforms $\{u_j\}_{j=1}^K$ are calculated (364) according to:

$$u_k^{MMSE} = c_k^{MMSE} \left(\sum_{j=1}^{K} q_j R_j + \sigma^2 I\right)^{-1} H_k^{(1)H}.$$

The uplink power allocation vector q is calculated (366) using the Iterative SINR Waterfilling procedure 340 of FIG. 17.

A decision is made (368) on whether q and $\{u_j\}_{j=1}^K$ converges or the maximum number of iterations is reached. If q and $\{u_j\}_{j=1}^K$ converges or the maximum number of iterations is reached, the procedure 360 ends (370), otherwise the procedure 360 loops back to step 364.

Figure 19:
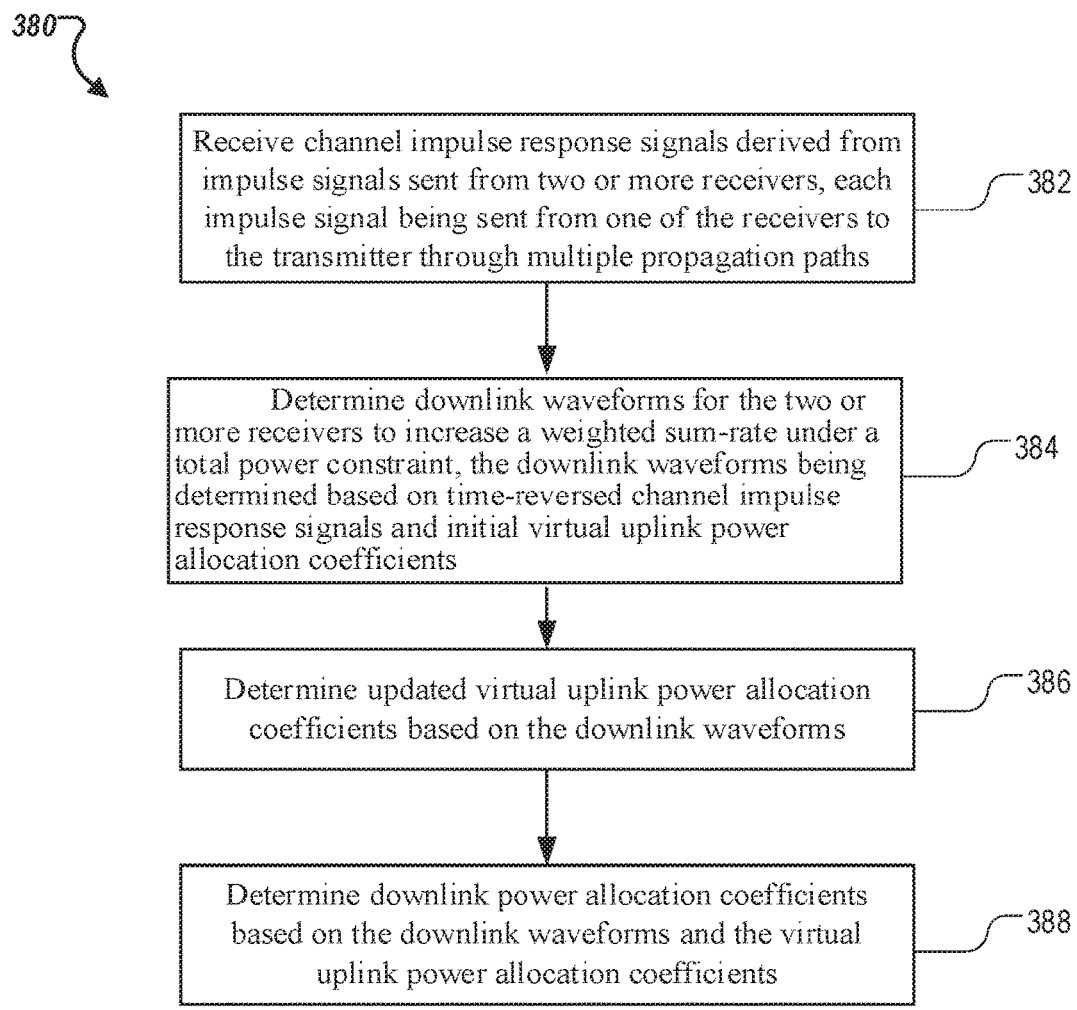
FIG. 19 is a flowchart of an exemplary procedure for implementing iterative weighted sum rate optimization.

FIG. 19 is a flowchart of an exemplary procedure 380 for implementing iterative weighted sum rate optimization. The procedure 380 may be performed by, e.g., the exemplary transmitter 252 of FIG. 14.

In procedure 380, a transmitter receives (382) channel impulse response signals derived from impulse signals sent from two or more receivers, each impulse signal being sent from one of the receivers to the transmitter through multiple propagation paths.

Downlink waveforms for the two or more receivers are determined (384) so as to increase a weighted sum-rate under a total power constraint, the downlink waveforms being determined based on time-reversed channel impulse response signals and initial virtual uplink power allocation coefficients.

Updated virtual uplink power allocation coefficients are determined (386) based on the downlink waveforms.

Downlink power allocation coefficients are determined (388) based on the downlink waveforms and the virtual uplink power allocation coefficients.

Figure 20:
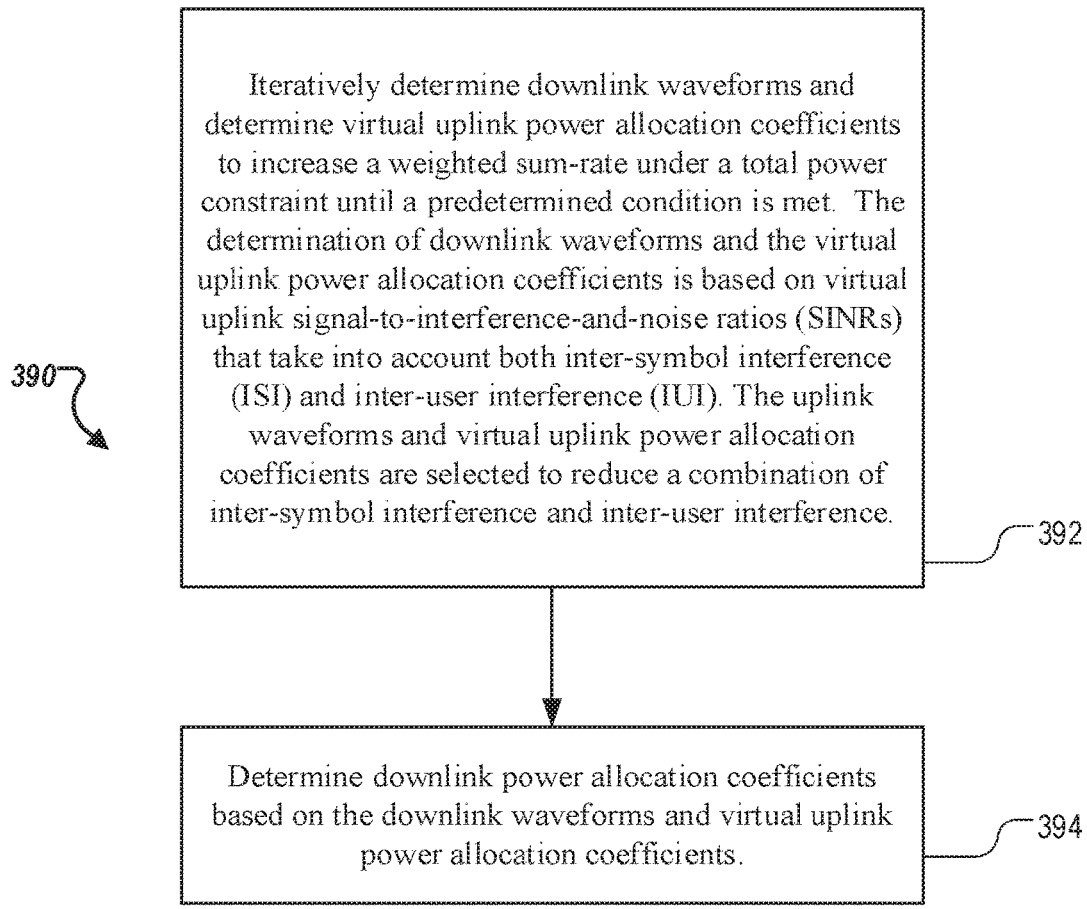
FIG. 20 is a flowchart of an exemplary procedure for communication between a transmitter and multiple receivers using multi-path signals.

FIG. 20 is a flowchart of an exemplary procedure 390 for communication between a transmitter and multiple receivers using multi-path signals. The procedure 390 may be performed by, e.g., the exemplary transmitter 252 of FIG. 14.

According to the procedure 390, a transmitter iteratively determines (392) downlink waveforms and determines virtual uplink power allocation coefficients to increase a weighted sum-rate under a total power constraint until a predetermined condition is met. The determination of downlink waveforms and the virtual uplink power allocation coefficients is based on virtual uplink signal-to-interference-and-noise ratios (SINRs) that take into account both inter-symbol interference (ISI) and inter-user interference (IUI). The uplink waveforms and virtual uplink power allocation coefficients are selected to reduce a combination of inter-symbol interference and inter-user interference.

Downlink power allocation coefficients are determined (394) based on the downlink waveforms and virtual uplink power allocation coefficients.

Figure 21:
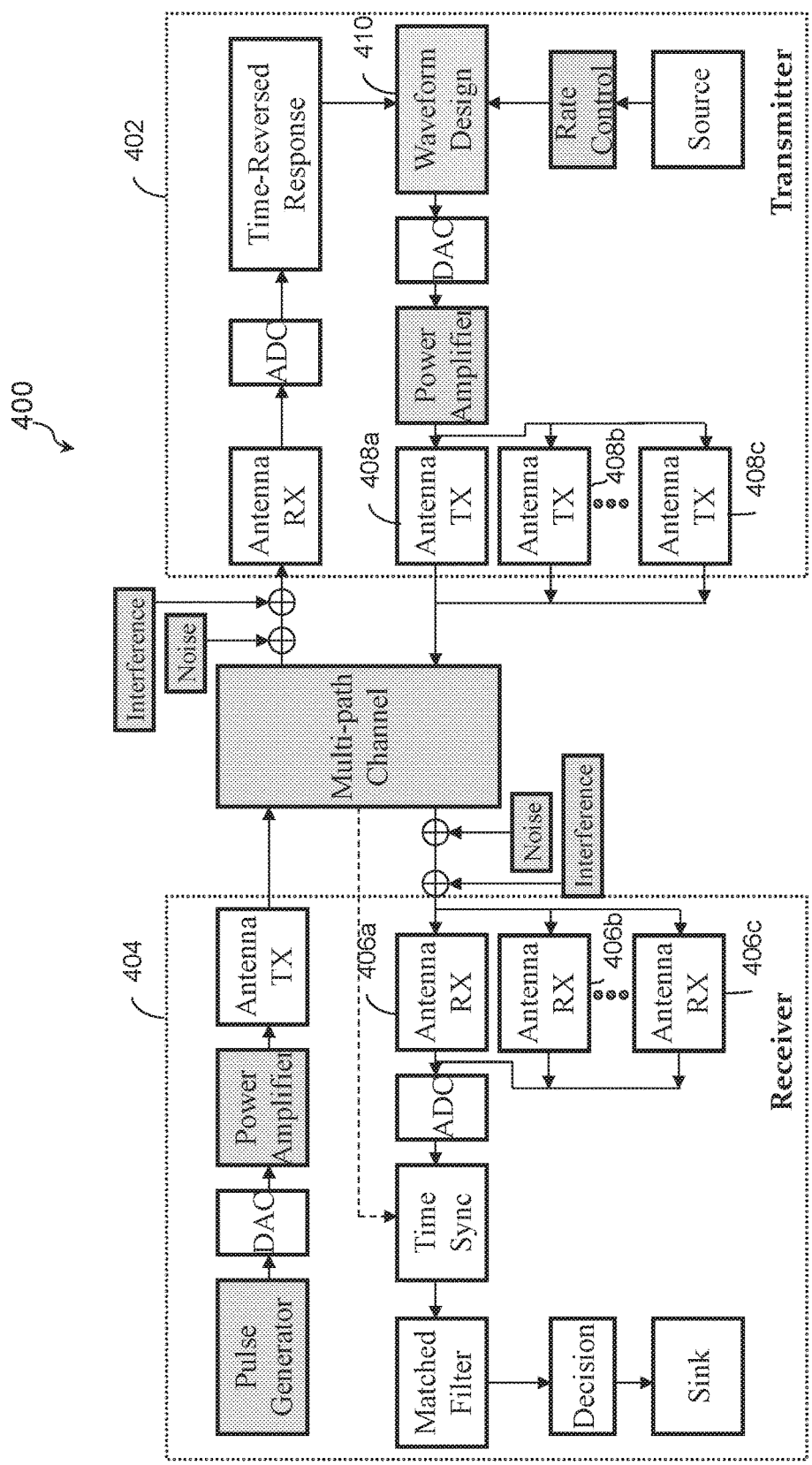
FIG. 21 is a block diagram of an exemplary MIMO time-reversal communication system.

Referring to FIG. 21, in some implementations, a MIMO time-reversal communication system 400 includes a transmitter 402 that communicates with receivers 404 through a multi-path channel 256. In this figure, only one receiver is shown. There can be two or more receivers. The system 400 can be used to implement the algorithms described above in connection with Equations 27 to 46 and summarized in Tables 3 and 4.

The receiver 404 includes components similar to those of receiver 254 in FIG. 0.14. The receiver 404 includes multiple receive antennas (e.g., 406a, 406b, 406c, collectively referenced as 406) for receiving multiple data streams simultaneously. The transmitter 402 includes components similar to those of the transmitter 252 in FIG. 0.14. The transmitter 402 includes multiple transmit antennas (e.g., 408a, 408b, 408c, collectively referenced as 408) for transmitting multiple data streams simultaneously.

A waveform design unit 410 jointly determines the transmit waveforms of the K users $U=[U_1, \ldots, U_K]$ and power allocation $P=\text{diag}\{P_1, \ldots, P_K\}$ to maximize the weighted sum rate $\Sigma_{k=1}^{K} \alpha_k R_k^{DL}$ subject to a total power constraint $P_{max}$ as described above in connection with Equations 27 to 46 and Tables 3 and 4. The transmit waveforms are processed and provided to the transmit antennas 408 for transmission to the receivers 404. The waveform design unit 410 determines the transmit waveforms $U=[U_1, \ldots, U_K]$ and the downlink power allocation coefficients $P=\text{diag}\{P_1, \ldots, P_K\}$ according to the processes summarized in Tables 3 and 4 to reduce (e.g., minimize) the inter-symbol interference and inter-user interference.

Figure 22:
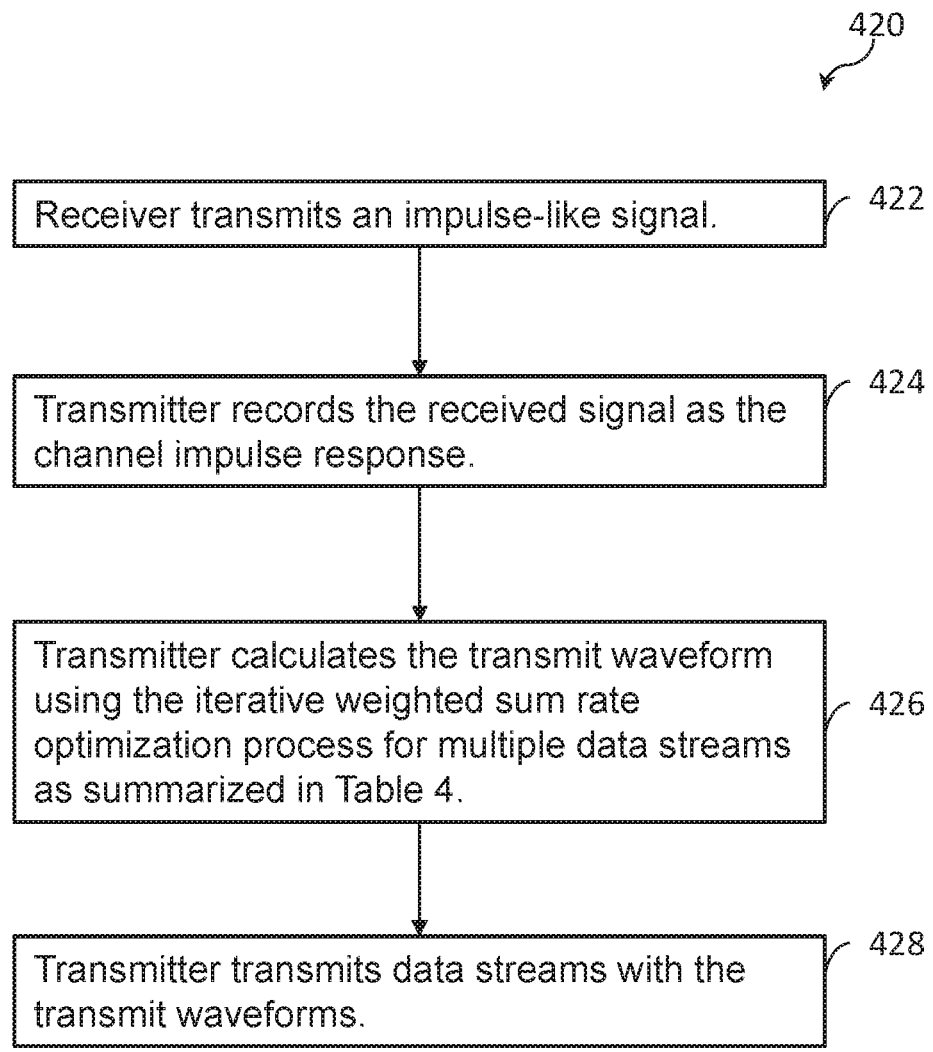
FIG. 22 is a flowchart of an exemplary procedure for operating a MIMO time-reversal communication system.

FIG. 22 is a flowchart of an exemplary procedure 420 for operating a MIMO time-reversal communication system. The procedure 420 may be performed by the exemplary time-reversal communication system 400 of FIG. 21.

In procedure 420, a receiver transmits (422) an impulse-like signal. The receiver can be, e.g., the receiver 404 of FIG. 21.

A transmitter records (424) the received signal as the channel impulse response. The transmitter can be, e.g., transmitter 402 of FIG. 21.

The transmitter calculates (426) the transmit waveform using the iterative weighted sum rate optimization process for multiple data streams as summarized in Table 4.

The transmitter transmits (428) data streams with the transmit waveforms.

Figure 23:
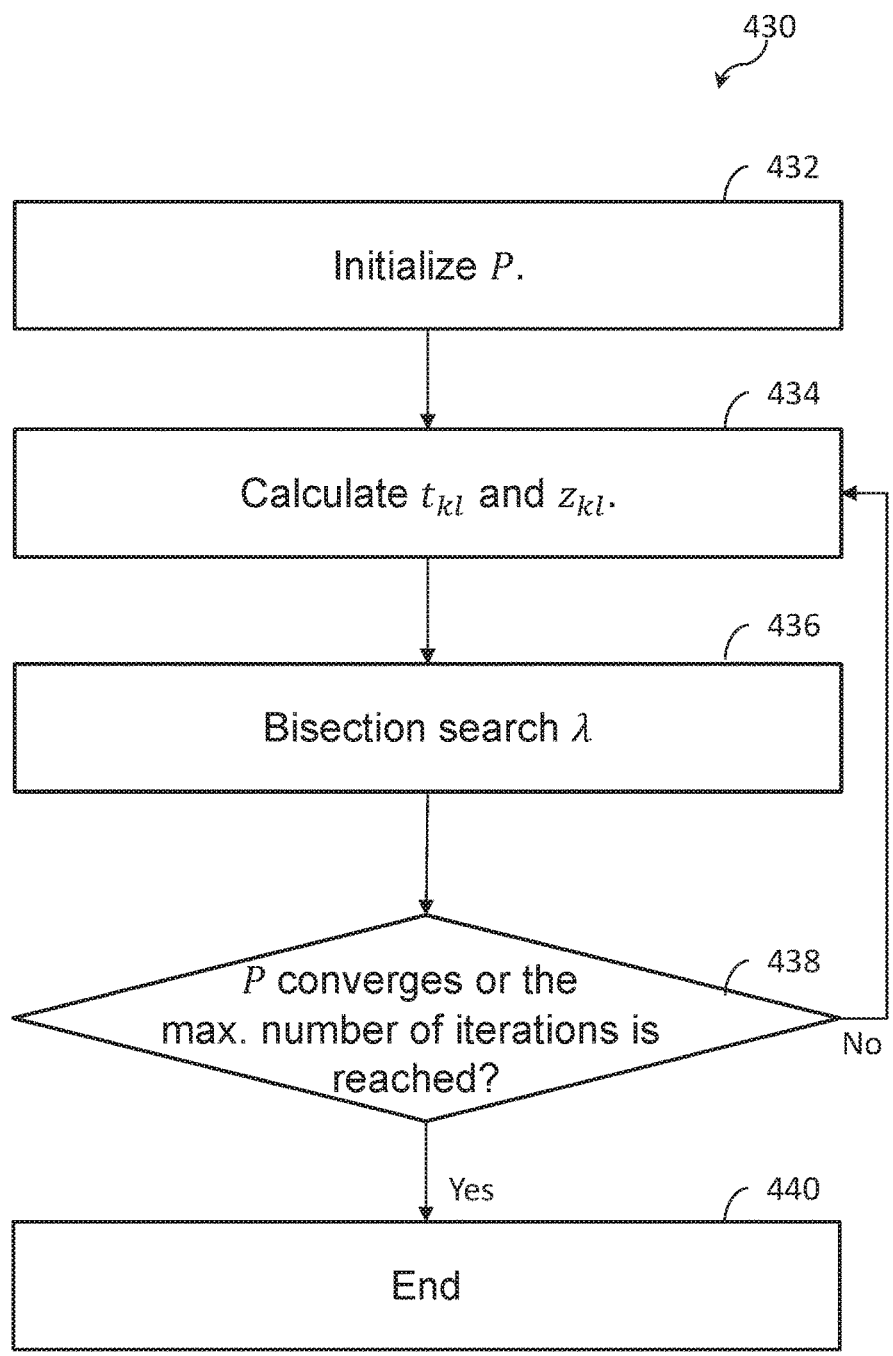
FIG. 23 is a flowchart of an exemplary procedure for performing iterative power waterfilling for multiple data streams.

FIG. 23 is a flowchart of an exemplary procedure 430 for performing Iterative Power Waterfilling for Multiple Data Streams. The procedure 430 may be performed by, e.g., the exemplary transmitter 402 of FIG. 21.

In procedure 430, a power allocation matrix P is initialized (432).

The parameters $t_{kl}$ and $z_{kl}$ are calculated (434) using Equations 44 and 43, respectively.

Bisection search $\lambda$ is performed (436) using Equations 45 and 46.

A decision is made (438) on whether P converges or the maximum number of iterations is reached. If P converges or the maximum number of iterations is reached, the procedure 430 ends (440), otherwise the procedure 430 loops back to step 434.

Figure 24:
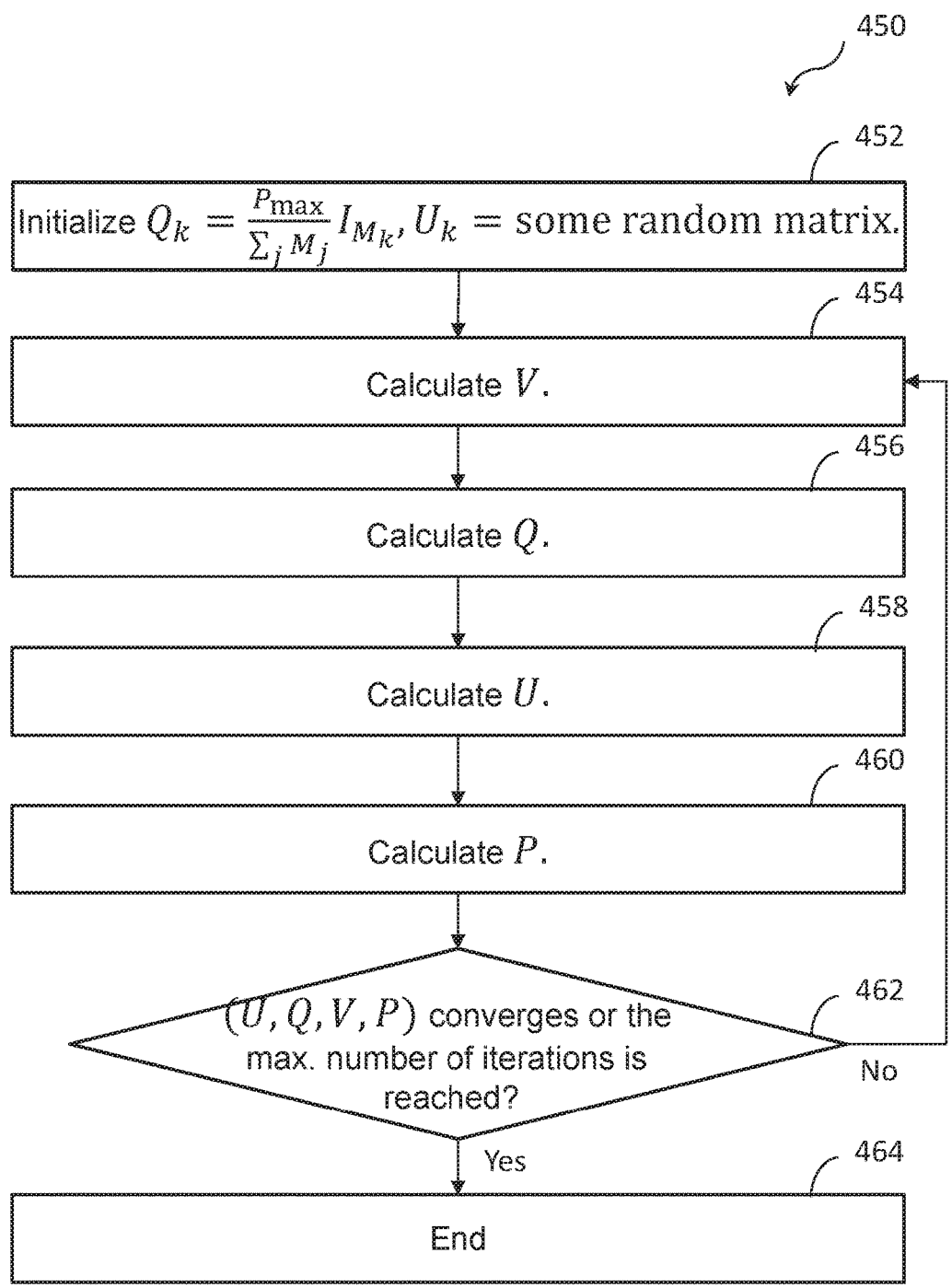
FIG. 24 is a flowchart of an exemplary procedure for implementing iterative weighted sum rate optimization for multiple data streams.

FIG. 24 is a flowchart of an exemplary procedure 450 for implementing iterative weighted sum rate optimization for multiple data streams. The procedure 450 may be performed by, e.g., the exemplary transmitter 402 of FIG. 21.

In procedure 450, the power allocation coefficients in the virtual uplink are initialized (452) according to $$Q_k = \frac{P_{max}}{\sum_j M_j} I_{M_k},$$

and the downlink waveforms are initialized according to some random matrix: $U_k$=some random matrix.

The virtual uplink waveforms V are calculated (454) according to Equation 39:

$$V_k = (H_k^{(L)} U_k P_k U_k^H H_k^{(L)H} + X_k)^{-1} H_k^{(L)} U_k \sqrt{P_k}$$

The virtual uplink power allocation coefficients Q are determined (456) according to Iterative Power Waterfilling using a procedure similar to the procedure 430 of FIG. 23.

The downlink waveforms U are calculated (458) according to Equation 40:

$$U_k = (H_k^{(L)H} V_k Q_k V_k^H H_k^{(L)} + Y_k)^{-1} H_k^{(L)H} V_k \sqrt{Q_k}.$$

The downlink power allocation coefficients P are determined (460) according to Iterative Power Waterfilling using a procedure similar to the procedure 430 of FIG. 23.

A decision is made (462) on whether (U, Q, V, P) converges or the maximum number of iterations is reached. If (U, Q, V, P) converges or the maximum number of iterations is reached, the procedure 450 ends (464), otherwise the procedure 450 loops back to step 454.

Figure 25:
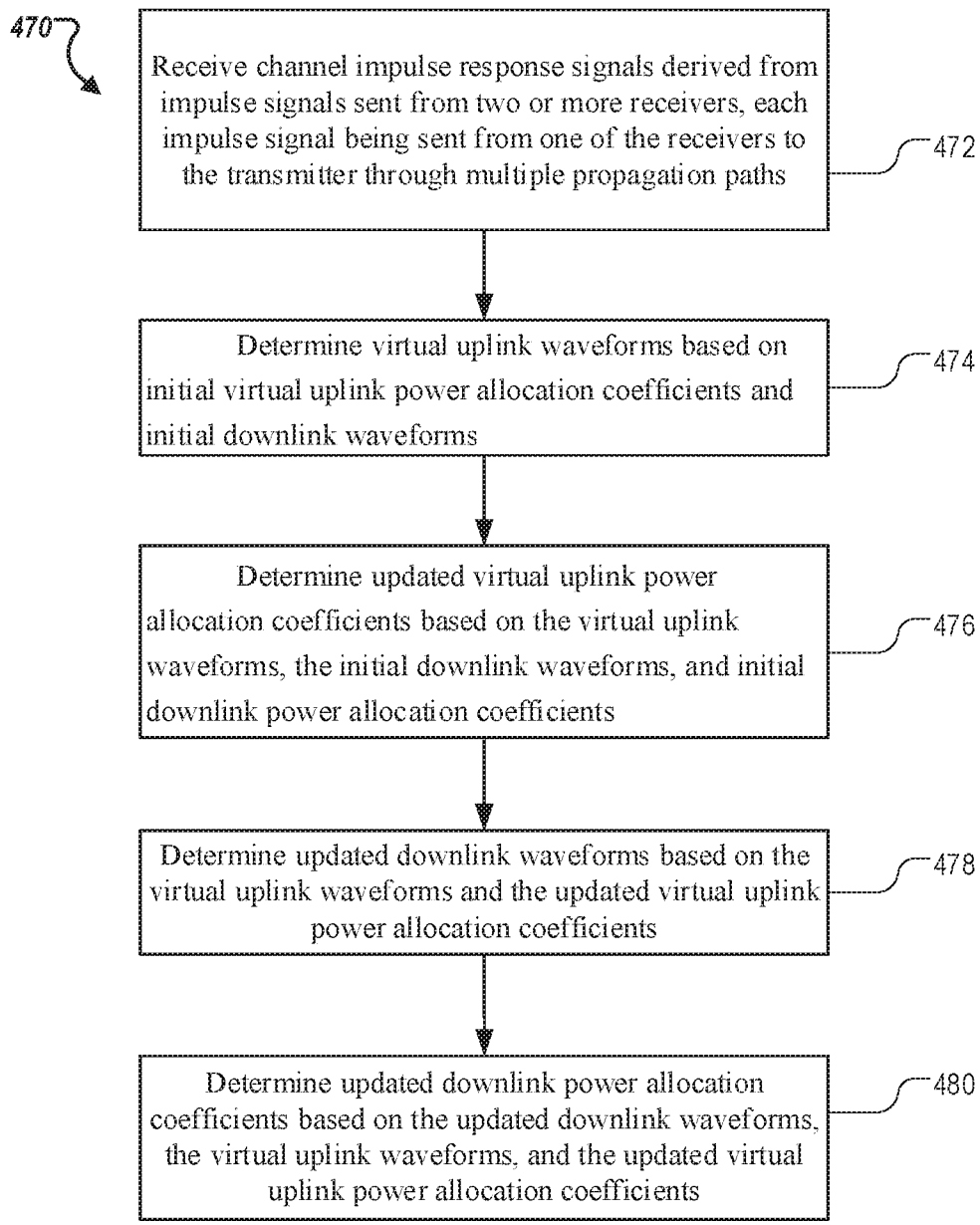
FIG. 25 is a flowchart of an exemplary procedure for implementing iterative sum rate optimization for multiple data streams.

FIG. 25 is a flowchart of an exemplary procedure 470 for implementing iterative sum rate optimization for multiple data streams. The procedure 470 may be performed by, e.g., the exemplary transmitter 402 of FIG. 21.

In procedure 470, a transmitter (having multiple transmit antennas) receive (472) channel impulse response signals derived from impulse signals sent from two or more receivers, each impulse signal being sent from one of the receivers to the transmitter through multiple propagation paths.

Virtual uplink waveforms are determined (474) based on initial virtual uplink power allocation coefficients and initial downlink waveforms.

Updated virtual uplink power allocation coefficients are determined (476) based on the virtual uplink waveforms, the initial downlink waveforms, and initial downlink power allocation coefficients.

Updated downlink waveforms are determined (478) based on the virtual uplink waveforms and the updated virtual uplink power allocation coefficients.

Updated downlink power allocation coefficients are determined (480) based on the updated downlink waveforms, the virtual uplink waveforms, and the updated virtual uplink power allocation coefficients.

Figure 26:
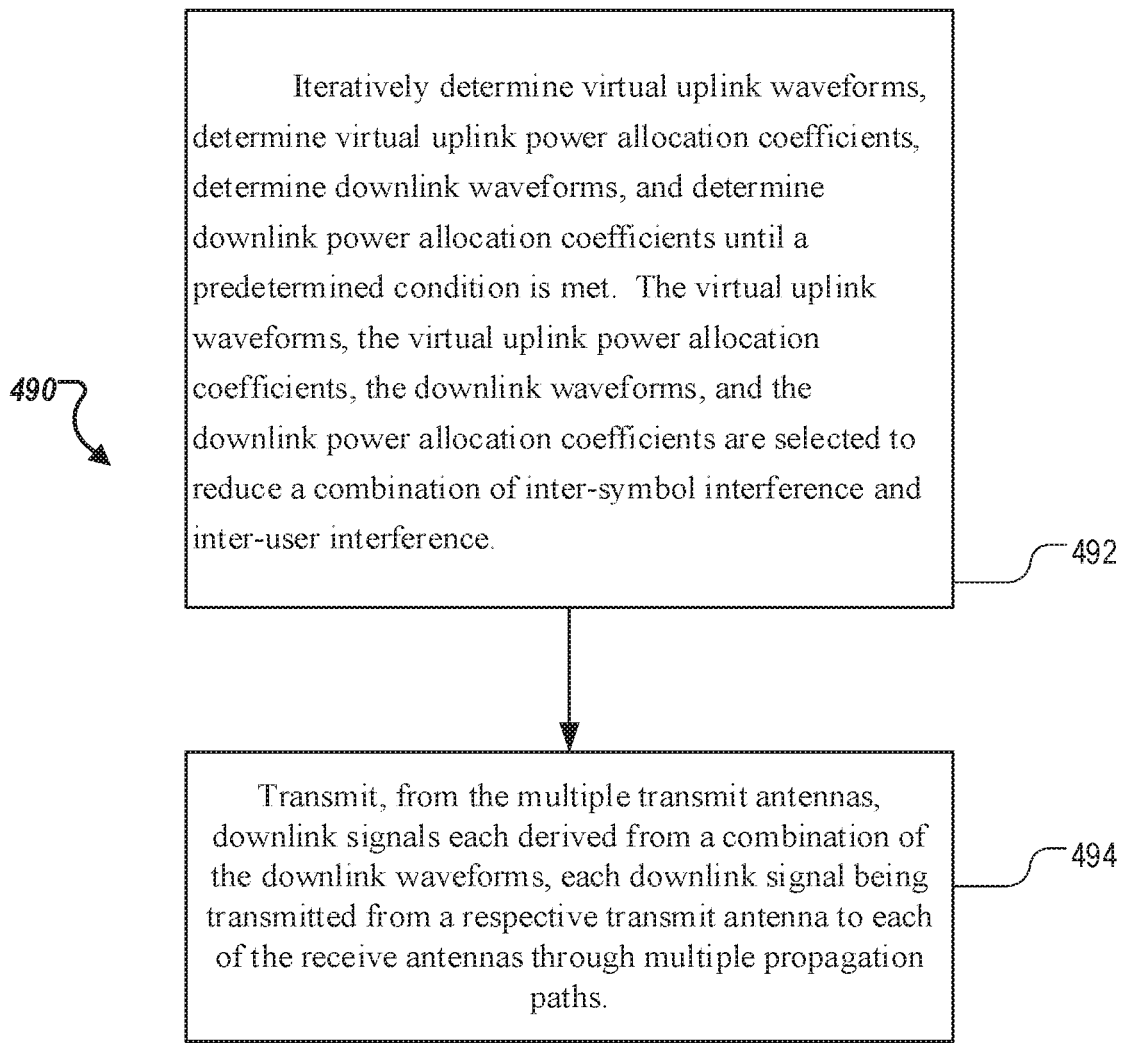
FIG. 26 is a flowchart of an exemplary procedure for communication between a transmitter and multiple receivers using multi-path signals.

FIG. 26 is a flowchart of an exemplary procedure 490 for communication between a transmitter and multiple receivers using multi-path signals, in which the transmitter has multiple transmit antennas, and each receiver has multiple receive antennas. The procedure 490 may be performed by, e.g., the exemplary transmitter 402 of FIG. 21.

In procedure 490, determining virtual uplink waveforms, determining virtual uplink power allocation coefficients, determining downlink waveforms, and determining downlink power allocation coefficients are iteratively performed (492) until a predetermined condition is met. The virtual uplink waveforms, the virtual uplink power allocation coefficients, the downlink waveforms, and the downlink power allocation coefficients are selected to reduce a combination of inter-symbol interference and inter-user interference.

Downlink signals are transmitted (494) from multiple transmit antennas. Each downlink signal is derived from a combination of the downlink waveforms, and each downlink signal is transmitted from a respective transmit antenna to each receive antenna through multiple propagation paths.

In this disclosure, we provided a solution to the weighted sum rate optimization problem by transmit waveform design for the MIMO time-reversal multiuser downlink communication systems where the receiver processing is based on a single sample. The waveform design problem is shown to have a structure similar to the downlink beamforming problem with a self-interfering term induced by the inter-symbol interference. In order to solve the problem, we described a new power allocation scheme called Iterative SINR Waterfilling which, instead of directly allocating the power, the SINRs are first allocated to maximize the weighted sum rate. With the allocated target SINRs, the corresponding power allocation can be determined. For multiple data streams, Iterative Power Waterfilling is described. Iterative algorithms alternately optimize the transmit waveform and the power allocation for each user. Both of the described sum rate optimization algorithms significantly outperform other traditional approaches. We also demonstrated that Iterative SINR Waterfilling outperforms Iterative Power Waterfilling in the scenario of high interference, e.g., large number of users or high SNR region. With the MMSE waveform, Iterative SINR Waterfilling is shown to achieve near-optimal performance by comparing with exhaustively-searched global optimum.

Exemplary System Implementation

In some implementations, the transmitter 252 of FIG. 14 or 402 of FIG. 21 can be part of a mobile or stationary device. For example, the transmitter can be implemented as part of a sensor module, a mobile phone, a laptop computer, or an electronic appliance that communicates wirelessly with multiple other devices. For example, a mobile phone or a laptop computer may communicate simultaneously with a television, a printer, a thermometer, a radio, a refrigerator, a lighting control system, and other devices using the techniques described above.

The transmitter can include one or more processors and one or more computer-readable mediums (e.g., RAM, ROM, SDRAM, hard disk, optical disk, and flash memory). The one or more processors can implement functions of the waveform design unit 294 (FIG. 14) and 410 (FIG. 21). The waveform design units 294 and 410 can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention. For example, the transmitter 402 of FIG. 21 can be used to implement the functions of the transmitter 14 of FIG. 14 by using one of the antennas 408. The waveform design unit 410 can be configured to switch between a first mode that implements iterative weighted sum rate optimization for a single data stream, and a second mode that implements iterative weighted sum rate optimization for multiple data streams.

Accordingly, other embodiments are within the scope of the following claims.

What is claimed is:

1. A method comprising:
   at a transmitter, receiving channel impulse response signals derived from impulse signals sent from two or more receivers, each impulse signal being sent from one of the receivers to the transmitter through multiple propagation paths;
   at the transmitter, determining downlink waveforms for the two or more receivers to increase a weighted sum-rate under a total power constraint, the downlink waveforms being determined based on time-reversed channel impulse response signals and initial virtual uplink power allocation coefficients;
   determining updated virtual uplink power allocation coefficients based on the downlink waveforms;
   determining downlink power allocation coefficients based on the downlink waveforms and the updated virtual uplink power allocation coefficients; and
   allocating power to the downlink waveforms according to the downlink power allocation coefficients, wherein determining downlink power allocation coefficients and allocating power to the downlink waveforms are performed before the downlink waveforms or a signal derived from the downlink waveforms is transmitted from the transmitter to the receivers.

2. The method of claim 1, comprising determining virtual uplink signal-to-interference-and-noise ratios (SINRs) based on the virtual uplink power allocation coefficients, and determining the downlink power allocation coefficients based on the virtual uplink SINRs.

3. The method of claim 2 in which the virtual uplink SINRs take into account both inter-symbol interference (ISI) and inter-user interference (IUI).

4. The method of claim 3 in which increasing the weighted sum-rate also reduces a combination of the inter-symbol interference and the inter-user interference.

5. The method of claim 1, comprising transmitting, from the transmitter to the receivers, a downlink signal derived from a combination of the downlink waveforms and taking into account the downlink power allocation coefficients, the downlink signal being transmitted to each of the receivers through multiple propagation paths.

6. The method of claim 5 in which the downlink signal is configured to enable each receiver to receive multipath signals that can be used determine a data signal intended for the receiver, different receivers receiving the downlink signal through different propagation paths and determining different data signals, wherein the downlink signal is configured to reduce inter-symbol interference (ISI) and inter-user interference (IUI) for the data signals determined at the receivers.

7. The method of claim 1 in which determining the downlink waveforms and the virtual uplink power allocation coefficients comprises:
   iteratively determining updated downlink waveforms based on previously determined virtual uplink power allocation coefficients, and determining updated virtual uplink power allocation coefficients based on previously determined downlink waveforms.

8. The method of claim 1 in which determining downlink waveforms comprises determining downlink waveforms to maximize the weighted sum-rate under the total power constraint.

9. The method of claim 8 in which determining downlink waveforms comprises determining minimum mean squared error (MMSE) waveforms.

10. A method of communication between a transmitter and multiple receivers using multi-path signals, the method comprising:
    at the transmitter, iteratively determining downlink waveforms and determining virtual uplink power allocation coefficients to increase a weighted sum-rate under a total power constraint until a predetermined condition is met, the determination of downlink waveforms and the virtual uplink power allocation coefficients being based on virtual uplink signal-to-interference-and-noise ratios (SINRs) that take into account both inter-symbol interference (ISI) and inter-user interference (IUI), wherein the downlink waveforms and virtual uplink power allocation coefficients are selected to reduce a combination of inter-symbol interference and inter-user interference;
    determining downlink power allocation coefficients based on the downlink waveforms and the virtual uplink power allocation coefficients; and
    allocating power to the downlink waveforms according to the downlink power allocation coefficients,
    wherein determining downlink power allocation coefficients and allocating power to the downlink waveforms are performed before the downlink waveforms or a signal derived from the downlink waveforms is transmitted from the transmitter to the receivers.

11. The method of claim 10, comprising determining updated virtual uplink signal-to-interference-and-noise ratios (SINRs) based on the downlink waveforms and virtual uplink power allocation coefficients, and determining the downlink power allocation coefficients based on the updated virtual uplink SINRs.

12. The method of claim 10 in which the downlink waveforms are determined based on time-reversed channel impulse response signals, each channel impulse response signal is derived from an impulse signal sent from one of the receivers to the transmitter through multiple propagation paths.

13. The method of claim 10, further comprising transmitting, from the transmitter to the receivers, a downlink signal derived from a combination of the downlink waveforms, the downlink signal being transmitted to each of the receivers through multiple propagation paths.

14. The method of claim 13 in which the downlink signal is configured to enable each receiver to receive multipath signals that can be used determine a data signal intended for the receiver, different receivers receiving the downlink signal through different propagation paths and determining different data signals, wherein the downlink signal is configured to reduce inter-symbol interference (ISI) and inter-user interference (IUI) for the data signals determined at the receivers.

15. The method of claim 10 in which determining virtual uplink waveforms comprises determining virtual uplink waveforms to maximize the weighted sum-rate under the total power constraint.

16. The method of claim 15 in which determining virtual uplink waveforms comprises determining minimum mean squared error (MMSE) waveforms.

17. The method of claim 10 in which the predetermined condition is met when at least one of a convergence condition of the virtual uplink power allocation coefficients is met or a predetermined number of iterations are completed.

18. An apparatus comprising:
a time-reversed response unit to receive channel impulse response signals and generate respectively time-reversed channel impulse response signals; and
a waveform design unit configured to
determine downlink waveforms for two or more receivers to increase a weighted sum-rate under a total power constraint, the downlink waveforms being determined based on the time-reversed channel impulse response signals and initial virtual uplink power allocation coefficients,
determine updated virtual uplink power allocation coefficients based on the downlink waveforms,
determine downlink power allocation coefficients based on the downlink waveforms and the updated virtual uplink power allocation coefficients,
allocate power to the downlink waveforms according to the downlink power allocation coefficients, and
generate a downlink signal derived from the downlink waveforms, the downlink power allocation coefficients, and intended data for respective receivers,
wherein determining downlink power allocation coefficients and allocating power to the downlink waveforms are performed before the downlink waveforms or the downlink signal is transmitted from the apparatus to the receivers.

19. An apparatus comprising:
a storage device to store instructions; and
a data processor to execute the instructions to implement a process comprising:
receiving channel impulse response signals,
generating time-reversed channel impulse response signals based on the channel impulse response signals,
determining downlink waveforms for two or more receivers to increase a weighted sum-rate under a total power constraint, the downlink waveforms being determined based on the time-reversed channel impulse response signals and initial virtual uplink power allocation coefficients,
determining updated virtual uplink power allocation coefficients based on the downlink waveforms,
determining downlink power allocation coefficients based on the downlink waveforms and the updated virtual uplink power allocation coefficients,
allocating power to the downlink waveforms according to the downlink power allocation coefficients, and
generating a downlink signal derived from the downlink waveforms, the downlink power allocation coefficients, and intended data for respective receivers,
wherein determining downlink power allocation coefficients and allocating power to the downlink waveforms are performed before the downlink waveforms or the downlink signal is transmitted to the receivers.

20. A non-transitory machine-readable medium storing instructions that when read by a machine causes the machine to perform operations comprising:
receiving channel impulse response signals derived from impulse signals sent from two or more receivers, each impulse signal being sent from one of the receivers to a transmitter through multiple propagation paths;
determining downlink waveforms for the two or more receivers to increase a weighted sum-rate under a total power constraint, the downlink waveforms being determined based on the time-reversed channel impulse response signals and initial virtual uplink power allocation coefficients;
determining updated virtual uplink power allocation coefficients based on the downlink waveforms;
determining downlink power allocation coefficients based on the downlink waveforms and the updated virtual uplink power allocation coefficients; and
allocating power to the downlink waveforms according to the downlink power allocation coefficients,
wherein determining downlink power allocation coefficients and allocating power to the downlink waveforms are performed before the downlink waveforms or a signal derived from the downlink waveforms is transmitted to the receivers.

21. A method comprising:
at a transmitter having multiple transmit antennas, receiving channel impulse response signals derived from impulse signals sent from two or more receivers, each impulse signal being sent from one of the receivers to the transmitter through multiple propagation paths;
determining virtual uplink waveforms based on initial virtual uplink power allocation coefficients and initial downlink waveforms;
determining updated virtual uplink power allocation coefficients based on the virtual uplink waveforms, the initial downlink waveforms, and initial downlink power allocation coefficients;
determining updated downlink waveforms based on the virtual uplink waveforms and the updated virtual uplink power allocation coefficients;
determining updated downlink power allocation coefficients based on the updated downlink waveforms, the virtual uplink waveforms, and the updated virtual uplink power allocation coefficients, and
allocating power to the updated downlink waveforms according to the updated downlink power allocation coefficients,
wherein determining updated downlink power allocation coefficients and allocating power to the downlink waveforms are performed before the updated downlink waveforms or a signal derived from the updated downlink waveforms is transmitted to the receivers.

22. The method of claim 21 in which determining updated virtual uplink power allocation coefficients comprises determining updated virtual uplink power allocation coefficients according to an iterative power waterfilling process.

23. The method of claim 21 in which determining updated downlink power allocation coefficients comprises determining updated downlink power allocation coefficients according to an iterative power waterfilling process.

24. The method of claim 21, comprising iteratively determining updated virtual uplink waveforms, determining updated virtual uplink power allocation coefficients, determining updated downlink waveforms, and determining updated downlink power allocation coefficients until at least one of a convergence condition is satisfied or a predetermined number of iteration is completed.

25. The method of claim 21 in which the updated virtual uplink power allocation coefficients are selected to reduce a combination of inter-symbol interference and inter-user interference.

26. The method of claim 21 in which the updated downlink power allocation coefficients are selected to reduce a combination of inter-symbol interference and inter-user interference.

27. The method of claim 21, comprising transmitting, from the multiple transmit antennas to the receivers, downlink signals each derived from a combination of the downlink waveforms, each downlink signal being transmitted to each of the receivers through multiple propagation paths.

28. A method of communication between a transmitter and multiple receivers using multi-path signals, the transmitter having multiple transmit antennas, each receiver having multiple receive antennas, the method comprising:
 at the transmitter, receiving channel impulse response signals derived from impulse signals sent from two or more receivers, each impulse signal being sent from one of the receivers to a transmitter through multiple propagation paths,
 iteratively determining virtual uplink waveforms, determining virtual uplink power allocation coefficients, determining downlink waveforms, and determining downlink power allocation coefficients until a predetermined condition is met,
 wherein the virtual uplink waveforms, the virtual uplink power allocation coefficients, the downlink waveforms, and the downlink power allocation coefficients are selected to reduce a combination of inter-symbol interference and inter-user interference;
 allocating power to the downlink waveforms according to the downlink power allocation coefficients; and
 transmitting, from the multiple transmit antennas to the multiple receive antennas of the multiple receivers, downlink signals each derived from a combination of the downlink waveforms, each downlink signal being transmitted from a respective transmit antenna to each of the receive antennas through multiple propagation paths,
 wherein determining downlink power allocation coefficients and allocating power to the downlink waveforms are performed before transmitting the downlink signals.

29. The method of claim 28 in which the downlink signals are configured to enable each receiver to receive multipath signals that can be used determine a data signal intended for the receiver, different receivers receiving the downlink signals through different propagation paths and determining different data signals, wherein the downlink signals are configured to reduce inter-symbol interference (ISI) and inter-user interference (IUI) for the data signals determined at the receivers.

30. The method of claim 28 in which determining virtual uplink power allocation coefficients comprises determining virtual uplink power allocation coefficients according to an iterative power waterfilling process.

31. The method of claim 28 in which determining downlink power allocation coefficients comprises determining downlink power allocation coefficients according to an iterative power waterfilling process.

32. The method of claim 28 in which the predetermined condition is met when at least one of a convergence condition is satisfied or a predetermined number of iterations are completed.

33. The method of claim 28 in which the virtual uplink power allocation coefficients are selected to reduce a combination of inter-symbol interference and inter-user interference.

34. The method of claim 28 in which the downlink power allocation coefficients are selected to reduce a combination of inter-symbol interference and inter-user interference.

35. An apparatus comprising:
 multiple transmit antennas;
 a time-reversed response unit to receive channel impulse response signals and generate respectively time-reversed channel impulse response signals; and
 a waveform design unit configured to
  determine virtual uplink waveforms based on initial virtual uplink power allocation coefficients and initial downlink waveforms;
  determine updated virtual uplink power allocation coefficients based on the virtual uplink waveforms, the initial downlink waveforms, and initial downlink power allocation coefficients;
  determine updated downlink waveforms based on the virtual uplink waveforms and the updated virtual uplink power allocation coefficients;
  determine updated downlink power allocation coefficients based on the updated downlink waveforms, the virtual uplink waveforms, and the updated virtual uplink power allocation coefficients, and
  allocate power to the downlink waveforms according to the updated downlink power allocation coefficients,
  wherein determining updated downlink power allocation coefficients and allocating power to the downlink waveforms are performed before the downlink waveforms or a signal derived from the downlink waveforms is transmitted from the apparatus.

36. An apparatus comprising:
 a storage device to store instructions; and
 a data processor to execute the instructions to implement a process comprising:
  receiving channel impulse response signals derived from impulse signals sent from two or more receivers, each impulse signal being sent from one of the receivers to the transmitter through multiple propagation paths;
  determining virtual uplink waveforms based on initial virtual uplink power allocation coefficients and initial downlink waveforms;
  determining updated virtual uplink power allocation coefficients based on the virtual uplink waveforms, the initial downlink waveforms, and initial downlink power allocation coefficients;
  determining updated downlink waveforms based on the virtual uplink waveforms and the updated virtual uplink power allocation coefficients;
  determining updated downlink power allocation coefficients based on the updated downlink waveforms, the virtual uplink waveforms, and the updated virtual uplink power allocation coefficients; and
  allocating power to the downlink waveforms according to the updated downlink power allocation coefficients,
  wherein determining updated downlink power allocation coefficients and allocating power to the downlink waveforms are performed before the downlink waveforms or a signal derived from the downlink waveforms is transmitted to the receivers.

37. A non-transitory machine-readable medium storing instructions that when read by a machine causes the machine to perform operations comprising:
receiving channel impulse response signals derived from impulse signals sent from two or more receivers, each impulse signal being sent from one of the receivers to the transmitter through multiple propagation paths;
determining virtual uplink waveforms based on initial virtual uplink power allocation coefficients and initial downlink waveforms;
determining updated virtual uplink power allocation coefficients based on the virtual uplink waveforms, the initial downlink waveforms, and initial downlink power allocation coefficients;
determining updated downlink waveforms based on the virtual uplink waveforms and the updated virtual uplink power allocation coefficients;
determining updated downlink power allocation coefficients based on the updated downlink waveforms, the virtual uplink waveforms, and the updated virtual uplink power allocation coefficients; and
allocating power to the downlink waveforms according to the updated downlink power allocation coefficients,
wherein determining updated downlink power allocation coefficients and allocating power to the downlink waveforms are performed before the downlink waveforms or a signal derived from the downlink waveforms is transmitted to the receivers.

38. The apparatus of claim 18 in which the waveform design unit is configured to determine virtual uplink signal-to-interference-and-noise ratios (SINRs) based on the virtual uplink power allocation coefficients, and determine the downlink power allocation coefficients based on the virtual uplink SINRs.

39. The apparatus of claim 38 in which the virtual uplink SINRs takes into account both inter-symbol interference (ISI) and inter-user interference (IUI).

40. The apparatus of claim 39 in which increasing the weighted sum-rate also reduces a combination of the inter-symbol interference and the inter-user interference.

41. The apparatus of claim 18 in which determining the downlink waveforms and the virtual uplink power allocation coefficients comprises:
iteratively determining updated downlink waveforms based on previously determined virtual uplink power allocation coefficients, and determining updated virtual uplink power allocation coefficients based on previously determined downlink waveforms.

42. The apparatus of claim 18 in which determining downlink waveforms comprises determining downlink waveforms to maximize the weighted sum-rate under the total power constraint.

43. The apparatus of claim 40 in which determining downlink waveforms comprises determining minimum mean squared error (MMSE) waveforms.

44. The apparatus of claim 19 in which the process comprises determining virtual uplink signal-to-interference-and-noise ratios (SINRs) based on the virtual uplink power allocation coefficients, and determining the downlink power allocation coefficients based on the virtual uplink SINRs.

45. The apparatus of claim 19 in which determining the downlink waveforms and the virtual uplink power allocation coefficients comprises:
iteratively determining updated downlink waveforms based on previously determined virtual uplink power allocation coefficients, and determining updated virtual uplink power allocation coefficients based on previously determined downlink waveforms.

46. The apparatus of claim 19 in which determining downlink waveforms comprises determining downlink waveforms to maximize the weighted sum-rate under the total power constraint.

47. The machine-readable medium of claim 20 in which determining the downlink waveforms and the virtual uplink power allocation coefficients comprises:
iteratively determining updated downlink waveforms based on previously determined virtual uplink power allocation coefficients, and determining updated virtual uplink power allocation coefficients based on previously determined downlink waveforms.

48. The apparatus of claim 35 in which determining updated virtual uplink power allocation coefficients comprises determining updated virtual uplink power allocation coefficients according to an iterative power waterfilling process.

49. The apparatus of claim 35 in which determining updated downlink power allocation coefficients comprises determining updated downlink power allocation coefficients according to an iterative power waterfilling process.

50. The apparatus of claim 35 in which the waveform design unit is configured to iteratively determine updated virtual uplink waveforms, determine updated virtual uplink power allocation coefficients, determine updated downlink waveforms, and determine updated downlink power allocation coefficients until at least one of a convergence condition is satisfied or a predetermined number of iteration is completed.

51. The apparatus of claim 35 in which the updated virtual uplink power allocation coefficients are selected to reduce a combination of inter-symbol interference and inter-user interference.

52. The apparatus of claim 35 in which the updated downlink power allocation coefficients are selected to reduce a combination of inter-symbol interference and inter-user interference.

53. The apparatus of claim 36 in which determining updated virtual uplink power allocation coefficients comprises determining updated virtual uplink power allocation coefficients according to an iterative power waterfilling process.

54. The apparatus of claim 36 in which determining updated downlink power allocation coefficients comprises determining updated downlink power allocation coefficients according to an iterative power waterfilling process.

55. The apparatus of claim 36 in which the process comprises iteratively determining updated virtual uplink waveforms, determining updated virtual uplink power allocation coefficients, determining updated downlink waveforms, and determining updated downlink power allocation coefficients until at least one of a convergence condition is satisfied or a predetermined number of iteration is completed.

56. The apparatus of claim 36 in which the updated virtual uplink power allocation coefficients are selected to reduce a combination of inter-symbol interference and inter-user interference.

57. The apparatus of claim 36 in which the updated downlink power allocation coefficients are selected to reduce a combination of inter-symbol interference and inter-user interference.

* * * * *

UNITED STATES PATENT AND TRADEMARK OFFICE
CERTIFICATE OF CORRECTION

PATENT NO. : 9,883,511 B1
APPLICATION NO. : 13/706342
DATED : January 30, 2018
INVENTOR(S) : Yu-Han Yang, Beibei Wang and K. J. Ray Liu Page 1 of 1

It is certified that error appears in the above-identified patent and that said Letters Patent is hereby corrected as shown below:

On the Title Page

Column 1, (71) Applicant: delete "Wireless," and insert -- Origin Wireless, --.

In the Claims

Column 31, Line 61, Claim 6, delete "used determine" and insert -- used to determine --.

Column 32, Line 61, Claim 14, delete "used determine" and insert -- used to determine --.

Column 35, Line 49, Claim 29, delete "used determine" and insert -- used to determine --.

Signed and Sealed this
Fifth Day of June, 2018

Andrei Iancu
*Director of the United States Patent and Trademark Office*